(12) United States Patent
Takeda et al.

(10) Patent No.: US 6,954,797 B1
(45) Date of Patent: Oct. 11, 2005

(54) DATA COMMUNICATION METHOD, TERMINAL EQUIPMENT, INTERCONNECTING INSTALLATION, DATA COMMUNICATION SYSTEM AND RECORDING MEDIUM

(75) Inventors: Kenji Takeda, Tokyo (JP); Tomoki Osawa, Tokyo (JP)

(73) Assignee: NEC Corporation, (JP)

( * ) Notice: Subject to any disclaimer, the term of this patent is extended or adjusted under 35 U.S.C. 154(b) by 0 days.

(21) Appl. No.: 09/513,580

(22) Filed: Feb. 25, 2000

(30) Foreign Application Priority Data

Feb. 26, 1999 (JP) .............................. 051132/1999

(51) Int. Cl.$^7$ .............................................. G06F 15/16
(52) U.S. Cl. ...................... 709/236; 709/226; 709/228; 370/94.1; 345/339
(58) Field of Search .............................. 709/203, 204, 709/206, 217, 218, 222, 224, 228, 230; 370/94.1, 370/60, 94; 345/339, 340, 347, 317

(56) References Cited

U.S. PATENT DOCUMENTS

| | | | | |
|---|---|---|---|---|
| 4,893,307 A | * | 1/1990 | McKay et al. | 370/389 |
| 5,007,051 A | | 4/1991 | Dolkas et al. | 370/85.1 |
| 5,535,199 A | | 7/1996 | Amri et al. | 370/60 |
| 6,112,247 A | * | 8/2000 | Williams | 709/236 |
| 6,212,548 B1 | * | 4/2001 | DeSimone et al. | 709/204 |
| 6,331,825 B1 | * | 12/2001 | Ladner et al. | 340/988 |
| 6,345,256 B1 | * | 2/2002 | Milsted et al. | 705/1 |
| 6,385,596 B1 | * | 5/2002 | Wiser et al. | 705/51 |
| 6,690,659 B1 | * | 2/2004 | Ahmed et al. | 370/328 |

FOREIGN PATENT DOCUMENTS

| | | |
|---|---|---|
| JP | 7-38612 | 2/1995 |
| JP | 8-204778 | 8/1996 |
| JP | 10-190732 | 7/1998 |
| JP | 10-229416 | 8/1998 |

OTHER PUBLICATIONS

Internet Engineering Task Force, "Requirements for Internet Hosts—Communication Layers," R. Braden, Editor, Oct. 1989.
"Transmission Control Protocol, DARPA Internet Program Protocol Specification," Information Sciences Institute, University of Southern California, Marina del Rey, California, Sep. 1981.
"Internet Protocol, DARPA Internet Program Protocol Specification," Information Sciences Institute, University of Southern California, Marina del Rey, California, Sep. 1981.

(Continued)

Primary Examiner—Zarni Maung
Assistant Examiner—Khanh Quang Dinh
(74) Attorney, Agent, or Firm—Dickstein, Shapiro, Morin & Oshinsky, LLP.

(57) ABSTRACT

In data communication between a terminal equipment connected to a first network and a second network and a server terminal equipment via an interconnecting installation, there are provided a first communication controller in which data communication control is performed on the terminal equipment via the first network by a message group for functions of data transfer, transmission acknowledgment, flow control, and the like, and a second communication controller in which the data communication control is performed on the interconnecting installation with the terminal equipment via the first network by the message group, and the data communication control is performed with TCP module of the server terminal equipment according to TCP. By this, data communication efficiency is enhanced in a communication environment for communicating a communication terminal equipment on a cable network through a radio line or another access link.

12 Claims, 37 Drawing Sheets

OTHER PUBLICATIONS

Zygmunt J. Haas and Prathima Agrawal, "Mobile-TCP: An Asymmetric Transport Protocol Design for Mobil Systems," IEEE International Conference on Communications, 1997. ICC'97, Jun. 8-12, 1997, vol. 2, pp. 1054-1058.

Jacobson et al. "Congestion Avoidance and Control" Nov. 1988.

Bakre et al. "I-TCP: Indirect TCP for Mobile Hosts" Rutgers University, Oct. 1994.

Brown et al. "M-TCP: TCP for Mobile Cellular Networks"University of South Carolina, Jul. 29, 1997.

Wang et al., "Mobile-End Transport Protocol: An Alternative to TCP/IP Over Wireless Links" IEEE Feb. 1998.

Balakrishnan et al., "Improving TCP/IP Performance Over Wireless Networks" University of California, Intl. Conf. on Mobile Computing and Networking (Mobicom), Nov. 1995.

Jacobson, Compressing TCP/IP Headers for Low-Speed Serial Links, Feb. 1990.

Mathis et al., "TCP Selective Acknowledgment Options" Oct. 1996.

Keshav et al., "Smart Retransmission: Performance with Overload and Random Losses" AT&T Bell Laboratories, Jan. 26, 1996.

A.S. Tanenbaum, Computer Networks, Prentice-Hall International, London, UK XP 002218924 (paragraph 3.4) (1996).

W.R. Stevens, TCP/IP Illustrated, vol. 1, The Protocols, Addisson-Wesley, Reading, US, XP 002218925 (Chapter 18) (1994).

Search Report dated Nov. 11, 2002.

* cited by examiner

FIG. 4

| MESSAGE NAME | NOTIFIED INFORMATION | |
|---|---|---|
| POPEN | CONNECTION IDENTIFIER INFORMATION, CC ORDER NUMBER INFORMATION | SELF PORT NUMBER INFORMATION, SELF IP ADDRESS INFORMATION |
| AOPEN | | SELF PORT NUMBER INFORMATION, SELF IP ADDRESS INFORMATION, OBJECT PORT NUMBER INFORMATION, OBJECT IP ADDRESS INFORMATION |
| ESTAB | | OBJECT PORT NUMBER INFORMATION, OBJECT IP ADDRESS INFORMATION |
| CLOSE | | |
| ABORT | | |
| REPLY | | REPLY OBJECT INFORMATION, RESULT INFORMATION, NEW CONNECTION IDENTIFIER INFORMATION |
| RESET | | |

FIG. 5

| MEMBER | ENTRY | | |
|---|---|---|---|
| | 1 | 2 | ... |
| SOCKET IDENTIFIER | S1 | | |
| CONNECTION IDENTIFIER | C1 | | |
| SOURCE PORT NUMBER | P1 | | |
| SOURCE IP ADDRESS | A1 | | |
| DESTINATION PORT NUMBER | P3 | | |
| DESTINATION IP ADDRESS | A3 | | |
| CONNECTION TERMINAL POINT STATE | | | |
| TRANSMISSION COMPLETION | | | |
| CLOSE REQUEST | | | |

FIG. 6

| MEMBER | ENTRY | | |
|---|---|---|---|
| | 1 | 2 | ... |
| CONNECTION IDENTIFIER | C1 | | |
| FIRST PORT NUMBER | P1 | | |
| FIRST IP ADDRESS | A1 | | |
| SECOND PORT NUMBER | P3 | | |
| SECOND IP ADDRESS | A3 | | |
| CONNECTION RELAY POINT STATE | LISTEN | | |
| TRANSMISSION COMPLETION | | | |
| CLOSE REQUEST | | | |
| CLOSE REQUEST ACKNOWLEDGMENT | | | |

FIG. 15

| MESSAGE TYPE | MESSAGE NAME | | NOTIFIED INFORMATION | |
|---|---|---|---|---|
| DATA COMMUNICATION MESSAGE GROUP | DATA | CONNECTION IDENTIFIER INFORMATION, RESENDING INFORMATION | DM ORDER NUMBER INFORMATION, APPLICATION DATA, URGENT DATA INFORMATION, PUSH INFORMATION | |
| DATA COMMUNICATION CONTROL MESSAGE GROUP | ACK | | ACCUMULATION ACKNOWLEDGMENT INFORMATION | |
| | RNR | | | |
| | RR | | | |

FIG. 16

| MEMBER | ENTRY | | |
|---|---|---|---|
| | 1 | 2 | ... |
| SOCKET IDENTIFIER | S1 | | |
| CONNECTION IDENTIFIER | C1 | | |
| SOURCE PORT NUMBER | P1 | | |
| SOURCE IP ADDRESS | A1 | | |
| DESTINATION PORT NUMBER | P3 | | |
| DESTINATION IP ADDRESS | A3 | | |
| CONNECTION TERMINAL POINT STATE | | | |
| TRANSMISSION ENABLE STATE | ENABLED/ DISABLED | — | |
| RECEPTION ENABLE STATE | ENABLED/ DISABLED | | |
| ACCUMULATION ACKNOWLEDGMENT NUMBER | | | |
| TRANSMISSION COMPLETION | | | |
| CLOSE REQUEST | | | |

FIG. 17

| MEMBER | ENTRY | | |
|---|---|---|---|
| | 1 | 2 | ... |
| CONNECTION IDENTIFIER | C1 | | |
| FIRST PORT NUMBER | P1 | | |
| FIRST IP ADDRESS | A1 | | |
| SECOND PORT NUMBER | P3 | | |
| SECOND IP ADDRESS | A3 | | |
| CONNECTION RELAY POINT STATE | LISTEN | | |
| TRANSMISSION ENABLE STATE | | | |
| RECEPTION ENABLE STATE | | | |
| ACCUMULATION ACKNOWLEDGMENT NUMBER | | | |
| TRANSMISSION COMPLETION | | | |
| CLOSE REQUEST | | | |

FIG. 23

| MESSAGE TYPE | MESSAGE NAME | | NOTIFIED INFORMATION |
|---|---|---|---|
| DATA COMMUNICATION MESSAGE GROUP | DATA | CONNECTION IDENTIFIER INFORMATION | DM ORDER NUMBER INFORMATION, APPLICATION DATA, URGENT DATA INFORMATION, PUSH INFORMATION |
| DATA COMMUNICATION CONTROL MESSAGE GROUP | ACK | | ACCUMULATION ACKNOWLEDGMENT INFORMATION (ONLY COMMAND TYPE MESSAGE) / REQUEST TYPE MESSAGE, DC ORDER NUMBER INFORMATION |
| | RNR | | |
| | RR | | |

FIG. 25

| MESSAGE TYPE | MESSAGE NAME | | NOTIFIED INFORMATION |
|---|---|---|---|
| DATA COMMUNICATION MESSAGE GROUP | DATA | CONNECTION IDENTIFIER INFORMATION | DM ORDER NUMBER INFORMATION, APPLICATION DATA, URGENT DATA INFORMATION, PUSH INFORMATION |
| DATA COMMUNICATION CONTROL MESSAGE GROUP | ACK | | REQUEST TYPE MESSAGE, DC ORDER NUMBER INFORMATION | ACCUMULATION ACKNOWLEDGMENT INFORMATION, TRANSMISSION ACKNOWLEDGMENT MESSAGE (BOTH INCLUDING ONLY COMMAND TYPE MESSAGE) |
| | RNR | | |
| | RR | | |

FIG. 26

| MEMBER | ENTRY | | |
|---|---|---|---|
| | 1 | 2 | ... |
| SOCKET IDENTIFIER | S1 | | |
| CONNECTION IDENTIFIER | C1 | | |
| SOURCE PORT NUMBER | P1 | | |
| SOURCE IP ADDRESS | A1 | | |
| DESTINATION PORT NUMBER | P3 | | |
| DESTINATION IP ADDRESS | A3 | | |
| CONNECTION TERMINAL POINT STATE | ESTAB | | |
| COMMUNICATION ENABLE STATE | ENABLED | | |
| RECEPTION ENABLE STATE | ENABLED | | |
| ACCUMULATION ACKNOWLEDGMENT NUMBER | 0 | | |
| TRANSMISSION COMPLETION | COMPLETED | | |
| CLOSE REQUEST | ABSENT | | |
| ACK TRANSMISSION ENABLE STATE | ENABLED | | |
| ACK TRANSMISSION REQUEST | ABSENT | | |

FIG. 27

| MEMBER | ENTRY | |  |
|---|---|---|---|
|  | 1 | 2 | ... |
| CONNECTION IDENTIFIER | C1 | | |
| FIRST PORT NUMBER | P1 | | |
| FIRST IP ADDRESS | A1 | | |
| SECOND PORT NUMBER | P3 | | |
| SECOND IP ADDRESS | A3 | | |
| CONNECTION RELAY POINT STATE | ESTAB | | |
| TRANSMISSION ENABLE STATE | ENABLED | | |
| RECEPTION ENABLE STATE | ENABLED | | |
| ACCUMULATION ACKNOWLEDGMENT NUMBER | 0 | | |
| TRANSMISSION COMPLETION | COMPLETED | | |
| CLOSE REQUEST | ABSENT | | |
| ACK TRANSMISSION ENABLE STATE | ENABLED | | |
| ACK TRANSMISSION REQUEST | ABSENT | | |

DATA COMMUNICATION METHOD, TERMINAL EQUIPMENT, INTERCONNECTING INSTALLATION, DATA COMMUNICATION SYSTEM AND RECORDING MEDIUM

BACKGROUND OF THE INVENTION

1. Field of the Invention

The present invention relates to a data communication method and a data communication system which can realize communication under TCP/IP protocol having a good communication efficiency in application environments such as mobile computing and remote access, in which the throughput for access link from a terminal equipment bottlenecks the throughput in end—end communication.

2. Description of the Prior Art

In recent years, Internet has spread as a network for performing data communication between terminal equipment such as computers. Moreover, an application mode called mobile computing or remote access has spread together.

In the mobile computing and the remote access, as a user's terminal equipment used is an information processor provided with a communication apparatus which can realize communication with radio telephone lines such as a cellular phone and cable telephone lines such as ISDN. Moreover, in the application mode, the data communication is performed with a server terminal equipment via an interconnecting installation (hereinafter referred to as the router) called an access server or an access router which is connected to the user's terminal equipment via the radio telephone line or the cable telephone line. Additionally, the line connected to the user's terminal equipment is referred to as the access link, and the communication between the user's terminal equipment and the server terminal equipment is referred to as the end—end communication. In the mobile computing or the remote access, the communication speed of the access link is usually slow, and the throughput of the access link bottlenecks the throughput of the end—end communication in many cases.

The Internet is an aggregate of networks in which local area networks (LAN) connected to a plurality of terminal equipments via packet communication media such as Ethernet are interconnected via the packet interconnecting installation as the router.

On the terminal equipment or the router connected to Internet, a program for performing operation according to a path control protocol called Internet Protocol (IP) is mounted, so that the packet communication between arbitrary terminal equipments connected to different LAN can be realized by IP.

Additionally, when an error occurs in a part of the data during the transmission of the packet via the communication media, or when the router is not provided with a sufficient packet storage area, the received packet is discarded, so that packet loss occurs during communication. Moreover, when a series of packet is transmitted from the arbitrary terminal equipment to the terminal equipment connected to the different LAN, transmission order differs from arrival order in the packet receiving terminal equipment in which the packet arrival order is not guaranteed.

The Internet performs the data communication having reliability even against the packet loss or order replacement, and has a function for extracting the transmitted data exactly in transmission order on a reception side without missing any data.

The data communication having a high reliability is realized by the communication protocol which is called transmission control protocol (TCP).

The TCP and IP have originally been developed by assuming the data communication between the terminal equipments connected to cable LAN, but are usually utilized even in the mobile computing or the remote access at present.

A conventional data communication system in which the TCP/IP protocol (hereinafter simply referred to as TCP/IP) is used will next be described with reference to FIGS. 32 to 37. This is more specifically described in various Requests for Comment (RFC) issued by the U.S. Internet Engineering Task Force (IETF). Additionally, the most important matter on TCP is described in RFC 793 (Transmission Control Protocol), and the most important matter on IP is described in RFC 791 (Internet Protocol: IP). Moreover, specification changes or detailed specifications of RFC 793 and RFC 791 are described in RFC 1122 (Requirements for Internet Hosts-Communication Layer).

FIG. 32 is a block diagram showing one constitution example of the data communication system which uses conventional TCP/IP. FIG. 33 is a diagram showing the constitution of the information transmitted/received in the data communication system shown in FIG. 32, and is a block diagram showing a header positional relation. FIG. 34 is a block diagram showing the constitution of TCP header shown in FIG. 33, and FIG. 35 is a block diagram showing the constitution of IP header shown in FIG. 33. Moreover, FIG. 36 is a sequence diagram showing the procedure during connection opening of the conventional data communication system shown in FIG. 32, and FIG. 37 is a sequence diagram showing the procedure during connection close of the conventional data communication system shown in FIG. 32.

The data communication system using the conventional TCP/IP shown in FIG. 32 is constituted of a terminal equipment 6, a router 7, a server terminal equipment 8, a radio network 9, and Internet 10. The terminal equipment 6 and the router 7 are connected via the radio network 9 such as a radio telephone line, and the router 7 and the server terminal equipment 8 are connected via the Internet 10.

The terminal equipment 6 is, for example, an information processor provided with apparatuses connectable to the radio network 9, and is provided with a first processor 61, a first communication interface controller 62, a first TCP module 63, a first IP module 64, a first PPP module 65, and a first radio line access unit 66.

The router 7 is an information processor provided with apparatuses connectable to the radio network 9 and Ethernet interface connectable to the Internet 10, and has a second IP module 71, a second PPP module 72, a second radio line access unit 73, and a first Ethernet module 73.

The server terminal equipment 8 is an information processor provided with Ethernet interface connectable to the Internet 10, and has a second processor 81, a second communication interface controller 82, a second TCP module 83, a third IP module 84, and a second Ethernet module 85.

The radio network 9 is a telephone network constituted of a radio line. Moreover, the Internet 10 is a complex of Ethernet LAN or LAN connected via the router.

The first processor 61 and the second processor 81 carry out a processing according to an application program for performing communication. With the application program the data is mutually exchanged to present a communication service to a user.

The application program is a known program such as file transfer protocol (ftp) and TELNET, or is prepared individually by the user for use. Additionally, the desired data communicated between the first processor 61 and the second processor 81 will be referred to as the application data hereinafter.

In FIG. 33, the application data is divided into a plurality of sub-application data constituted of a predetermined data amount transmittable with the packet (divided into first to third sub-application data in FIG. 33), various headers constituted of addresses indicating transmission destinations and control information are applied to the sub-application data and the data are transmitted (the header applied in each module will be described later). Additionally, in FIG. 33, PPP trailer, or Ethernet trailer is data indicating the last of the packet.

The first processor 61 performs the communication with the second processor 81 via an access point presented by the first communication interface controller 62.

When the application data is transmitted to the second processor 81 from the first processor 61, the first processor 61 transfers the application data to the first communication interface controller 62 and requires data transmission. Moreover, when the first processor 61 receives the application data transmitted from the second processor 81, the first processor 61 makes a request to the first communication interface controller 62 for data reception, so that the received application data is transferred.

Similarly, the second processor 81 performs the communication with the first processor 61 via an access point presented by the second communication interface controller 82.

When the application data is transmitted to the first processor 61 from the second processor 81, the second processor 81 transfers the application data to the second communication interface controller 82 and requires the data transmission. Moreover, when the second processor 81 receives the application data transmitted from the first processor 61, the second processor 81 makes a request to the second communication interface controller 82 for data reception, so that the received application data is transferred.

The first communication interface controller 62 and the second communication interface controller 82 manage the above-described access points, and additionally utilize functions owned by the first TCP module 63 and the second TCP module 83 to execute specific processings according to the requests from the first processor 61 and the second processor 81. Additionally, the access point is presented with a concept called "socket" at present.

The "socket" will next be described in an example for use in the first communication interface controller 62. Additionally, since an example for use in the second communication interface controller 82 is similar, the description thereof is omitted.

The socket is identified in accordance with an identifier called a port for identifying a self address and application program. Moreover, the socket forms an access point to a virtual channel called connection to realize the data communication. Additionally, the connection is appropriately generated, or deleted in the communication interface controller to perform the communication.

When the application data communication is performed between the first processor 61 and the second processor 81, the connection is opened between the first processor 61 and the second processor 81, and the application data is transmitted via the connection. Moreover, after the application data connection closes, the connection is also closed. Therefore, the socket has a connection control function and a data communication function.

The connection control function includes a connection active opening function of designating a self socket and a communication object socket to actively open the connection, a connection passive opening point generating function of converting the self socket to a socket (passive socket) for receiving a connection active opening request from other communication terminal point, a connection passive opening function for waiting for the connection opening by the passive socket, and a connection close function of closing the opened connection.

Moreover, the data communication function includes a data transmission function of transmitting the application data to the communication object socket via the opened connection, and a data reception function of extracting the data transmitted from the communication object socket via the opened connection.

The above-described function is realized by the first TCP module 63, and the first communication interface controller 62 replaces the communication request from the first processor 61 with function calling of the first TCP module 63, and additionally manages the correlation between the socket and the connection.

Moreover, the first communication interface controller 62 temporarily holds the application data transferred from the first processor 61 (a storage area for storing the application data is referred to as a transmission data buffer), and temporarily holds the received application data until the data is extracted by the first processor 61 (the storage area for storing the application data is referred to as a reception data buffer).

The first processor 61 identifies the connection for use in the communication with the socket by establishing a one-to-one correspondence between the socket and the connection terminal point by the first communication interface controller 62. Moreover, when the first communication interface controller 62 requests data transfer and designates the socket identifier, the first TCP module 63 identifies the corresponding connection. Specifically, in Free BSD 2.2.6-RELEASE as one type of UNIX operating system, the connection active opening request, connection passive opening point generation request, connection passive opening request, and connection break request are realized with system call functions of connect, listen, accept, and shutdown. Moreover, the data transmission request is realized with a system call function of send or write, and the data reception request is realized with a system call function of receive or read.

The first TCP module 63 and the second TCP module 83 are transport layer protocol modules for realizing the TCP protocol control, that is, the connection control and data communication.

A TCP module function will be described hereinafter in the example of the first TCP module 63. The function and operation of the second TCP module 83 are similar to those of the first TCP module 63.

The first TCP module 63 has an order control function of re-arranging the received application data in transmitted order, a data communication guarantee function of performing a re-sending processing when the packet is lost, and a flow control function with the second TCP module 83.

On receiving the application data from the first communication interface controller 62, the first TCP module 63 generates the TCP segment and transfers the segment to the first IP module 64. The TCP segment is constituted only of the TCP header shown in FIG. 34, or of the TCP header and application data. Additionally, the TCP header is added to the top of the sub-application data as shown in FIG. 33.

Moreover, on receiving the TCP segment from the first IP module 64, the first TCP module 63 identifies the corresponding connection from the included TCP header, and performs TCP protocol control.

The first IP module 64, second IP module 71, and third IP module 84 are network layer protocol modules to perform IP protocol control. Each IP module applies IP address for identification to a low-order network interface for accessing the network beforehand. Moreover, in a path table the IP module has, the network interface to which the IP data gram corresponding to the IP address is to be transmitted is recorded.

Specifically, the first IP module 64 applies the IP address to the first PPP module 65, the second IP module 71 applies IP addresses to the second PPP module 72 and first Ethernet module 74, and the third IP module 84 applies the IP address to the second Ethernet module 85. Additionally, the IP address applied to the first PPP module 65 is referred to as the IP address of the terminal equipment 6, and the IP address applied to the second PPP module 72 or the first Ethernet module 74 is referred to as the IP address of the router 7. Moreover, the IP address applied to the second Ethernet module 85 is referred to as the IP address of the server terminal equipment 8.

In the path table the first IP module 64 has, the first PPP module 65 is designated as the network interface addressed to the server terminal equipment 8, and in the path table the third IP module 84 has, the second Ethernet module 85 is designated as the network interface addressed to the terminal equipment 6. Moreover, in the path table the second IP module 71 has, the second PPP module 72 is designated as the network interface addressed to the terminal equipment 6, and the first Ethernet module 74 is designated as the network interface addressed to the server terminal equipment 8.

On receiving the TCP segment from the first TCP module 63, the first IP module 64 generates the IP data gram from the TCP segment, and transfers it to the first PPP module 65.

The IP data gram is constituted of the IP header and TCP segment shown in FIG. 35. Additionally, the IP header is added to the top of the TCP segment as shown in FIG. 33.

On receiving the IP data gram from the first PPP module 65, the first IP module 64 judges from the IP header included in the IP data gram whether or not the IP data gram is addressed to the terminal equipment 6. When the received IP data gram is for the terminal equipment 6, the TCP segment is extracted from the IP data gram, and transferred to the first TCP module 63. Moreover, when the IP data gram is not for the terminal equipment 6, the IP data gram is transmitted to the network interface corresponding to the address of the IP data gram by referring to the path control table.

It is judged whether or not the IP data gram is addressed to the terminal equipment 6 by judging whether or not the transmission destination IP address in the IP header is equal to the IP address allotted to the first PPP module 65.

On receiving the IP data gram for the terminal equipment 6 from the first Ethernet module 74, the second IP module 71 transfers the IP data gram to the second PPP module 72. Moreover, on receiving the IP data gram for the server terminal equipment 8 from the second PPP module 72, the IP data gram is transferred to the second Ethernet module 74. Additionally, since the function and operation of the third IP module 84 are similar to those of the first IP module 64, the description thereof is omitted.

The first PPP module 65 and the second PPP module 72 are data link protocol processing modules to execute a point to point protocol (PPP) processing therebetween.

The first PPP module 65 generates a PPP frame from the IP data gram received from the first IP module 64, and transmits the PPP frame to the radio network 9 via the first radio line access unit 66. Moreover, on receiving the PPP frame via the first radio line access unit 66, the IP data gram is extracted from the PPP frame, and the extracted IP data gram is transferred to the first IP module 64.

Similarly, the second PPP module 72 generates the PPP frame from the IP data gram received from the second IP module 71, and transmits the PPP frame to the radio network 9 via the second radio line access unit 73. Moreover, on receiving the PPP frame via the second radio line access unit 73, the IP data gram is extracted from the PPP frame, and the extracted IP data gram is transferred to the second IP module 71.

The first radio line access unit 66 and the second radio line access unit 73 access the radio network 9 to control the connection and disconnection with the radio network 9, or the data communication.

The first Ethernet module 74 and the second Ethernet module 85 have Ethernet interface apparatuses, and are processing modules to transmit/receive the data via Ethernet. Additionally, each Ethernet interface apparatus is provided beforehand with a univocal identifier (referred to as the Ethernet address) in the entire Internet.

On receiving the IP data gram for the server terminal equipment 8 from the second IP module 71, the first Ethernet module 74 generates an Ethernet frame for the second Ethernet module 85 from the IP data gram, and transmits the frame to the Internet 10. Moreover, on receiving the Ethernet frame for the first Ethernet module 74 from the Internet 10, the presence/absence of a data error in the Ethernet frame is checked. When there is no data error, the IP data gram is extracted from the Ethernet frame, and the extracted IP data gram is transferred to the second IP module 71. Moreover, when there is a data error, the Ethernet frame is discarded.

On the other hand, on receiving the IP data gram for the terminal equipment 6 from the third IP module 84, the second Ethernet module 85 generates the Ethernet frame for the first Ethernet module 74 from the IP data gram, and transmits the frame to the Internet 10. Moreover, on receiving the Ethernet frame for the second Ethernet module 85 from the Internet 10, the presence/absence of the data error in the Ethernet frame is checked. When there is no data error, the IP data gram is extracted from the Ethernet frame, and the extracted IP data gram is transferred to the third IP module 84. Moreover, when there is a data error, the Ethernet frame is discarded.

The module operations during the connection control and data communication of the conventional data communication system shown in FIG. 32 will next be described.

The connection control function and the data communication function are realized by the first TCP module 63 and the second TCP module 83, and the lower-order module simply has a function of transferring the IP data gram to the transmission destination apparatus.

Additionally, the following operations are started when the operation request for each function is sent to the first communication interface controller 62 from the first processor 61, or when the operation request for each function is sent to the second communication interface controller 82 from the second processor 81.

(1) Transmission Operation of TCP Segment:

First, the transmission operation of the TCP segment will be described in an example in which the TCP segment is transmitted to the second TCP module 83 from the first TCP module 63. Additionally, the first IP module 64 and the third IP module 84, the first PPP module 65 and the second PPP module 72, the first radio line access unit 66 and the second radio line access unit 73, and the first Ethernet module 74 and the second Ethernet module 85 operate mutually symmetrically. Therefore, when the TCP segment is transmitted to the first TCP module 63 from the second TCP module 83, the operation described below is replaced.

First, on receiving the TCP segment for the server terminal equipment 8 from the first TCP module 63, the first IP module 64 generates the IP data gram from the received TCP segment, and transfers the TCP segment to the first PPP module 65. The IP data gram is constituted of IP header and received TCP segment. As shown in FIG. 35, the IP address of the terminal equipment 6 is stored in a transmission source IP address field (Source IP address) of the IP header, the IP address of the server terminal equipment 8 is stored in a transmission destination IP address field (Destination IP address), and a value for identifying the TCP is stored in a protocol field (Protocol).

On receiving the IP data gram from the first IP module 64, the first PPP module 65 generates the PPP frame from the received IP data gram, and transfers the PPP frame to the first radio line access unit 66. A frame check sequence for detecting the data error is added to the PPP frame. The PPP frame transferred to the first radio line access unit 66 is transferred to the second PPP module 72 via the radio network 9 and the second radio line access unit 73.

On receiving the PPP frame, the second PPP module 72 calculates the frame check sequence, and checks the presence/absence of the data error in the PPP frame. When there is no data error, the IP data gram is extracted from the PPP frame, and the extracted IP data gram is transferred to the second IP module 71.

On receiving the IP data gram, the second IP module 71 checks the value of the destination IP address field of the IP header. Here, since the IP address of the server terminal equipment 8 is stored in the destination IP address field, the IP data gram is transferred to the first Ethernet module 74.

The IP data gram transferred to the first Ethernet module 74 is transferred to the third IP module 84 via the Internet 10 and the second Ethernet module 85.

On receiving the IP data gram, the third IP module 84 checks the value of the destination IP address field in the IP header. Here, since the IP address of the server terminal equipment 8 is stored in the destination IP address field, it is recognized that the IP data gram is addressed to the server terminal equipment 8. Moreover, since the value of the protocol field in the IP header is a TCP identifier value, the TCP segment is extracted from the IP data gram, and the extracted TCP segment is transferred to the second TCP module 83.

(2) TCP Basic Operation:

The basic operation common to the TCP modules, and a method of utilizing the TCP header in the TCP segment will next be described.

As described above, the connection is set between two sockets in the TCP, and the TCP segment is transmitted/received between the two sockets of each connection. Therefore, the information for identifying the corresponding connection is necessary for all the TCP segments.

The correspondence of the TCP segment and the connection is identified by storing the socket port number of the source in a source port number field (Source port number) in the TCP header of the TCP segment, and storing the socket port number of the destination in a destination port number field (Destination port number). Moreover, the correspondence is identified by storing the IP address of the source socket in the source IP address field (Source IP address) in the IP header of the IP data gram, and storing the IP address of the destination socket in the destination IP address field (Destination IP address).

Specifically, when the IP address of one socket S1 of the arbitrary connection is set to A1, its port number is P1, the IP address of the other socket S2 is A2, its port number is P2, the TCP module of the apparatus with the socket S1 present therein is TCP module M1, and the TCP module of the apparatus with the socket S2 present therein is TCP module M2, and when the TCP segment is transmitted to the TCP module M2 from the TCP module M1, the TCP module M1 generates the TCP segment in which P1 is stored in the source port number field in the TCP header and P2 is stored in the destination port number field. Furthermore, the IP module generates the IP data gram in which A1 is stored in the source IP address field in the IP header and A2 is stored in the destination IP address field.

The TCP module M2 having received the IP data gram including the TCP segment judges from the value P1 of the source port number field in the TCP header, value P2 of the destination port number field in the TCP header, value A1 of the source IP address field in the IP header, and value A2 of the destination IP address field in the IP header that the received TCP segment corresponds to the connection constituted of a pair of sockets S1 and S2.

Moreover, the TCP also handles the loss of the TCP segment by the transmission acknowledgment function and re-sending function.

In the transmission acknowledgment function of the TCP segment, the sequence number field (Sequence number) of the TCP header of the TCP segment to be transmitted, acknowledgment flag field (A) of the TCP header of the TCP segment returned from the reception side and acknowledgment number field (Acknowledgment number) are used.

When the application data or the control information is transmitted to the TCP module M2 from the TCP module M1, the TCP module M1 applies the number to the application data received from the processor for each connection by one byte unit in order (this number is referred to as the sequence number). When the TCP segment is transmitted to the TCP module M2, the sequence number of top sub-application data is stored in the sequence number field of the TCP header.

The TCP module M2 judges the position of the received sub-application data from the top from the value of the sequence number field of the TCP header of the received TCP segment, and the size of the sub-application data included in the TCP segment.

The TCP module M2 records the history of the sequence number of the received sub-application data for each connection, and judges from the history whether the received sub-application data is already received data or newly received data.

Moreover, on receiving the new sub-application data, the TCP module M2 stores the value obtained by adding 1 to the sequence number of the last received sub-application data (the sequence number of non-received sub-application data first appearing as seen from the top) to the acknowledgment number field of the TCP header. Furthermore, the TCP segment with the acknowledgment flag field set to "set" is returned to the TCP module M1.

When the acknowledgment flag field of the TCP header is set to "set", the TCP module M1 can know success in transmission up to the sub-application data of sequence number X−1 by referring to the value (set to X) of the acknowledgment number field. Such transmission acknowledgment method is referred to as accumulation acknowledgment method.

Moreover, the TCP module M1 starts a re-sending timer during the transmission of the TCP segment. When the transmission acknowledgment of the transmitted TCP segment can be made until the expire of the re-sending timer, the corresponding re-sending timer is stopped, and the transmission processing of the TCP segment is completed. When the re-sending timer is expired without notification of the TCP segment transmission acknowledgment, it is judged that the TCP segment transmission has failed, and the sub-application data transmission is restarted from the top of the sub-application data to be transmitted with the TCP segment.

The transmission acknowledgment function and re-sending function of the TCP module have been described above in the example of the transmission operation of the TCP segment including the application data, but also when the TCP segment including no application data and transmitting control information (e.g., the TCP segment of the connection opening request) is transmitted, the similar processing is executed by assuming that the sub-application data is included in the TCP segment.

Furthermore, the conventional data communication system is provided with a flow control function of notifying the empty capacity of a received data buffer to the TCP module on the transmission side from the TCP module on the reception side to control the transmission discontinuation, or transmission resuming of the TCP segment by the TCP module on the transmission side. The empty capacity of the received data buffer is stored in a widow size field (Window size) of the TCP header of the TCP segment to be transmitted.

On receiving the TCP segment from the TCP module M1, the TCP module M2 refers to the window size field of the TCP header. In this case, when the value of the window size field is zero, the application data transmission is discontinued. When the value of the window size field is not zero, the sub-application data, in which the value of the window size field is an upper limit size, is transmitted.

(3) Connection Opening Operation (Connection Active Opening, Connection Passive Opening Point Generation, Connection Passive Opening):

The connection opening operation of the conventional data communication system will next be described with reference to FIG. 36.

When the connection is opened to the second processor 81 from the first processor 61, first the second processor 81 generates a socket (S2) for data communication, and applies a predetermined port number (P2) to the socket. Subsequently, the second communication interface controller 82 is requested to generate a connection passive opening point, the socket S2 is changed to a passive socket, connection passive opening is requested and the second processor 81 itself is allowed to wait for the connection opening by the socket S2.

When the second communication interface controller 82 is requested to generate the connection passive opening point for the socket S2 and perform the connection passive opening, the apparatus notifies this to the second TCP module 83. The second TCP module 83 allows the socket S2 to wait for the connection passive opening.

On the other hand, the first processor 61 generates a socket (S1) for data communication, designates the IP address and port number P2 of the server terminal equipment 8 through the socket S1, and requests the first communication interface controller 62 to perform the connection active opening to the socket S2.

When the connection active opening to the socket S2 is requested, the first communication interface controller 62 records the relation of the sockets S1 and S2, and makes a request to the first TCP module 63 for the connection active opening to the socket S2.

On receiving the request for the connection active opening to the socket S2, the first TCP module 63 generates the initial value (X1) of the sequence number. When there is no designation of the port number to the socket S1 at this point of time, the unused port number is set to the port number (P1) of the socket S1.

Furthermore, the first TCP module 63 generates TCP segment A1 for requesting the connection opening, and transfers the generated TCP segment A1 to the second TCP module 83. The TCP segment A1 is constituted only of the TCP header, P1 is stored in the source port number field of the TCP header, P2 is stored in the destination port number field, and X1 is stored in the sequence number field. Moreover, a synchronization flag field (S) is set to "set".

On receiving the TCP segment A1 from the first TCP module 63, the second TCP module 83 confirms the value (P2) of the destination port number field of the TCP header included in the TCP segment A1, and the synchronization flag field ("set"), and judges that there is a request for connection to the socket S2.

Since the socket S2 waits for the connection passive opening, the second TCP module 83 generates the initial value (X2) of the sequence number, generates TCP segment A2 for notifying the transmission acknowledgment of the TCP segment A1 and for requesting the connection opening and transfers the segment to the first TCP module 63.

The TCP segment A2 is constituted only of the TCP header, P2 is stored in the source port number field of the TCP header, P1 is stored in the destination port number field, and X2 is stored in the sequence number field. Moreover, the synchronization flag field and the acknowledgment flag field are both set to "set", and X1+1 is stored in the acknowledgment number field.

On receiving the TCP segment A2 from the second TCP module 83, the first TCP module 63 confirms the value (P1) of the destination port number field of the TCP header of the TCP segment A2, the synchronization flag field ("set"), the acknowledgment flag field ("set"), and the value (X1+1) of the acknowledgment number field, and judges that the received TCP segment A2 notifies the transmission acknowledgment of the TCP segment A1, and that the request for connection opening is made by the second TCP module 83.

Subsequently, the first TCP module 63 transfers TCP segment A3 for notifying the transmission acknowledgment of the TCP segment A2 to the second TCP module 83. The TCP segment A3 is constituted only of the TCP header, P1 is stored in the source port number field of the TCP header, P2 is stored in the destination port number field, X1 is stored in the sequence number field, the synchronization flag field and the acknowledgment flag field are both set to "set", and X2+1 is stored in the acknowledgment number field.

On receiving the TCP segment A3 from the first TCP module 63, the second TCP module 83 confirms the value (P2) of the destination port number field of the TCP header included in the TCP segment A3, the acknowledgment flag field ("set"), and the value (X2+1) of the acknowledgment number field, and judges that the TCP segment A3 notifies the transmission acknowledgment of the TCP segment A2, and that the connection opening is confirmed with the first TCP module 63.

The second TCP module 83 further duplicates a connection terminal point having the same port number, and notifies the second communication interface controller 82 of the connection terminal point and the connection passive opening completion.

With the notification of the connection opening, the second communication interface controller 82 generates a new socket (socket S3) to the connection terminal point, and notifies the second processor 81 of the socket S3 and the connection passive opening completion.

In this case, the connection is opened between the socket S1 and the socket S3, and the second processor 81 has access to the connection including not only the socket S2 but also the socket S3. Moreover, the socket S2 is returned to the state of waiting for the connection passive opening. The duplicating operation of the socket S2 is a processing performed so that the data communication can simultaneously be performed with a plurality of apparatuses. Since the socket S2 waits for the connection passive opening, the connection opening requests from the other apparatuses can be handled.

(4) Connection End Operation:

The connection close operation of the conventional data communication system will next be described with reference to FIG. 37.

In the TCP, the end processing is performed in each direction in which the TCP segment is transmitted, and the connection close processing is completed at the time the end processing is completed. The connection close processing is executed in response to a request for the end processing from the processor as the transmission source.

The connection close operation to the second processor 81 from the first processor 61 is started in response to the connection close request which is sent to the first communication interface controller 62 from the first processor 61.

On receiving the connection close request, the first communication interface controller 62 notifies the first TCP module 63 of the socket identifier and the connection close request. On receiving the connection close request, the first TCP module 63 generates a TCP segment B1 for ending the connection to the socket, and transfers the TCP segment B1 to the second TCP module 83. For the TCP segment B1, in addition to the setting of each field of the usual TCP header, an end flag field (F) is set to "set".

On receiving the TCP segment B1 from the first TCP module 63, the second TCP module 83 confirms the end flag field ("set") of the TCP header included in the TCP segment B1, and judges that the TCP segment B1 indicates the connection close request.

Subsequently, the second TCP module 83 generates a TCP segment B2 for notifying the transmission acknowledgment of the TCP segment B1, and transfers the TCP segment B2 to the first TCP module 63.

On receiving the TCP segment B2, the first TCP module 63 confirms the transmission acknowledgment of the TCP segment B1, and completes the connection close operation to the second processor 81 from the first processor 61.

Additionally, the connection close operation to the first processor 61 from the second processor 81 is similarly performed by replacing the operation subject of the connection close operation to the second processor 81 from the first processor 61.

(5) Data Transmission/Reception Operation (Data Transmission Function, Data Reception Function):

The data transmission/reception operation of the conventional data communication system will next be described in an example in which the application data is transmitted to the second processor 81 from the first processor 61 through the connection constituted of the socket S1 of the terminal equipment 6 and the socket S2 of the server terminal equipment 8.

First, when the first processor 61 transfers the application data and the data transmission request to the first communication interface controller 62 through the socket S2, the first communication interface controller 62 stores the application data in a transmission data buffer corresponding to the socket S2, and sends the data transmission request to the first TCP module 63.

The first TCP module 63 cuts the sub-application data for a maximum segment size (MSS) out of the top of the transmission data buffer, applies the TCP header to the top of the cut sub-application data and generates the TCP segment, and transmits the segment to the second TCP module 83.

The above-described processing is repeated until the application data in the transmission data buffer is eliminated, the size of the application data without the transmission acknowledgment reaches the transmission window size, or until the flow control is executed by the notification of shortage of the received data buffer empty capacity from the second TCP module 83.

The MSS is a value obtained by subtracting the TCP header size and IP header size from a maximum transfer unit (MTU) which can be transmitted by the low-order network interface at once. In the above-described example, since the MTU of the PPP module is 1500 bytes, and the size of each of the TCP header and the IP header is 20 bytes, the MSS becomes 1460 bytes.

On receiving the TCP segment, the second TCP module 83 identifies the corresponding connection from the value of the source port number field and the value of the destination port number field in the TCP header, and transfers the received application data to the second communication interface controller 82 as the received data corresponding to the socket S2.

The second communication interface controller 82 stores the received application data in the received data buffer corresponding to the socket S2. The application data stored in the received data buffer is transferred to the second processor 81 in response to the data reception request to the second communication interface controller 82.

Additionally, in the conventional data communication system, for the loss of the TCP segment and the change of the arrival order which are caused during the transmission/reception of the application data, or the duplicated arrival of the TCP segment, reliable data transfer is realized by the following processing.

As described above, the transmission acknowledgment of the transmitted TCP segment is mutually performed between the first TCP module 63 and the second TCP module 83. When the TCP segment is received, the context of each sub-application data can be known from the value of the sequence number field of the TCP header.

When the second TCP module 83 receives the sub-application data subsequent to the already received sub-application data, the sub-application data is transferred to the second communication interface controller 82 as it is. Moreover, when the sub-application data after some data is received instead of the subsequent sub-application data, the sub-application data is temporarily held together with the sequence number. Subsequently, when the sub-application data for filling the interval is received, the sub-application data is transferred to the second communication interface controller 82 together with the held data. Additionally, when the already received sub-application data is resent, the sub-application data is discarded. The order control and duplication control are performed in this manner.

Moreover, the first TCP module 63 detects the loss of the TCP segment by the re-sending timer, and the loss of the TCP segment is recovered by re-sending the TCP segment with the expired re-sending timer.

In the data communication system shown in FIG. 32, a round trip time (RTT) from the transmission of the TCP segment until the return of the TCP segment including the transmission acknowledgment usually changes with the fluctuation of the processing load in the router 7. Therefore, when the timeout value of the re-sending timer is fixed, the processing load of the router fluctuates. When the value of RTT becomes larger than the fixed value, wasteful re-sending occurs. Moreover, when the fixed value is set to a larger value, much time is required for detecting the loss of the TCP segment.

On the other hand, in the data communication system using the conventional TCP/IP, the transmission acknowledgment procedure on and after the connection opening comprises measuring RTT between the TCP modules, and again setting the timeout value of the re-sending timer from the average value of RTT and its dispersion average based on the measured value. Thereby, the timeout value of the re-sending timer is set to an optimum value which dynamically corresponds to the change of RTT.

Moreover, in the data communication system using the TCP/IP, when the conventional TCP segment loss is detected by assuming the TCP segment loss as the discard of the TCP segment by router congestion, the TCP module once lowers the projection speed of the TCP segment to reduce the router processing load, and subsequently increases the speed gradually, which is a technique called slow start. Specifically, the TCP module sets a congestion window in addition to a transmission window for normal transmission flow control, and sets a smaller value of the transmission and congestion windows as the window size for the transmission.

On detecting the TCP segment loss, the TCP module sets the size of the congestion window to one MSS and re-sends the TCP segment. Thereafter, every time a new transmission acknowledgment is notified, the size of the congestion window is increased by MSS, and the congestion window size exceeds the half of the original transmission window size. Then, every time the transmission acknowledgment of the sub-application data for the congestion window size is notified, the congestion window size is increased by MSS.

By performing this processing, the router processing load having caused the congestion is reduced, the congestion is eliminated, and the router is prevented from being again placed in the congested state by the re-sending.

Moreover, the data communication system using the conventional TCP/IP is further provided with a push request function of instantly transmitting the application data transferred to the communication interface controller in response to the data transmission request to the reception-side processor without accumulating the data in the transmission-side transmission data buffer, transmission-side TCP module, or reception-side TCP module during the transmission of the application data.

In TCP specification, a timing at which the transmission-side TCP module having received the data transmission request extracts and transmits the application data from the transmission data buffer, or a timing at which the reception-side TCP module transfers the received application data to the processor is not defined. Therefore, even when the data transmission request is received, a processing comprising not transmitting the application data stored in the transmission data buffer until the size exceeds a predetermined size, a processing comprising not transferring to the processor even the received application data having no loss and being able to be transferred to the processor until the size exceeds the predetermined size, and the like can be performed.

The push request is a function of allowing the transmission-side TCP module to instantly transmit the application data stored in the transmission data buffer, and allowing the reception-side TCP module to transfer to the processor all the application data that can be transferred to the processor among the received application data.

The notification of the push request transmitted to the reception-side TCP module from the transmission-side TCP module is realized by using a push flag field (P) in the TCP header. The push flag field is set to either "set" or "non-set". However, many of the existing communication interface controllers are not provided with interfaces for accepting the push request to the processor. In this case, no explicit push request is notified even to the TCP module, but during the transmission of the application data to empty the transmission data buffer, the value of the push flag field of the TCP header of the TCP segment including the application data is set to "set".

Moreover, the TCP has a data transmission mode called an urgent mode separately from the usual data transmission. The urgent mode is realized by inserting data called urgent data into a series of application data string transmitted from one TCP module M1. In this case, the other TCP module M2 identifies the urgent data inserted in the series of application data string received from the TCP module M1, and notifies the processor via the communication interface controller that the urgent has been received. However, the processing of the received urgent data is not defined (relies on the reception side).

The notification of the urgent mode is performed by a TCP segment unit, and an urgent flag field (U) and urgent data pointer field (Urgent pointer) of the TCP header are used. The urgent flag field is set to either "set" or "non-set". When the field is "set", the TCP segment includes the urgent data, and it is indicated that the urgent data pointer field is used. The urgent data pointer field is used only when the urgent flag field is "set", and its value indicates an offset value to the last one byte of the urgent data from the top of the application data included in the TCP segment.

Additionally, in the data communication system, it is preferable not only to enhance the throughput (value obtained by dividing the size of the application data to be transferred by "transfer time"), but also to enhance the utilization efficiency of communication resources (communication efficiency). When the limited communication resource is utilized to process a plurality of data communication requests, and when the communication efficiency is high, the throughput of the entire data communication is accordingly enhanced.

However, in order to utilize the Internet for the communication of the application data, the control by the protocol such as TCP and IP is necessary, the application data is divided to data groups (sub-application data) in which the MSS is an upper limit, the data is converted to a packet with TCP header and IP header applied to each sub-application data, and the communication is performed through the network. Furthermore, when the packet is lost before reaching the reception-side TCP module, the application data included in the lost packet is again packeted and transmitted by the control of the transmission-side TCP module. In this manner, for the communication of the target application data, the size of the data to be transmitted becomes larger than the size of the application data.

One scale for measuring the communication efficiency of the application data is a ratio of "the total amount of data sizes to be actually transmitted" to "the size of the application data". The smaller the ratio is, the higher the communication efficiency becomes.

In the end—end communication, the entire throughput can be enhanced by enhancing the communication efficiency of the link which bottlenecks the throughput. When this concept is applied to the mobile computing or the remote access, the throughput of the access link (line presented by the radio network 9. This is a telephone line in a remote access environment) usually bottlenecks the throughput of the end—end communication. Therefore, the enhancing of the communication efficiency of the access link is effective for enhancing the throughput of the end—end communication.

In order to enhance the communication efficiency of the access link, it is proposed to reduce the sizes of the TCP header and IP header, reduce the data size to be transmitted for recovering the packet loss, introduce the flow control and to optimize the communication data amount required for the control.

One example of the data communication system to enhance the communication efficiency is described in RFC 1144 of the U.S. IETF. In the data communication system described in this document, in apparatuses at both ends of the telephone line in the remote access environment, the communication efficiency of the application data is enhanced by reducing redundant information included in each header of the TCP/IP packet. This technique is usually called VJ header compression. In the apparatuses (corresponding to the terminal equipment 6 and the router 7 in FIG. 32) at both terminal points connected via the telephone line, first all fields of each header of the TCP/IP packet are transmitted to the other apparatus from one apparatus, and subsequently the size of each header is compressed in the following technique. Specifically, a new local connection identifier is newly set to identify the connection corresponding to the TCP/IP packet to be transmitted, and the information of the connection identifier is stored in the header of the packet to be transmitted. Subsequently, the four fields which have been utilized to identify the connection (the source port number field of the TCP header, the destination port number field, the source address field of the IP header, and the destination IP address field) are deleted. Moreover, for the other fields of each header of the TCP/IP packet, the field whose content is not changed until the connection close is deleted. For the field whose content is changed, a difference between the value of the field with the changed content and the value of the previously transferred field is transmitted. Additionally, when the packet is lost, the TCP/IP packet including all the headers is transmitted, thereby synchronizing both states.

By the above-described technique, the redundant information is reduced, and the transfer efficiency of the application data is enhanced.

In the above-described conventional data communication method, however, the following problems are caused.

A first problem is that the communication efficiency in the access link is largely deteriorated by the overhead of the TCP header and IP header.

This is because a redundant field or redundant information exists in each header field in the data communication system using the conventional TCP/IP.

Examples of the redundant field include the urgent data flag field of the TCP header, the urgent data pointer field, and the like. These fields are used only during the transport of the urgent data, but are included in the TCP header also during the transport of the usual application data.

Moreover, during connection control, the sequence number field or the acknowledgment number field in the TCP header as the field for data communication control, and the window size field are also redundant fields.

Furthermore, examples of the redundant information include the sequence number. Each of the sequence number field and the acknowledgment number field is constituted of four bytes, and is used to identify the application data included in the TCP segment, or the application data whose accumulated transmission is to be acknowledged. However, four bytes are not necessarily required for identifying the application data.

Additionally, the size able to be held in the received data buffer to realize the flow control is stored in the window size field of the TCP header for use in the flow control. However, while the flow control is unnecessary, that is, while a sufficient storage capacity is present in the received data buffer, the size able to be held in the received data buffer does not need to be reported to the transmission side.

Moreover, during the connection control, the source port number and destination port number in the TCP header, the source IP address in the IP header and the destination IP address are also redundant information. These are used to identify the connection, but when limiting to a certain link terminal interval, these information do not need to be always incorporated in the header.

Moreover, after the connection is established, the version number field (Ver.) and protocol field of the IP header do not change until the connection closes. Therefore, the fields are unnecessary after the connection is established.

Additionally, in the VJ header compression, with respect to the sequence number information and acknowledgment number information, the data size is compressed by sending a difference of the sequence number and acknowledgment number transmitted before, but the data size for sending these information depends on the magnitude of the difference value. When the value of 1 to 255 is transmitted, one byte is sufficient. When the value of 256 to 65534 is transmitted, however, three bytes are necessary.

Moreover, for the window size information, the data size is compressed by transmitting the difference from the previously transmitted window size, but the difference has to be transmitted every time the window size to be notified changes. Furthermore, when the packet loss occurs, the packet transmitted immediately after the loss needs to include all the fields of the TCP header and IP header. Therefore, when the occurrence frequency of the packet loss increases, the effect of the header compression lowers.

Particularly, during the connection opening and during the connection close, since nothing is executed in the VJ header compression technique, all the fields of the TCP header and IP header need to be transmitted.

A second problem is that when the packet is lost, the influence of the communication efficiency deteriorated by the packet re-sending is exerted on other section, and the communication efficiency of the other section is deteriorated.

The reason is that in the data communication system using the conventional TCP/IP, since the re-sending because of the packet loss is performed in an end—end manner, the resent packet is transmitted in both an access link section and other sections.

A third problem is that when the re-sending is performed because of the packet loss in the access link section, the throughput is lowered by the TCP congestion control.

The reason is that in the data communication system using the conventional TCP/IP, when the packet loss is detected, the transmission-side TCP module suppresses transmission traffic by slow start to solve the congestion. However, since the packet loss in the access link has no relation to the congestion in the network, the packet transmission suppression by the slow start has no effect, and the throughput is lowered by suppressing the traffic.

A fourth problem is that the transfer efficiency is deteriorated by delay increase or more with respect to the delay increase of packet transfer in the access link.

The reason is that in the data communication system using the conventional TCP/IP, the timeout value of the re-sending timer utilized during the transmission acknowledgment is set based on the RTT value till then, but assuming that delay fluctuation depends on the congested state (processing load state) of the router in the network. Specifically, the RTT fluctuation correlates with the past RTT fluctuation history. When the router processing load increases, the RTT also increases on average. When the router processing load decreases, the RTT also decreases on average.

However, when the cause for delay increase in the access link has no relation to the congestion, the delay fluctuation property is different from the property presumed in the above-described TCP. Therefore, the fluctuation property has no relation to the past RTT fluctuation history. This causes the incorrect detection of the packet loss and the subsequent wasteful re-sending processing, the unnecessary packet transmission suppression by the application of slow start, and the like.

For example, a radio line is used in the access link, and the packet error control is performed by re-sending with the data link protocols at both ends of the access link. In this case, when a packet error occurs by radio line quality deterioration such as phasing, the error control is performed by re-sending with the data link protocol. Therefore, the packet transfer delay increases when seen from the TCP. However, the fluctuation property of the delay is different from that of the congestion, and depends on the occurrence timing of a bit error by phasing. Therefore, delay time depends on the occurrence degree of the bit error and the error control system in the data link protocol.

A fifth problem is that when the packet is lost in the access link, the time dependent on the RTT till then is required for detecting the packet loss. Therefore, the detection time of the packet loss increases more than necessary, and the throughput is lowered.

The detection of the packet loss in the TCP requires time from when the packet is transmitted until the re-sending timer times out. The timeout time depends on the RTT value till then, and has a larger value than the RTT average value. For example, when the application data is transferred in a burst manner, and when the packet is lost in the access link, the packet loss can be detected in a shorter time than the time for RTT on the reception side of the access link, but the packet cannot be resent until the re-sending timer times out. Therefore, even when the transmission of the TCP segment for the transmission window size is completed until the timeout of the re-sending time, the communication efficiency is deteriorated. Because the application data transmission is stopped from when the last TCP segment transmission is completed until the re-sending timer times out.

A sixth problem is that when the packet re-sending is performed, even the packet having succeeded in transmission is sometimes resent, and the communication efficiency is deteriorated more than necessary.

The reason is that the transmission acknowledgment in the TCP is performed by the above-described accumulation acknowledgment method, but in this method, the sequence number of the first appearing non-received application data is notified among the application data transmitted from the transmission-side TCP module. Therefore, the transmission-side TCP module cannot know the reception situation on and after the non-received application data.

Moreover, when the re-sending timer times out in the transmission-side TCP module, the transmission-side TCP module basically retransmits the application data on and after the corresponding TCP segment, and the application data having succeeded in transmission is also resent. It is wasteful to re-send the application data which has succeeded in transmission.

SUMMARY OF THE INVENTION

The present invention has been developed to solve the above-described problems of the conventional technique, and an object thereof is to provide a data communication method and a data communication system which minimize the overhead of a packet header to enhance the communication efficiency.

Moreover, another object of the present invention is to provide a data communication method and a data communication system which suppress a drop in throughput in end—end communication even when packet loss occurs in access link.

In order to attain the above-described objects, according to a first aspect of the present invention, there are provided a data communication method and a data communication system comprising preparing beforehand a message provided with a dedicated header having information necessary for each control which is required to perform data communication, and exchanging the message between a terminal equipment and an interconnecting installation to transmit/receive desired data.

In this case, the message includes connection identifier information for identifying connection which is a virtual channel set between the terminal equipment and the interconnecting installation, and the message may comprise:

a passive opening message for requesting a passive opening of the connection;

an active opening message for requesting an active opening of the connection;

an establishment message for notifying connection establishment for the connection passive opening request or the connection active opening request made in the past;

a close message for requesting close of the connection; and a reply message which is reply notification to the received message.

The message includes connection identifier information for identifying connection which is a virtual channel set between the terminal equipment and the interconnecting installation, and the message may comprise:
- a data message which is desired data transmitted/received between the terminal equipment and the interconnecting installation;
- an acknowledgment message for use in transmission acknowledgment of the data message;
- a reception disable message for use in flow control of the data message, and for requesting transmission discontinuation of said data message; and
- a reception enable message for use in the flow control of the data message, and for requesting transmission resuming of the discontinued data message.

Moreover, according to the present invention, there are provided another data communication method and data communication system comprising:
- re-sending a packet between the terminal equipment and the interconnecting installation when the packet as a data transmission unit is lost between the terminal equipment and the interconnecting installation; and
- re-sending the packet between a server terminal equipment and the interconnecting installation when the packet is lost between the server terminal equipment and the interconnecting installation.

Moreover, the method and system comprise:
- adding order number information indicating data transmission order to the data to be transmitted, and starting a re-sending timer for detecting the presence/absence of a reply to the data on a data transmission side in the terminal equipment and the interconnecting installation;
- returning reply information including the order number information of the received data and indicating reception of the data to the data transmission side on a data reception side; and
- re-sending the data corresponding to the re-sending timer which has expired on the data transmission side.

Furthermore, the method and system comprise:
- adding order number information indicating data transmission order to the data to be transmitted on a data transmission side in the terminal equipment and the interconnecting installation;
- returning acknowledgment information including a judgment result, which is obtained by judging the presence/absence of transmission failure from a missing number of the order number information, to the data transmission side on a data reception side; and
- re-sending data having failed in transmission based on the acknowledgment information on the transmitted data on the data transmission side.

In this case, the data transmission side may re-send the data having failed in transmission based on the acknowledgment information on the transmitted data, and return the return information indicating the re-sending of the data to the data reception side, and the data reception side may discontinue the transmission of the next acknowledgment information until the return information is received.

Moreover, the data reception side may return the acknowledgment information to the data transmission side in case when a predetermined number of data are received, return the acknowledgment information to the data transmission side in case when loss of the received data is detected, return the acknowledgment information to the data transmission side in case when a predetermined time elapses from the returning of the previous acknowledgment information, or may return the acknowledgment information to the data transmission side in case when either one of the conditions is satisfied.

In the above-described data communication method and data communication system, the message having the dedicated header comprising information necessary for each control is prepared in each control necessary for data communication, and the message is exchanged between the terminal equipment and the interconnecting installation to transmit/receive the desired data, so that the header overhead decreases, and the amount of transmitted data is reduced.

Moreover, the packet is resent between the terminal equipment and the interconnecting installation when the packet is lost between the terminal equipment and the interconnecting installation, and the packet is resent between the server terminal equipment and the interconnecting installation when the packet is lost between the server terminal equipment and the interconnecting installation, so that no influence of communication efficiency deterioration by the packet re-sending is exerted to a section in which no packet loss occurs.

Moreover, in the terminal equipment and the interconnecting installation, the data transmission side adds the order number information indicating the transmission order to the data to be transmitted, the data reception side judges the presence/absence of transmission failure from the missing number of the order number information, and returns the acknowledgment information including the judgment result to the data transmission side, and the data transmission side re-sends the data having failed in transmission based on the acknowledgment information on the transmitted data, so that the time required for the detection of the packet loss occurring between the terminal equipment and the interconnecting installation is shortened.

Furthermore, the data transmission side re-sends the data having failed in transmission based on the acknowledgment information on the transmitted data, and returns the return information indicating the re-sending of the data to the data reception side, and the data reception side discontinues the transmission of the next acknowledgment information until the return information is received, so that the duplicated transmission of the acknowledgment information is prevented.

Since the present invention is constituted as described above, the following effects are provided.

A first effect is that since the overhead of the packet header transmitted with the access link decreases, and the data amount transmitted with the access link is reduced, the throughput during data transmission between the terminal equipment and the server terminal equipment is enhanced.

The reason is that by providing the message having the header dedicated for each of the data communication functions (connection opening, connection close, data transfer, transmission acknowledgment, flow control, and the like), and using the messages as occasion demands, the packet transmitted with the access link includes no unnecessary information, and the overhead of each message header becomes smaller than the total size of the conventional TCP header and IP header.

Moreover, by using the connection identifier to identify the apparatus connected to the access link, the data size of the information for identifying the connection is reduced.

Furthermore, by identifying the application data by the message unit, the data size of the information for identifying the application data transmitted with the access link is reduced.

A second effect is that with respect to the packet loss generated in the access link section or the section other than the access link, no influence of communication efficiency deterioration by packet re-sending is exerted over the section in which no packet loss occurs. As a result, the throughput of end—end communication during packet loss is improved.

The reason is that in the conventional art the resent packet is transmitted in both the access link section and the section other than the access link, but in the present invention the packet re-sending is performed independently in the access link section and the section other than the access link.

A third effect is that when the re-sending is performed because of the packet loss occurring in the access link, the deterioration of communication efficiency by the congested or packed control does not occur. As a result, the throughput of end—end communication is improved when the packet loss occurs in the access link.

The reason is that in the present invention no congested or packed control is performed with respect to the re-sending because of the packet loss in the access link section.

A fourth effect is that with respect to the fluctuation of packet transmission delay in the access link the transmission efficiency is not deteriorated for the fluctuation or more. As a result, the throughput of end—end communication is improved against the increase of the packet transmission delay.

The reason is that the packet loss detection is performed based on the notification from the object side by the acknowledgment information, and the notification is not issued in a duplicated manner.

A fifth effect is that the time required for the detection of the packet loss generated in the access link is shortened. As a result, the throughput of end—end communication is improved with respect to the packet loss.

The reason is that the packet loss detection is based on the notification from the communication object side.

A sixth effect is that since only the lost packet is resent for the packet loss in the access link, no wasteful re-sending is avoided, so that the throughput of end—end communication is improved.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 4 is a diagram showing messages concerning connection control for use in the first embodiment of the data communication system of the present invention, FIG. 5 is a table diagram showing one constitution example of a connection terminal point control table of a first storage unit of the first embodiment of the data communication system of the present invention, FIG. 6 is a table diagram showing one constitution example of a connection relay point control table of a second storage unit of the first embodiment of the data communication system of the present invention, FIG. 15 is a diagram showing messages for data communication for use in the third embodiment of the data communication system of the present invention, FIG. 16 is a table diagram showing one constitution example of the connection terminal point control table of the first storage unit of the third embodiment of the data communication system of the present invention, FIG. 17 is a table diagram showing one constitution example of the connection relay point control table of the second storage unit of the third embodiment of the data communication system of the present invention, FIG. 23 is a diagram showing the messages for data communication for use in the fourth embodiment of the data communication system of the present invention, FIG. 25 is a diagram showing the data communication messages for use in a fifth embodiment of the data communication system of the present invention, FIG. 26 is a table diagram showing one constitution example of the connection terminal point control table of the first storage unit of the fifth embodiment of the data communication system of the present invention, FIG. 27 is a table diagram showing one constitution example of the connection relay point control table of the second storage unit of the fifth embodiment of the data communication system of the present invention.

DETAILED DESCRIPTION OF THE PREFERRED EMBODIMENTS

1. First Embodiment

A first embodiment of the present invention will next be described in detail with reference to the drawings.

The function of the data communication system is broadly divided into the following three. Specifically, they are a connection opening function, a connection close function, and a data communication function. Among these three functions, the connection opening function and connection close function as connection control functions will be described in the first embodiment.

Figure 1:
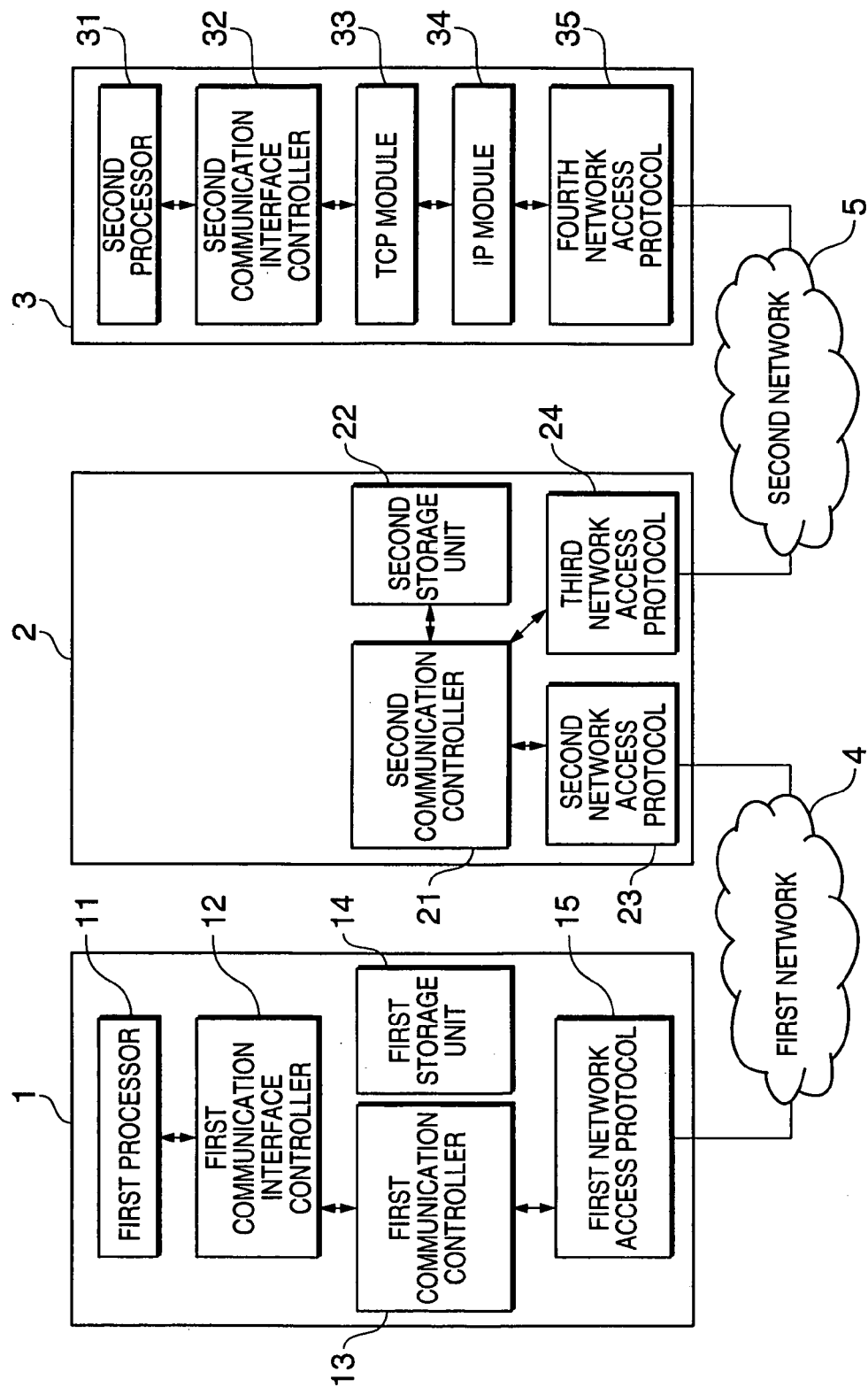
FIG. 1 is a block diagram showing one constitution example of a data communication system of the present invention.
Figure 2:
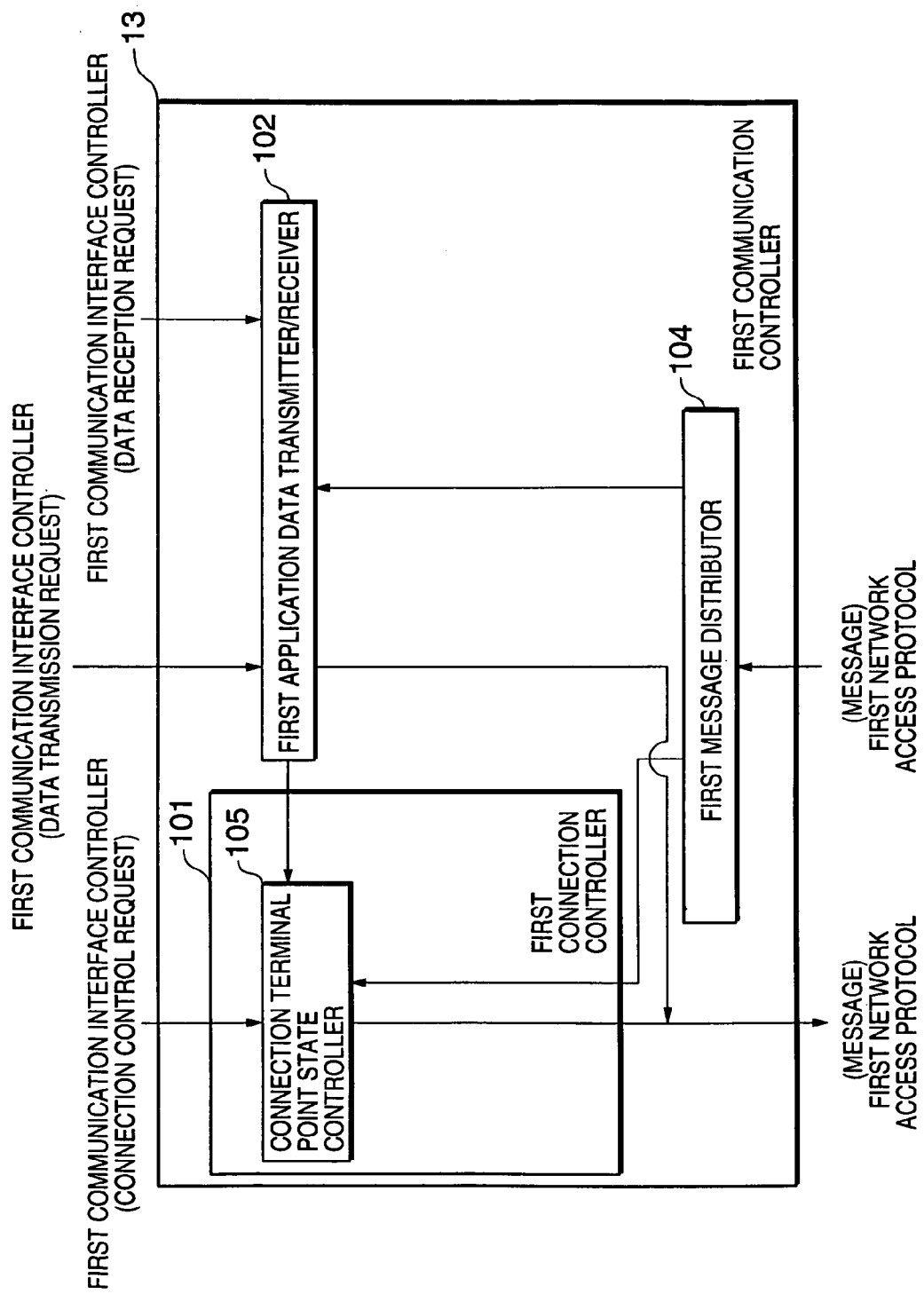
FIG. 2 is a diagram showing the constitution of a first embodiment of the data communication system of the present invention, and is a block diagram showing the constitution of a first communication controller shown in FIG. 1.
Figure 3:
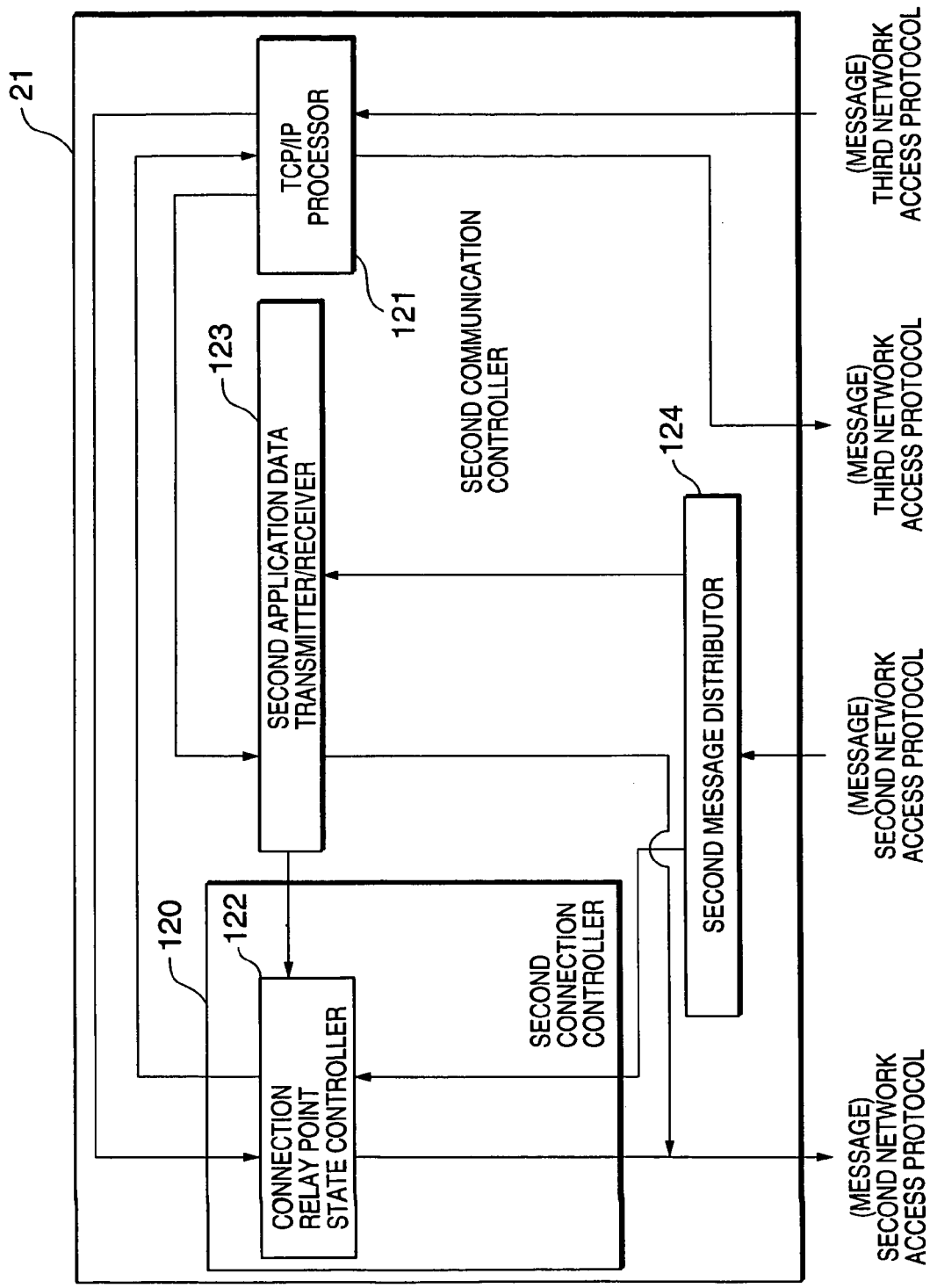
FIG. 3 is a diagram showing the constitution of the first embodiment of the data communication system of the present invention, and is a block diagram showing the constitution of a second communication controller shown in FIG. 1.

FIG. 1 is a block diagram showing one constitution example of the data communication system of the present invention. FIG. 2 is a diagram showing the constitution of the first embodiment of the data communication system of the present invention, and is a block diagram showing the constitution of a first communication controller shown in FIG. 1. FIG. 3 is a diagram showing the constitution of the first embodiment of the data communication system of the present invention, and is a block diagram showing the constitution of a second communication controller shown in FIG. 1.

In FIG. 1, the data communication system of the present invention has a terminal equipment 1, a router 2, a server terminal equipment 3, a first network 4, and a second network 5, the terminal equipment 1 and the router 2 are connected via the first network 4, and the router 2 and the server terminal equipment 3 are connected via the second network 5.

The terminal equipment 1 is an information processor provided with units connectable to the first network 4, and has a first processor 11, a first communication interface controller 12, a first communication controller 13, a first storage unit 14, and a first network access protocol 15.

The router 2 is an information processor provided with units connectable to the second network 5, and has a second communication controller 21, a second storage unit 22, a second network access protocol 23, and a third network access protocol 24.

The server terminal equipment 3 is an information processor provided with units connectable to the second network 5, and has a second processor 31, a second communication interface controller 32, a TCP module 33, an IP module 34, and a fourth network access protocol 35.

In FIG. 2, the first communication controller 13 has a first connection controller 101, a first application data transmitter/receiver 102, and a first message distributor 104, and the first connection controller 101 is constituted of a connection terminal point state controller 105.

In FIG. 3, the second communication controller 21 has a second connection controller 120, a TCP/IP processor 121, a second application data transmitter/receiver 123, and a second message distributor 124, and the second connection controller 120 is constituted of a connection relay point state controller 122.

The first network 4 comprises a single network or a network complex constituted of a plurality of networks, which has a data transfer function between the terminal equipment 1 and the router 2, and includes, for example, a radio line network and a telephone line network, LAN constituted of a radio/cable packet network and Ethernet, and the like.

The second network 5 comprises a single network or a complex of a plurality of networks, which has an IP data gram transfer, and includes, for example, LAN constituted of Ethernet, Internet as a network complex with LAN connected via the router, and the like.

The first processor 11 and second processor 31 are apparatuses for providing a user with communication service in accordance with an application program in the same manner as the prior-art first processor 61 and second processor 81, respectively.

When the first processor 61 performs communication with the second processor 81, the communication is performed through an access point presented by the communication function of the first communication interface controller 62.

When the first processor 11 transmits the application data to the second processor 31, the first processor 11 transfers the application data to the first communication interface controller 12 together with a data transmission request. Moreover, when the first processor 11 receives the application data transmitted from the second processor 31, the first processor 11 sends a data reception request to the first communication interface controller 12, and the received application data is transferred.

Similarly, when the second processor 31 performs communication with the first processor 11, the communication is performed through an access point presented by the communication function of the second communication interface controller 32.

When the second processor 31 transmits the application data to the first processor 11, the second processor 31 transfers the application data to the second communication interface controller 32 together with the data transmission request. Moreover, when the second processor 31 receives the application data transmitted from the first processor 11, the second processor 31 sends the data reception request to the second communication interface controller 32, so that the received application data is transferred.

Similarly to the conventional first communication interface controller 62 and second communication interface controller 82, the first communication interface controller 12 and second communication interface controller 32 manage the access point which has a communication function abstracted by the concept of a socket and not dependent on the communication protocol with respect to the first processor 11 and second processor 31.

Moreover, the operation request from the first processor 11 or the second processor 31 is replaced with a function calling of the first communication controller 13 or the TCP module 33. Since the socket concept is similar to that of the prior art, the description is omitted here.

The message concerning connection control exchanged between the first communication controller 13 and the second communication controller 21 and the information to be notified with each message will be described with reference to FIGS. 4 to 6.

FIG. 4 is a diagram showing messages concerning the connection control for use in the first embodiment of the data communication system of the present invention. Moreover, FIG. 5 is a table diagram showing one constitution example of a connection terminal point control table owned by a first storage unit according to the first embodiment of the data communication system of the present invention, and FIG. 6 is a table diagram showing one constitution example of a connection relay point control table owned by a second storage unit according to the first embodiment of the data communication system of the present invention.

As shown in FIG. 4, the message concerning the connection control comprises: a passive opening message (hereinafter referred to as POPEN message) transmitted in a direction to the second communication controller 21 from the first communication controller 13 (hereinafter referred to as the ascending direction), and requesting connection passive opening; an active opening message (hereinafter referred to as AOPEN message) transmitted in the ascending direction, and requesting connection active opening; an establishment message (hereinafter referred to as ESTAB message) transmitted in a direction to the first communication controller 13 from the second communication controller 21 (hereinafter referred to the descending direction), and notifying connection establishment to the connection passive opening request or the connection active opening request made in the past; a close message (hereinafter referred to as CLOSE message) transmitted in both the ascending direction and the descending direction, and requesting connection close; a reply message (hereinafter referred to as REPLY message) which is reply notification to the received message; and a reset message (hereinafter referred to as RESET message) for notifying connection reset.

Each of these messages includes connection identifier information for identifying the connection, and CC order number information indicating the sequence number (hereinafter referred to as CC order number) of each transmission message.

The POPEN message includes the port number of the socket waiting for the connection passive opening, self port number information indicating IP address, and self IP address information. Moreover, when there is information to be transferred with the connection passive opening point generation request from the first communication interface controller 12, the information is also included. Examples of the information transferred together with the connection passive opening point generation request include backlog information indicating a maximum value at which a connection opening processing can simultaneously be performed with a passive socket prepared in response to the connection passive opening point generation request.

The AOPEN message includes the port number of the socket requesting the connection opening, self port number information indicating IP address, and self IP address information. Moreover, the port number of a connection destination socket, object port number information indicating IP address, and object IP address information are included. Furthermore, when there is information to be transferred with the connection active opening point generation request from the first communication interface controller 12, the information is also included. Examples of the information transferred together with the connection active opening point generation request include information requesting MSS negotiation with a communication object.

The ESTAB message includes the port number of a connection object-side socket, object port number information indicating IP address and object IP address information.

The REPLY message includes reply object information indicating the CC order number of the corresponding message, and result information indicating the request processing result of the messages for the connection control.

For the first communication controller 13 and second communication controller 21, even when any of the above-described messages is transmitted/received, the connection identifier information of the connection corresponding to the message to be transmitted is added on the transmission side, and the connection corresponding to the message is identified from the connection identifier information of the received message on the reception side.

Moreover, in the first communication controller 13 and second communication controller 21, when the message other than the REPLY message is transmitted, the CC order number of each transmission message is stored in the CC order number information. Each of the first communication controller 13 and second communication controller 21 having received the message performs the processing requested by the message, stores normal end (represented as "OK") in the result information when the processing normally ends, and stores abnormal end (represented as "NG") in the result information when the processing does not normally end. Furthermore, the REPLY message with the CC order number of each message stored in the reply object information is transmitted to the transmission side.

The transmission side having received the REPLY message identifies the corresponding message (excluding the REPLY message) from the reply object information among the messages transmitted in the past on the transmission side, and judges from the result information whether or not the processing of the transmitted message normally ends. The processing is executed in other processings described below, but the description thereof is omitted.

The first storage unit 14 has a transmission data buffer for temporarily storing the application data to be transmitted, a received data buffer for temporarily storing the received application data, and a connection terminal point control table for storing various information for managing the connection terminal point. The first communication controller 13 refers to the information stored in the connection terminal point control table to perform a processing for managing the connection.

As shown in FIG. 5, the connection terminal point control table comprises: a socket identifier member for storing a socket identifier; a connection identifier member for storing the identifier of the connection corresponding to the socket (connection terminal point identifier); a source port number member for storing the port number of the socket; a source IP address member for storing the IP address of the socket; a destination port number member for storing the port number of an object socket; a destination IP address member for storing the IP address of the object socket; a connection terminal point state member for storing a connection terminal point state; a transmission completion member set to either "completed" or "uncompleted", and storing the transmission acknowledgment result with respect to the transmitted application data; a close request member set to either "present" or "absent", and storing the presence/absence of the connection close request from the first processor 11; and a plurality of entries.

Each entry of the connection terminal point control table is generated or deleted by the first communication controller 13. Additionally, when another entry is newly generated, the value of the transmission completion member is set to "uncompleted", and the value of the close request member is set to "absent".

The second storage unit 21 has a transmission data buffer for temporarily storing the application data to be transmitted to the terminal equipment 1 from the server terminal equipment 3, a received data buffer for temporarily storing the application data transmitted to the server terminal equipment 3 from the terminal equipment 1, and a connection relay point control table for storing various information for managing the connection relay point. The second communication controller 21 refers to the connection relay point control table to manage each connection.

As shown in FIG. 6, the connection relay point control table comprises: a connection identifier member for storing a connection relay point identifier; a first port number member for storing the port number of the socket on the side of the terminal equipment 1 in each connection; a first IP address member for storing the IP address of the socket on the side of the terminal equipment 1 in each connection; a second port number member for storing the port number of the socket on the side of the server terminal equipment 3 in each connection; a second IP address member for storing the IP address of the socket on the side of the server terminal equipment 3 in each connection; a connection relay point state member for storing a connection relay point state; a transmission completion member set to either "completed" or "uncompleted", and storing the transmission acknowledgment result with respect to the application data transmitted to the first communication controller; a close request member set to either "present" or "absent", and storing the presence/absence of the connection close request from the second processor 31; a close request acknowledgment member set to either "completed" or "uncompleted", and storing a transmission acknowledgment result with respect to the connection close request transmitted from the TCP/IP processor 121; and a plurality of entries.

Each entry of the connection relay point control table is generated or deleted by the second communication controller 21. Additionally, when another entry is newly generated, the value of the transmission completion member is set to "uncompleted", the value of the close request member is set to "absent", and the value of the close request acknowledgment member is set to "uncompleted".

On receiving the message concerning the connection control from the first network access protocol 15, the first message distributor 104 transfers the message to the first connection controller 101. Additionally, the message other than the connection control message is transferred to the first application data transmitter/receiver 102. The connection terminal point state controller 105 individually manages the management object (connection terminal point) of the first communication controller 13 corresponding to the socket.

The first application data transmitter/receiver 102 is used in common with the first communication controller 13 and the second communication controller 21. The use in the first communication controller 13 will be described hereinafter as an example. For the use in the second communication controller 21, the description may be read by replacing the connection terminal point with the connection relay point, the connection terminal point control table with the connection relay point control table, and the first network access protocol 15 with the second network access protocol 23.

The first application data transmitter/receiver 102 is a module for transferring the application data, basically operates as follows, may provide a reliable communication and, for example, may execute the following processing to a site in which the conventional TCP data transmission/reception is executed.

On receiving the data transmission request from the first communication interface controller 12, the first application data transmitter/receiver 102 checks the value of the connection terminal point state member of the connection terminal point control table, stores "uncompleted" in the transmission completion member when the corresponding connection terminal point state is an opened state (hereinafter referred to as ESTAB) or a close waiting state (hereinafter referred to as CLOSE–WAIT), and starts the following data transmission processing.

In other cases, the processing is ended. Additionally, the second communication controller 21 stores "uncompleted" in the transmission completion member when the connection relay point state is ESTAB or an object finish waiting state (hereinafter referred to as FIN–WAIT), and starts the data transmission processing.

In the data transmission processing, the application data is transmitted until the application data stored in the transmission data buffer is eliminated. When all the application data in the transmission data buffer are transmitted, and the transmission acknowledgment is notified, the value of the corresponding transmission completion member of the connection terminal point control table is set to "completed".

Furthermore, when the value of the close request member is checked, and the value of the close request member is "present", the connection close request is sent to the connection terminal point state controller 105, and the data transmission processing is then finished. Moreover, when the value of the close request member is "absent", the data transmission processing is finished as it is.

On receiving the packet including the application data from the first message distributor 104, the first application data transmitter/receiver 102 discards the packet, and finishes the processing when the connection terminal point state corresponding to the received packet is ESTAB, or other than FIN–WAIT (for the second communication controller, when the connection relay point state is ESTAB, or other than CLOSE–WAIT).

When the connection terminal point state is ESTAB, or FIN–WAIT (for the second communication controller, when the connection relay point state is ESTAB, or CLOSE–WAIT), the application data included in the received packet is added to the rear of the received data buffer.

The second communication controller 21 realizes the connection control and reliable data communication with the first communication controller of the terminal equipment 1, and realizes TCP protocol control, that is, connection control and reliable data communication with the TCP module 33 of the serve terminal equipment 3.

In the communication with the TCP module 33 and IP module of the server terminal equipment 3, the second communication controller 21 behaves as if the TCP module and IP module were present in the terminal equipment 1. For example, when connection C1 between the socket S1 of the terminal equipment 1 (with port number P1, IP address A1) and the socket S3 of the server terminal equipment 3 (with port number P3, IP address A3) is relayed, and when the TCP/IP packet addressed for the socket S3 is generated, P1 is stored in the source port number field in the TCP header, P3 is stored in the destination port number field, A1 is stored in the source IP address field in the IP header, and A3 is stored in the destination IP address field.

Moreover, it is judged that the TCP/IP packet with these information stored therein is addressed for the socket S1 or the socket S3 and that the TCP/IP packet is addressed for itself, and the processing similar to the packet reception processing by the conventional IP and TCP is performed.

The connection relay point state controller 123 individually manages the management object (referred to as the connection relay point) of the second communication controller 21.

The TCP/IP processor 121 is a module having the function similar to that of the conventional TCP module and IP module, and assembles TCP segment and IP data gram or disassembles the received TCP segment and IP data gram.

Moreover, performed are the transmission of the application data stored in the received data buffer, the storage of the application data included in the received TCP/IP packet to the transmission data buffer, and the connection control with the object-side TCP module with respect to these processings, the re-sending control, the flow control, the order control of the received application data, and the like. However, the processor is different from the conventional TCP module and IP module in the following respects.

The TCP/IP processor 121 refers to the source port number field, destination port number field, source IP address field, and destination IP address field of the TCP header and IP header included in the received TCP/IP packet. When the field values agree with the second port number member, first port number member, second IP address member, and first IP address member of the connection relay point control table, or when the values of the destination port number field and destination IP address field agree with the first port number member and first IP address member, and the value of the connection relay point state member is the passive opening waiting state (hereinafter referred to as LISTEN), the processor judges that the received TCP/IP packet is addressed to the connection relay point.

Moreover, when the TCP/IP packet is assembled, the TCP/IP processor 121 stores the values of the first port number member, second port number member, first IP address member, and second IP address member of the connection relay point control table into the TCP header source port number field, destination port number field, IP header source IP address field, and destination IP address field.

Moreover, when either one of a synchronization request, synchronization acknowledgment request, close request, and close acknowledgment request is received with the connection relay point identifier from the connection relay point state controller 122, in a similar manner to the connection active opening, the TCP/IP packet including a connection opening request, transmission acknowledgment notification to the connection opening request, connection close request, and transmission acknowledgment notification to the connection close request is prepared, and transferred to the third network access protocol 24.

Furthermore, on receiving the TCP/IP packet including the connection opening request from the third network access protocol 24, the TCP/IP processor 121 confirms that the state of the corresponding connection relay point of the connection relay point control table is LISTEN, stores the value of the source port number field of the TCP header and the value of the source IP address field of the IP header in the second port number member and the second IP address member, and notifies the connection relay point state controller 122 of the connection relay point identifier and the connection opening request.

Additionally, on receiving the TCP/IP packet including the transmission acknowledgment to the connection opening request from the third network access protocol 24, the processor notifies the connection relay point state controller 122 of the corresponding connection relay point identifier and the connection opening transmission acknowledgment.

Moreover, on receiving the TCP/IP packet including the connection close request from the third network access protocol 24, the processor notifies the connection relay point state controller 122 of the corresponding connection relay point identifier and the connection close request.

Furthermore, on receiving the TCP/IP packet including the transmission acknowledgment to the connection close request from the third network access protocol 24, the processor notifies the connection relay point state controller 122 of the corresponding connection relay point identifier and the connection close transmission acknowledgment.

Additionally, the TCP/IP processor 121 monitors the presence/absence of the application data of each connection relay point stored in the received data buffer, cuts out the data for an MSS size at maximum from the top of the application data when the application data corresponding to the arbitrary connection relay point is present in the received data buffer, generates the IP data gram including the cut application data and transfers the data gram to the third network access protocol 24.

Moreover, when the application data is included in the IP data gram received from the third network access protocol 24, the processor extracts the application data, executes the order control while storing the data into the transmission data buffer, and notifies the second application data transmitter/receiver 123 of the corresponding connection relay point identifier and the data transmission request.

The TCP module 33 of the server terminal equipment 3 is a module for performing the TCP protocol control in a similar manner to the prior art, and the IP module 34 is a module for performing the IP protocol control in a similar manner to the prior art.

The first network access protocol 15 and second network access protocol 23 are modules for accessing the first network 4 to realize the data communication.

The first network access protocol 15 constitutes the frame from the packet transferred from the first communication controller 13, and transfers the frame to the second network access protocol 23 via the first network 4. Moreover, the protocol extracts the packet from the frame received via the first network 4, and transfers the extracted packet to the first communication controller 13.

Similarly, the second network access protocol 23 constitutes the frame from the packet transferred from the second communication controller 21, and transfers the frame to the first network access protocol 15 via the first network 4. Moreover, the protocol extracts the packet from the frame received via the first network 4, and transfers the extracted packet to the second communication controller 21.

For example, when the first network 4 comprises a serial line (telephone network, radio line network, or the like), each of the first network access protocol 15 and the second network access protocol 23 is provided with an access protocol to the first network 4 and a PPP protocol disposed in its high order. Moreover, when the first network 4 comprises LAN constituted of Ethernet, the constitution includes Ethernet driver. When the first network 4 comprises a network in accordance with IEEE 1394 specification, the constitution includes IEEE 1394 driver.

The third network access protocol 24 and the fourth network access protocol 35 realize a data communication function by communication media connected via the second network 5.

The third network access protocol 24 includes the Ethernet driver, for example, when the router 2 is connected to the second network 5 via Ethernet. When the router is connected to the second network 5, the constitution includes FDDI driver. Moreover, when the router 2 is connected via ATM, the constitution includes ATM driver. This also applies to the four network access protocol 35/

The operation of the first embodiment of the data communication system of the present invention will next be described with reference to FIGS. 7 to 9. Additionally, in the following description, the socket used in the first processor 11 is set to S1, the socket used in the second processor 31 is S3, the port number of the socket S1 is P1, the IP address is A1, the port number of the socket S3 is P3, and the IP address is A3.

Figure 7:
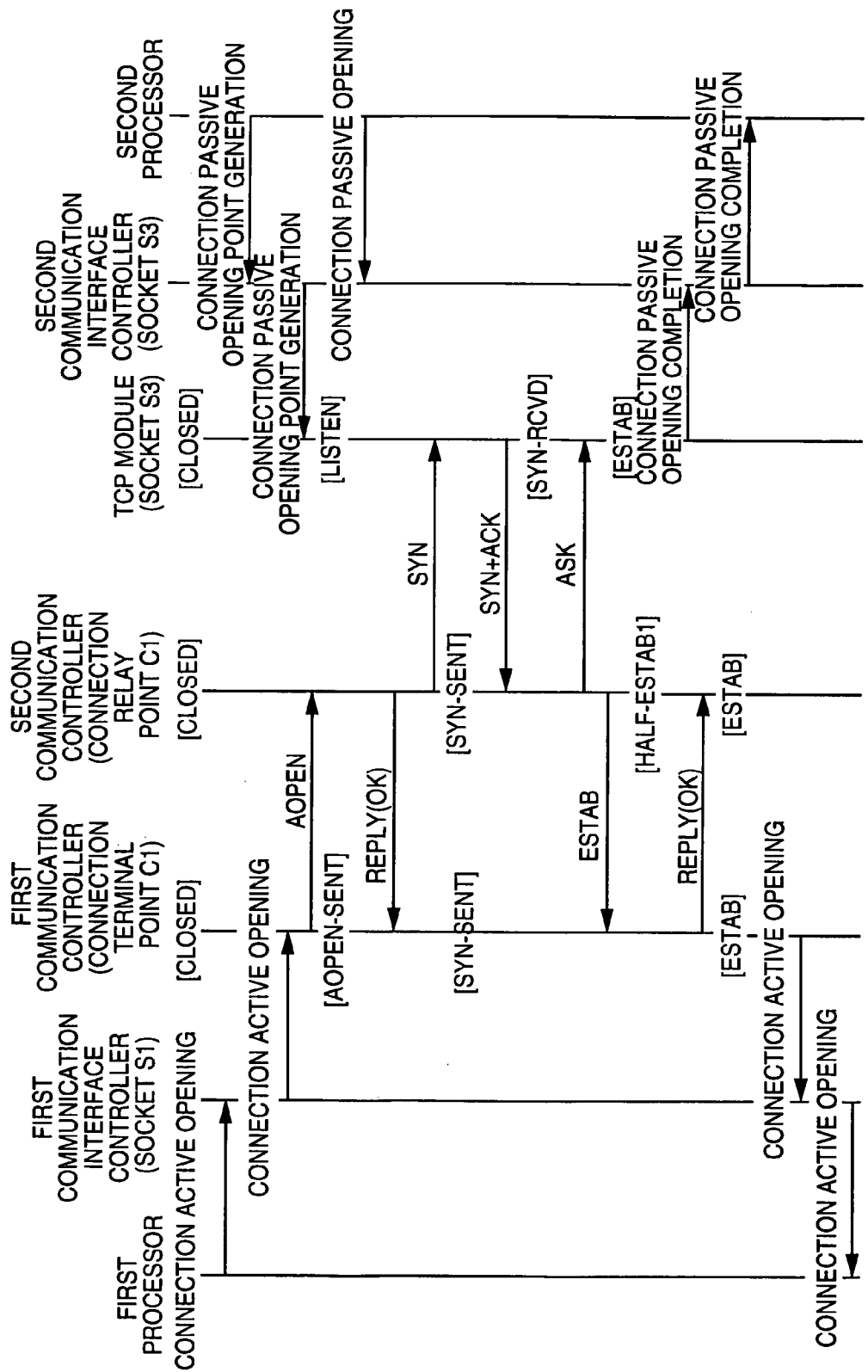
FIG. 7 is a diagram showing the operation of the first embodiment of the data communication system of the present invention, and is a sequence diagram showing a processing procedure during connection active opening operation.

FIG. 7 is a diagram showing the operation of the first embodiment of the data communication system of the present invention, and is a sequence diagram showing a processing procedure during connection active opening operation. FIG. 8 is a diagram showing the operation of the first embodiment of the data communication system of the present invention, and is a sequence diagram showing a processing procedure during connection passive opening operation. Moreover, FIG. 9 is a diagram showing the operation of the first embodiment of the data communication system of the present invention, and is a sequence diagram showing a processing procedure during connection close operation.

First, the connection opening operation will be described. The connection opening operation comprises a connection active opening operation and a connection passive opening operation. In the following, the connection active opening operation from the first processor 11 will first be described with reference to FIG. 7, and the connection passive opening operation in the first processor 11 will next be described with reference to FIG. 8.

In FIG. 7, first, the socket S3 is converted to a passive socket beforehand similarly to the prior art, and the second processor 31 is in a state of waiting for the connection passive opening (LISTEN).

In this state, the first processor 11 generates the socket S1, designates port number P3 and IP address A3 through the socket S1, and makes a request to the first communication interface controller 12 for the connection active opening to the socket S3. Then, the first communication interface controller 12 records a relation between the sockets S1 and S3, and transmits the identifier of the socket S1 and the connection active opening request to the connection terminal point state controller 105 of the first communication controller 13.

On receiving the connection active opening request to the socket S3, the connection terminal point state controller 105 generates a connection terminal point identifier (here, the generated connection terminal point identifier is set to C1, and the connection between the sockets S1 and S3 is also C1 in the following description).

Subsequently, the connection terminal point state controller 105 generates AOPEN message including connection identifier information C1, CC order number initial value of the connection C1, self port number information P1, self IP address information A1, object port number information P3, and object IP address information A3, and transfers the message to the first network access protocol 15. Furthermore, the controller generates a new entry in the connection terminal point control table, stores S1 in the socket identifier of the generated entry, C1 in the connection terminal point identifier member, P1 in the source port number member, A1 in the source IP address member, P3 in the destination port number member, and A3 in the destination IP address member, respectively, and sets the connection terminal point state to an active opening requesting state (hereinafter referred to as AOPEN-SENT).

The AOPEN message transferred to the first network access protocol 15 is transferred to the second communication controller 21 via the first network 4 and second network access protocol 23, and transferred to the connection relay point state controller 122 by the second message distributor 124.

On receiving the AOPEN message, the connection relay point state controller 122 generates a new entry in the connection relay point control table, stores the connection identifier information, self port number information, self IP address message, object port number information, and object IP address information of the received AOPEN message in the connection identifier member, first port number member, first IP address member, second port number member, and second IP address member of the generated entry, and sets the connection relay point state to an active opening waiting state (hereinafter referred to as SYN–SENT).

Furthermore, the connection relay point state controller 122 transfers REPLY message including "OK" as result information to the second network access protocol 23. The REPLY message transferred to the second network access protocol 23 is transferred to the first communication controller 13 via the first network 4 and first network access protocol 15, and transferred to the connection terminal point state controller 105 by the first message distributor 104.

Moreover, on receiving the AOPEN message, the connection relay point state controller 122 notifies the TCP/IP processor 121 of the connection relay point identifier and synchronization request. On receiving the synchronization request together with the connection relay point identifier, the TCP/IP processor 121 generates the IP data gram including the connection opening request (SYN), and transfers the data gram to the third network access protocol 24.

The IP data gram transferred to the third network access protocol 24 is transferred to the IP module 34 via the second network 5 and fourth network access protocol 35, and the TCP segment in the IP data gram is transferred to the TCP module 33 by the IP module 34. In this case, the values of the first IP address member, second IP address member, first port number member, and second port number member of the connection relay point control table are stored in the source IP address field and destination IP address field of the IP header included in the IP data gram, and the source port number field and destination port number field of the TCP header included in the TCP segment. Additionally, the above-described values are also stored in the above-described four fields in the following description.

On receiving the REPLY message including the result information "OK" to the AOPEN message, the connection terminal point state controller 105 sets the connection terminal point state to SYN–SENT.

On receiving the TCP segment including the connection opening request, the TCP module 33 transfers the TCP segment including transmission acknowledgment notification (SYN+ACK) to the connection opening request to the IP module 34, and sets the connection terminal point state to an opening request received state (SYN–RCVD).

The IP module 34 generates the IP data gram from the received TCP segment, and transfers the data gram to the TCP/IP processor 121 via the fourth network access protocol 35, second network 5 and third network access protocol 24.

The TCP/IP processor 121 uses the values of the source port number field and destination port number field of the TCP header included in the received IP data gram, and the values of the source IP address field and destination IP address field of the IP header as keys to search for the corresponding connection relay point from the connection relay point control table. Moreover, since the transmission acknowledgment notification to the connection opening request is included in the received TCP segment, the connection relay point identifier, connection opening request, and transmission acknowledgment notification are transmitted to the connection relay point state controller 122.

On receiving the connection relay point identifier, connection opening request, and transmission acknowledgment notification from the TCP/IP processor 121, the connection relay point state controller 122 transfers the synchronization acknowledgment request accompanied by the connection relay point identifier to the TCP/IP processor 121, because the corresponding connection relay point state is SYN–SENT.

On receiving the synchronization acknowledgment request accompanied by the connection relay point identifier, the TCP/IP processor 121 prepares the IP data gram in which the transmission acknowledgment notification (ACK) to the TCP segment requesting the connection opening is included in the TCP segment, and transfers the data gram to the third network access protocol 24.

The IP data gram transferred to the third network access protocol 24 is transferred to the IP module 34 via the fourth network access protocol 35, and the TCP segment included in the IP data gram is transferred to the TCP module 33 by the IP module 34.

The connection relay point state controller 122 further transfers ESTAB message of the connection relay point to the second network access protocol 23, and sets the connection relay point state to a first half established state (HALF–ESTAB1).

The ESTAB message transferred to the second network access protocol 23 is transferred to the connection terminal point state controller 105 via the first network access protocol 15.

On the other hand, on receiving the TCP segment including the transmission acknowledgment notification, the TCP module 33 judges that the connection is established (ESTAB), and notifies the second communication interface controller 32 of the connection passive opening.

The second communication interface controller 32 transfers the connection passive opening notified from the TCP module 33 to the second processor 31. In this case, the sockets are duplicated in the TCP module 33 and second communication interface controller 32, respectively, similarly to the prior art.

On receiving the ESTAB message via the first network access protocol 15, the connection terminal point state controller 105 transfers the REPLY message with the result information "OK" to the first network access protocol 15.

The REPLY message transferred to the first network access protocol 15 is transferred to the connection relay point state controller 122 via the second network access protocol 23 and second message distributor 124.

Furthermore, the connection terminal point state controller 105 sets the connection terminal point state to ESTAB, and notifies the first communication interface controller 12 of the connection active opening. The first communication interface controller 12 notifies the first processor 11 of the connection active opening.

On the other hand, on receiving the REPLY message, the connection relay point state controller 122 sets the connection relay point state to ESTAB.

At this time, the connection active opening operation of the connection C1 among the first communication controller 13, second communication controller 21, and TCP module 33 is completed, and the data communication utilizing the connection C1 can be realized.

A connection passive opening operation in the first processor 11 will next be described with reference to FIG. 8.

Figure 8:
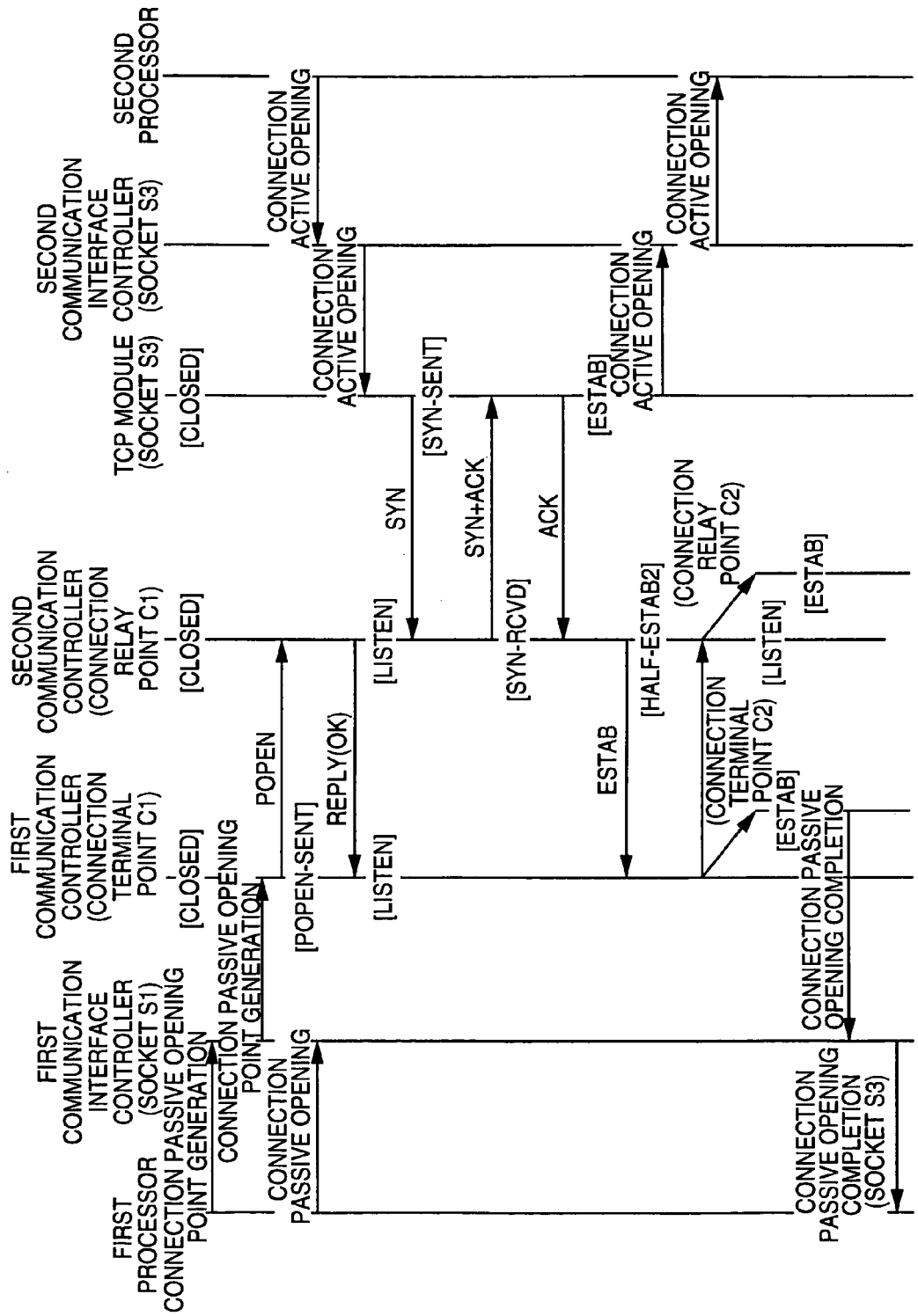
FIG. 8 is a diagram showing the operation of the first embodiment of the data communication system of the present invention, and is a sequence diagram showing a processing procedure during connection passive opening operation.

In FIG. 8, the first processor 11 generates the socket S1 for communication, and requests the first communication interface controller 12 to generate the connection passive opening point of the socket S1. Then, the first communication interface controller 12 requests the connection terminal point state controller 105 to generate the connection passive opening point.

Moreover, the first processor 11 requests the first communication interface controller 12 for the connection passive opening. In this case, the socket S1 is in the connection establishment waiting state.

In response to the request for the connection passive opening point generation from the first communication interface controller 12, the connection terminal point state controller 105 generates the connection terminal point identifier (the generated connection terminal point identifier is set to C1, and the connection terminal point will hereinafter be referred to as C1).

Subsequently, the connection terminal point state controller 105 transfers POPEN message including the connection terminal point identifier C1, CC order number initial value in the connection terminal point C1, self port number information P1, self IP address information A1, object port number information P3, and object IP address information A3 to the first network access protocol 15. Moreover, the controller generates a new entry, in the connection terminal point control table, stores the socket S1 in the socket identifier, C1 in the connection terminal point identifier member, P1 in the source port number member, and A1 in the source IP address member, respectively, and sets the connection terminal point state to a passive opening point generation state (POPEN-SENT).

The POPEN message transferred to the first network access protocol 15 is transferred to the connection relay point state controller 122 via the second network access protocol 23 and second message distributor 124.

On receiving the POPEN message, the connection relay point state controller 122 transfers the REPLY message with the result information "OK" to the second network access protocol 23. The REPLY message is transferred to the connection terminal point state controller 105 via the first network access protocol 15.

Moreover, the connection relay point state controller 122 generates a new entry in the connection relay point control table, stores the contents of the connection identifier information, self port number information, and self IP address information of the received POPEN message into the connection identifier member, first port number member, and first IP address member of the generated entry, and sets the connection relay point state to LISTEN.

On the other hand, on receiving the REPLY message with the result information "OK", the connection terminal point state controller 105 sets the connection terminal point state to LISTEN.

Subsequently, the second processor 31 generates the socket S3, designates the port number P1 and IP address A3 through the socket S3 and sends the connection active opening request to the second communication interface controller 32. Then, the connection active opening request is transferred to the TCP module 33 via the second communication interface controller 32.

The TCP module 33 generates and transfers the TCP segment including the connection active opening request (SYN) to the IP module 34, and sets the connection terminal point state to SYN-SENT.

The IP module 34 generates the IP data gram including the received TCP segment. The IP data gram generated by the IP module 34 is transferred to the TCP/IP processor 121 of the second communication controller 21 via the fourth network access protocol 35, second network 5 and third network access protocol 24.

On receiving the IP data gram, the TCP/IP processor 121 judges that the received IP data gram is addressed to the connection relay point C1. Because the values of the destination port number field of the TCP header included in the IP data gram and the destination IP address field of the IP header agree with the values of the first port number member and first IP address member corresponding to the connection relay point C1 of the connection relay point control table, and the state of the connection relay point C1 is LISTEN.

Subsequently, the processor stores the value of the source port number field of the TCP header and the value of the source IP address field of the IP header into the second port number member and second IP address member corresponding to the connection relay point C1 of the connection control table, and notifies the connection relay point state controller 122 of the connection active opening request together with the connection relay point identifier C1.

On receiving the connection active opening request accompanied by the connection relay point identifier C1 from the TCP/IP processor 121, the connection relay point state controller 122 transfers the synchronization request and synchronization acknowledgment request with the connection relay point identifier C1 to the TCP/IP processor 121, and sets the state of the connection relay point corresponding to the connection relay point identifier C1 to SYN-RCVD.

On receiving the synchronization request accompanied by the connection relay point identifier C1, and the synchronization acknowledgment request, the TCP/IP processor 121 transfers the IP data gram including the connection active opening request, and TCP segment notifying the transmission acknowledgment (SYN+ACK) for the received TCP segment to the third network access protocol 24.

The IP data gram transferred to the third network access protocol 24 is transferred to the IP module 34 via the fourth network access protocol 35. The IP module 34 extracts the TCP segment from the received IP data gram, and transfers the extracted TCP segment to the TCP module 33.

On receiving the TCP segment, the TCP module 33 generates the TCP segment including the transmission acknowledgment notification (ACK) to the TCP segment, transfers the segment to the IP module 34 and sets the connection terminal point state to ESTAB.

The IP module 33 generates the IP data gram from the transferred TCP segment, and transfers the data gram to the TCP/IP processor 121 via the fourth network access protocol 35, second network 5, and third network access protocol 24.

Furthermore, the TCP module 33 notifies the second communication interface controller 32 of the connection active opening, and notifies the second processor 31 of the connection active opening.

On receiving the IP data gram from the IP module 33, the TCP/IP processor 121 notifies the connection relay point state controller 122 of the connection opening transmission acknowledgment accompanied by the connection relay point identifier of the connection relay point C1 corresponding to the received IP data gram.

The connection relay point state controller 122 transfers to the second network access protocol 23 the ESTAB message in which the object port number information and object IP address information indicate the values of the second port number member and second IP address member corresponding to the connection relay point C1 of the connection relay point control table, and sets the connection relay point state to a second half established state (HALF-ESTAB2).

The ESTAB message transferred to the second network access protocol 23 is transferred to the connection terminal point state controller 105 via the first network 4 and first network access protocol 15.

On receiving the ESTAB message, the connection terminal point state controller 105 generates a new connection terminal point identifier (the generated connection terminal point identifier is set to C2), and prepares a new entry in the connection terminal point control table.

Subsequently, the controller stores C2 into the connection terminal point identifier member of the generated entry, stores the contents of the source port number member and source IP address member corresponding to the connection terminal point C1 of the connection terminal point control table into the source port number member and source IP address member, stores the object port number information and object IP address information included in the received ESTAB message into the destination port number member and destination IP address member, and sets the state of the connection terminal point C2 to ESTAB.

Subsequently, the REPLY message in which the result information is "OK" and the connection identifier information is C2 is transferred to the first network access protocol 15.

The REPLY message transferred to the first network access protocol 15 is transferred to the connection relay point state controller 122 via the second network access protocol 23, and the second message distributor 124 of the second communication controller 21, Furthermore, the connection terminal point state controller 105 notifies the first communication interface controller 12 of the connection passive opening completion. The first communication interface controller 12 notifies the first processor 11 of the connection passive opening completion.

On receiving the REPLY message from the connection terminal point state controller 105, the connection relay point state controller 122 generates a new entry in the connection relay point control table, and stores the values of the first port number member, first IP address member, second port number member, and second IP address member corresponding to the connection relay point C1 into the first port number member, first IP address member, second port number member, and second IP address member of the generated entry.

Moreover, the controller stores the connection identifier information C2 included in the received REPLY message into the connection identifier member, and sets the state of the connection relay point C2 to ESTAB.

Furthermore, the controller deletes the values of the second port number member and second IP address member corresponding to the connection relay point C1 of the connection relay point control table, and sets the state of the connection relay point C1 to LISTEN.

At this time, the connection passive opening operation of the connection C2 among the first communication controller 13, second communication controller 21, and TCP module 33 is completed, and the data communication utilizing the connection C2 can be realized.

The connection close operation of the first embodiment will next be described with reference to FIG. 9.

The connection close operation is completed by a first close operation based on a connection close request from the first processor 11, and a second close operation based on the connection close request from the second processor 31.

Even when the connection close request is sent in any order, the same initial state finally returns. Specifically, even when during the operation by one connection close request the close operation is started by the other connection close request, the same initial state finally returns. Even when the connection terminal point state or the connection relay point state is in any state during the connection close request, the initial state finally returns.

Here, an operation will be described as an example in which the connection terminal point state and connection relay point state are both in ESTAB, and with respect to the connection C1 between the socket S1 of the terminal equipment 1 and the socket S3 of the server terminal equipment 3, the connection close is requested first from the first processor 11, and after the close operation, the connection close is requested from the second processor 31.

Figure 9:
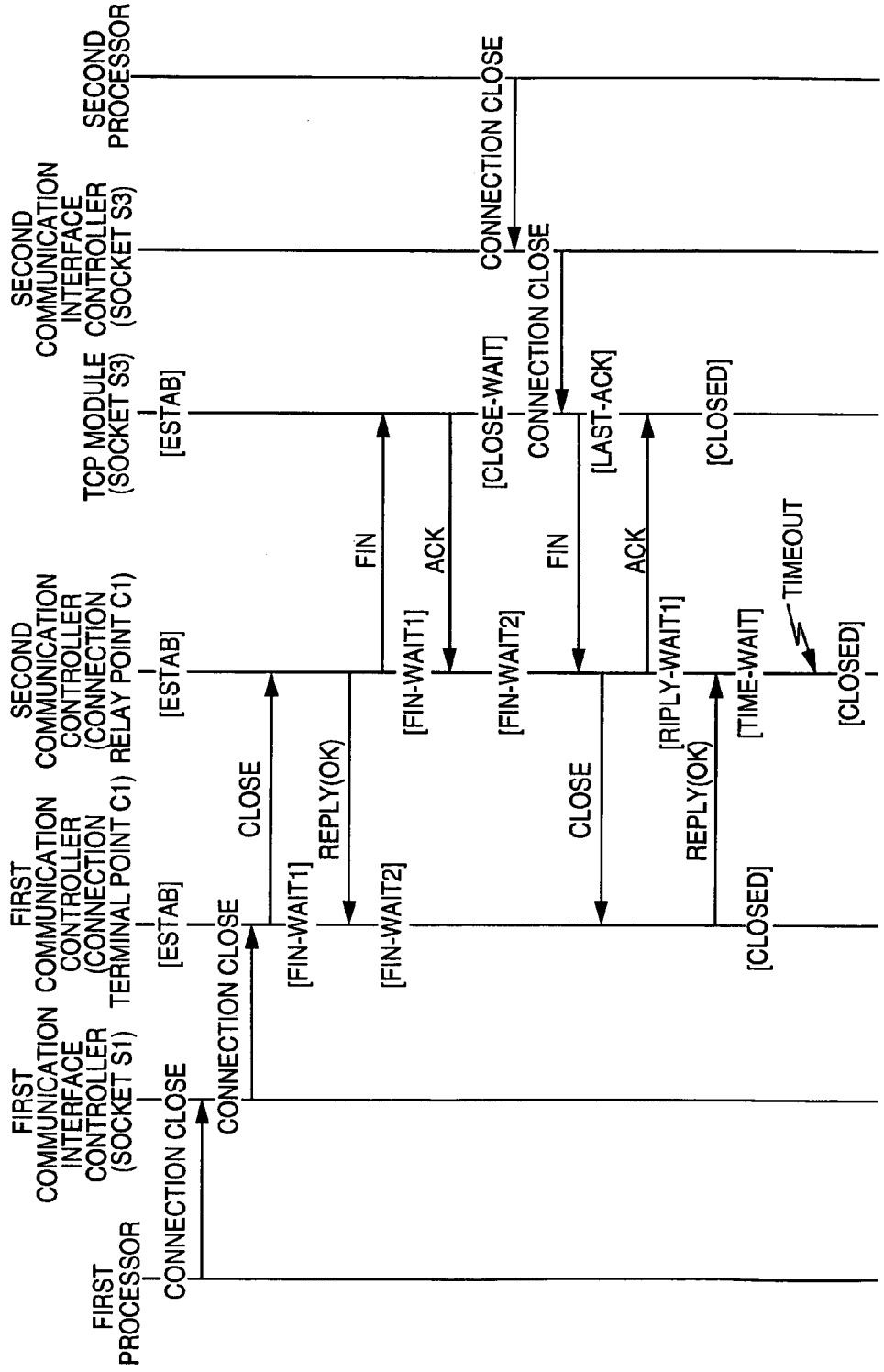
FIG. 9 is a diagram showing the operation of the first embodiment of the data communication system of the present invention, and is a sequence diagram showing a processing procedure during connection close operation.

In FIG. 9, first, when the first processor 11 requests the first communication interface controller 12 through the socket S1 for the connection close of the connection C1, the first communication interface controller 12 requests the connection terminal point state controller 105 for the connection close (CLOSE) of the connection C1.

The connection terminal point state controller 105 refers to the transmission completion member of the entry corresponding to the connection terminal point C1 of the connection terminal point control table, and sets the value of the close request of the entry to "present" to finish the processing when the transmission completion member indicates "uncompleted". On the other hand, when the value of the transmission completion member is "completed", the CLOSE message of the connection terminal point C1 is transferred to the first network access protocol 15, and the connection terminal point state is set to a first object finish waiting state (hereinafter referred to as FIN–WAIT1).

The CLOSE message transferred to the first network access protocol 15 is transferred to the connection relay point state controller 122 via the first network 4, second network access protocol 23, and second message distributor 124.

On receiving the CLOSE message, the connection relay point state controller 122 transfers REPLY message with the result information "OK" to the second network access protocol 23, transfers the connection close request with the connection relay point identifier C1 to the TCP/IP processor 121, and sets the state of the connection relay point to FIN–WAIT1.

On receiving the connection relay point identifier C1 and the connection close request, the TCP/IP processor 121 generates the IP data gram including the connection close request (FIN) and transfers the data gram to the third network access protocol 24.

The REPLY message transferred to the second network access protocol 23 is transferred to the connection terminal point state controller 105 via the first network 4 and first network access protocol 15.

On receiving the REPLY message from the connection relay point state controller 122, the connection terminal point state controller 105 sets the connection terminal point state to a second object finish waiting state (hereinafter referred to as FIN–WAIT2).

Moreover, the IP data gram transferred to the third network access protocol 24 is transferred to the IP module 34 via the second network 5 and fourth network access protocol 35.

The IP module 34 extracts the TCP segment from the received IP data gram, and the extracted TCP segment is transferred to the TCP module 33.

On receiving the TCP segment including the connection close request, the TCP module 33 transfers the TCP segment including the transmission acknowledgment notification (ACK) for the received TCP segment to the IP module 34, and sets the connection terminal point state to CLOSE-WAIT.

The IP module 34 generates the IP data gram from the received TCP segment, and transfers the generated IP data gram to the TCP/IP processor 121 of the second communication controller 21 via the fourth network access protocol 35, second network 5, and third network access protocol 24.

On receiving the IP data gram including the transmission acknowledgment notification to the connection close request, the TCP/IP processor 121 transfers the connection close transmission acknowledgment notification with the connection relay point identifier C1 to the connection relay point state controller 122.

On receiving the connection relay point identifier C1 and the connection close transmission acknowledgment notification, the connection relay point state controller 122 sets the connection relay point state to FIN-WAIT2. At this time the connection close operation of the first processor 11 based on the connection close request is completed.

Subsequently, when the second processor 33 requests the second communication interface controller 32 for the connection close of the connection C1, the second communication interface controller 32 requests the TCP module 33 for the connection close of the connection C1.

On receiving the connection close request of the connection C1 from the second communication interface controller 32, the TCP module 33 generates the TCP segment including the connection close request (FIN), transfers the segment to the IP module 34 and sets the connection terminal point state to a finish waiting state (LAST-ACK).

The IP module 34 generates the IP data gram from the transferred TCP segment, and transfers the generated IP data gram to the TCP/IP processor 121 of the second communication controller 21 via the fourth network access protocol 35, second network 5, and third network access protocol 24.

On receiving the IP data gram including the connection close request of the connection C1, the TCP/IP processor 121 notifies the connection relay point state controller 122 of the connection relay point identifier C1 and the connection close request.

On receiving the connection relay point identifier C1 and the connection close request, the connection relay point state controller 122 transfers the connection relay point identifier C1 and the close acknowledgment request to the TCP/IP processor 121. Furthermore, the controller refers to the corresponding transmission completion member of the connection relay point control table, and sets the value of the close request to "present" to finish the processing when the transmission completion member is "uncompleted". Moreover, when the transmission completion member is "completed", the controller transfers the CLOSE message of the connection relay point C1 to the second network access protocol 23, starts 2 maximum segment lifetime (MSL) timer, and sets the connection relay point state to an object finish waiting state (REPLY-WAIT1). Additionally, for the timeout time of the 2 MSL timer, similarly to the conventional TCP, the time twice as much as the lifetime of the TCP segment is appropriate. This is a necessary and sufficient time for waiting for the non-reaching TCP segment among the TCP segments transmitted by the TCP module 33 till then.

The CLOSE message transferred to the second network access protocol 23 is transferred to the connection terminal point state controller 105 via the first network 4 and first network access protocol 15.

On receiving the connection relay point identifier C1 and the close acknowledgment request, the TCP/IP processor 121 transfers to the third network access protocol 24 the IP data gram including the transmission acknowledgment notification (ACK) to the TCP segment transmitted from the TCP module 33.

The IP data gram transferred to the third network access protocol 24 is transferred to the IP module 34 via the second network 5 and fourth network access protocol 35, and the IP module 34 extracts the TCP segment from the IP data gram and transfers the extracted TCP segment to the TCP module 33. On receiving the TCP segment including the transmission acknowledgment notification, the TCP module 33 judges that the connection close operation of the connection C1 is completed (CLOSE).

On the other hand, on receiving the CLOSE message from the connection relay point state controller 122, the connection terminal point state controller 105 transfers the REPLY message with the result information "OK" to the first network access protocol 15, and deletes the entry of the corresponding connection terminal point from the connection terminal point control table. At this time the first communication controller 13 judges that the connection close operation of the connection C1 is completed (CLOSE).

The REPLY message transferred to the first network access protocol 15 is transferred to the connection relay point state controller 122 via the first network 4, second network access protocol 23, and second message distributor 104.

On receiving the REPLY message, the connection relay point state controller 122 sets the connection relay point state to a timeout waiting state (TIME-WAIT). When the 2 MSL timer is expired in this state, the controller deletes the entry of the corresponding connection relay point from the connection relay point control table, and judges at this time that the connection close operation of the connection C1 is completed (CLOSE).

As described above, according to the present embodiment, by providing the message having the header dedicated for each of the connection opening function and the connection close function, and including only the information necessary for the control in the message header, the packet transmitted with the access link includes no unnecessary information. Additionally, since the overhead size of each message header is smaller than the total size of the conventional TCP and IP headers, the overhead of the header of the packet transmitted in the access link decreases to reduce the data amount, and the throughput during the data transmission between the terminal equipment and the server terminal equipment is enhanced.

2. Second Embodiment

A second embodiment of the data communication system of the present invention will next be described with reference to the drawings.

Figure 10:
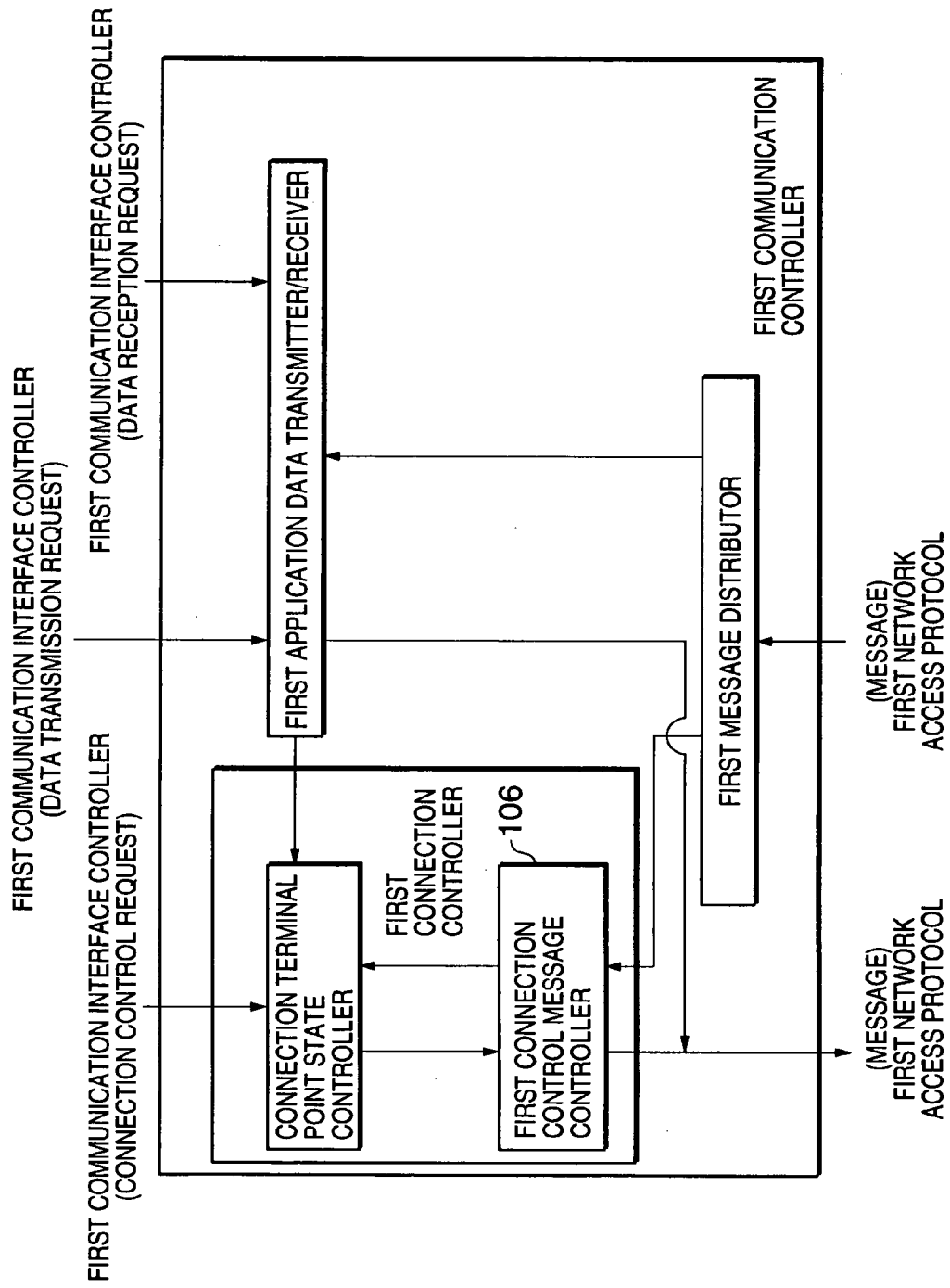
FIG. 10 is a diagram showing the constitution of a second embodiment of the data communication system of the present invention, and is a block diagram showing the constitution of the first communication controller shown in FIG. 1.
Figure 11:
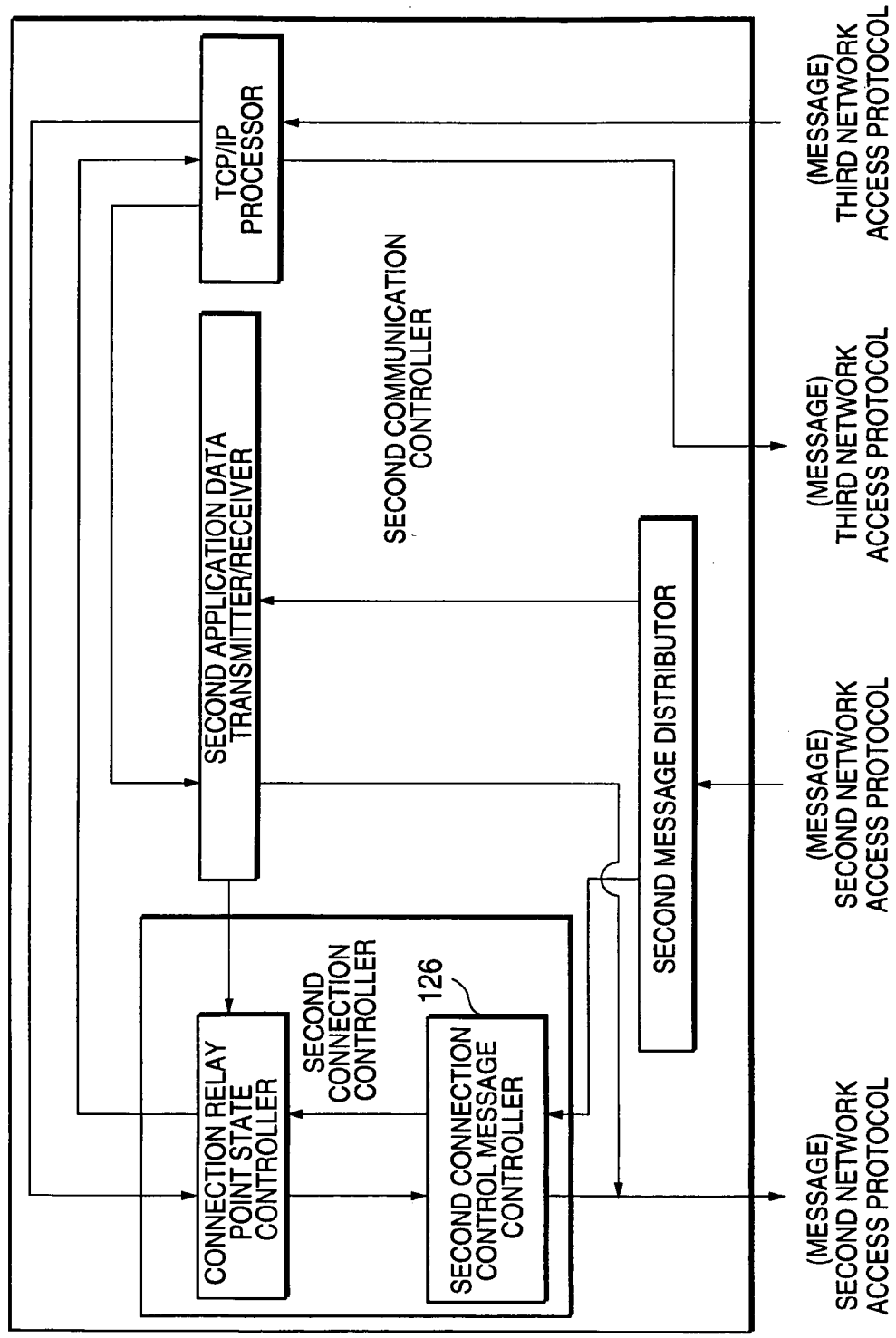
FIG. 11 is a diagram showing the constitution of the second embodiment of the data communication system of the present invention, and is a block diagram showing the constitution of the second communication controller shown in FIG. 1.

FIG. 10 is a diagram showing the constitution of the second embodiment of the data communication system of the present invention, and is a block diagram showing the constitution of the first communication controller shown in FIG. 1. FIG. 11 is a diagram showing the constitution of the second embodiment of the data communication system of the present invention, and is a block diagram showing the constitution of the second communication controller shown in FIG. 1.

The data communication system of the present embodiment is, as shown in FIG. 10, provided with a first connection control message controller 106 in the first connection controller of the first communication controller, and is, as shown in FIG. 11, provided with a second connection control message controller 126 in the second connection controller of the second communication controller.

Each of the first connection control message controller 106 and the second connection control message controller 126 has a CC message control table comprising entries of connection identifier member and CC order number member, and a CC message buffer for storing a message copy corresponding to each connection. Additionally, the message prepared in the connection terminal point state controller is transferred to the first connection control message controller 106, and the message prepared by the connection relay point state controller is transferred to the second connection control message controller 126. Moreover, the first message distributor transfers the message for the connection control received from the first network access protocol to the first connection control message controller 106, and the second message distributor transfers the message for the connection control received from the second network access protocol to the second connection control message controller 126. The other constitution is similar to the constitution of the first embodiment.

An operation of the second embodiment of the data communication system of the present invention will next be described.

Figure 12:
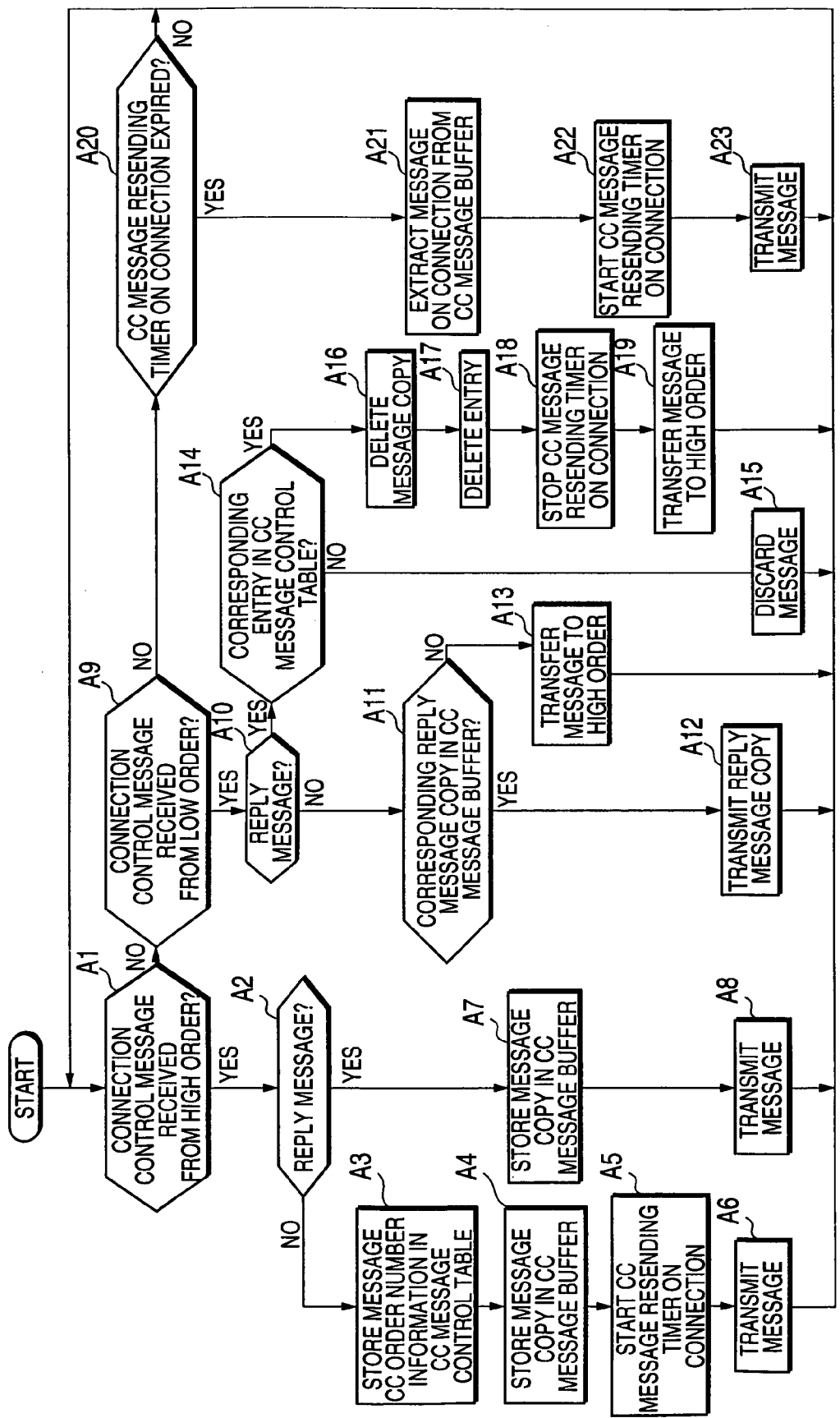
FIG. 12 is a flowchart showing the operation of the first embodiment of the data communication system of the present invention.

FIG. 12 is a flowchart showing the operation of the second embodiment of the data communication system of the present invention. Additionally, the flowchart of FIG. 12 shows the operations of the first connection control message controller 106 and second connection control message controller 126 in a unified manner. The first connection control message controller 106 and second connection control message controller 126 appropriately execute the processing shown in FIG. 12 on the transmission side or the reception side of the connection control message.

In the following, with respect to the connection control operation, an operation will be described as an example from when the connection terminal point state controller of the first communication controller transmits the message (excluding the REPLY message) until the REPLY message is received. Additionally, an operation from when the connection relay point state controller transmits the message until the REPLY message is received is symmetrical to the above-described operation, the description thereof is omitted here.

In the first embodiment, the loss of the message in the course of the transmission between the first communication controller and the second communication controller is not particularly handled. In the second embodiment, the lost message is resent by the first connection control message controller 106 and the second connection control message controller 126.

In FIG. 12, for example, when the message prepared by the connection terminal point state controller is transferred to the first connection control message controller 106, the first connection control message controller 106 first judges whether or not the received message is transferred from a high-order apparatus (step A1). Here, since the message is transferred from the connection terminal point state controller, the controller advances to step A2 to judge whether or not the message is REPLY message. Here, since it is not REPLY message, the controller advances to step A3 to search for the entry having the value of the connection identifier information of the message from the CC message control table (if there is no entry, an entry having the value of the connection identifier information as the value of the connection identifier member is newly prepared), and to store the value of CC order number information of the message into the CC order number member. Subsequently, the controller stores the copy of the message into the CC message buffer (step A4), starts CC message re-sending timer of the corresponding connection (step A5), and transmits the message to the second communication controller via the first network (step A6). Additionally, when the message is REPLY message, the controller stores the message copy into the CC message buffer (step A7), and transmits the message to the second communication controller via the first network (step A8).

Subsequently, when the second communication controller receives the message from the first connection control message controller 106, the received message is transferred to the second connection control message controller 126.

The second connection control message controller 126 first performs the judgment of the above-described step A1, and subsequently judges whether or not the message is transferred from a low-order apparatus (step A9). Here, since the message is transferred via the second network access protocol, the controller goes to step A10 to judge whether the message is REPLY message. Furthermore, since the message is not REPLY message, the controller goes to step A11 to judge whether or not the copy of REPLY message corresponding to the message is present in the CC message buffer. When the corresponding REPLY message copy is present, the controller transmits the copy to the first communication controller (step A12).

Moreover, when there is no corresponding REPLY message copy, the message is transferred to the high-order apparatus (here, the connection relay point state controller) (step A13).

Subsequently, when the second communication controller returns the REPLY message to the message transmitted from the first communication controller, the REPLY message is transferred to the first connection control message controller 106. From the judgment results of the above-described steps A1, A9, and A10, the first connection control message controller 106 goes to step A14 to judge whether or not the entry corresponding to the message is present in the CC message control table.

When the message is returned without being lost, and the corresponding entry is present, the controller goes to step A16 to delete the message copy from the CC message buffer, and to delete the corresponding entry from the CC message control table (step A17). Subsequently, the controller stops the corresponding CC message re-sending timer in an energized state (step A18), and transfers the REPLY message to the high-order apparatus (here, the connection terminal point state controller) (step A19).

On the other hand, when the message transmitted from the first communication controller is lost, the CC message re-sending timer started during the message transmission is expired (step A20). Therefore, the first connection control message controller 106 extracts the message copy from the CC message buffer (step A21), starts the corresponding CC message re-sending timer again (step A22), and transmits the message copy to the second communication controller to perform the re-sending (step A23). Additionally, also when the REPLY message returned from the second communication controller is lost, the message is resent from the first connection control message controller 106 as described above.

Here, when the corresponding REPLY message is transferred from the high-order apparatus (connection relay point state controller), the second connection control message controller 126 stores the copy into the CC message buffer (step A7). Therefore, when the resent message is received, the copy of the corresponding REPLY message stored in the CC message buffer is transmitted to the second communication controller (step A12).

As described above, according to the present embodiment, since the connection control message controller is disposed, the packet re-sending can independently be performed in the access link section and other sections. Therefore, with respect to the packet loss occurring in the access link section or the section other than the access link, the influence of the communication efficiency deterioration by the packet re-sending is not exerted to the section in which no packet loss occurs. Therefore, the throughput of the end—end communication during the packet loss is improved.

3. Third Embodiment

A third embodiment of the data communication system of the present invention will next be described with reference to the drawings.

In the third embodiment, the data communication function of the data communication system of the present invention (data transmission function, data reception function) will be described. Additionally, for the data communication system of the third embodiment, the constitutions of the first and second communication controllers shown in FIG. 1 are different from those of the first and second embodiments. Since the other constitutions are similar to those of the first embodiment, the description thereof is omitted.

Figure 13:
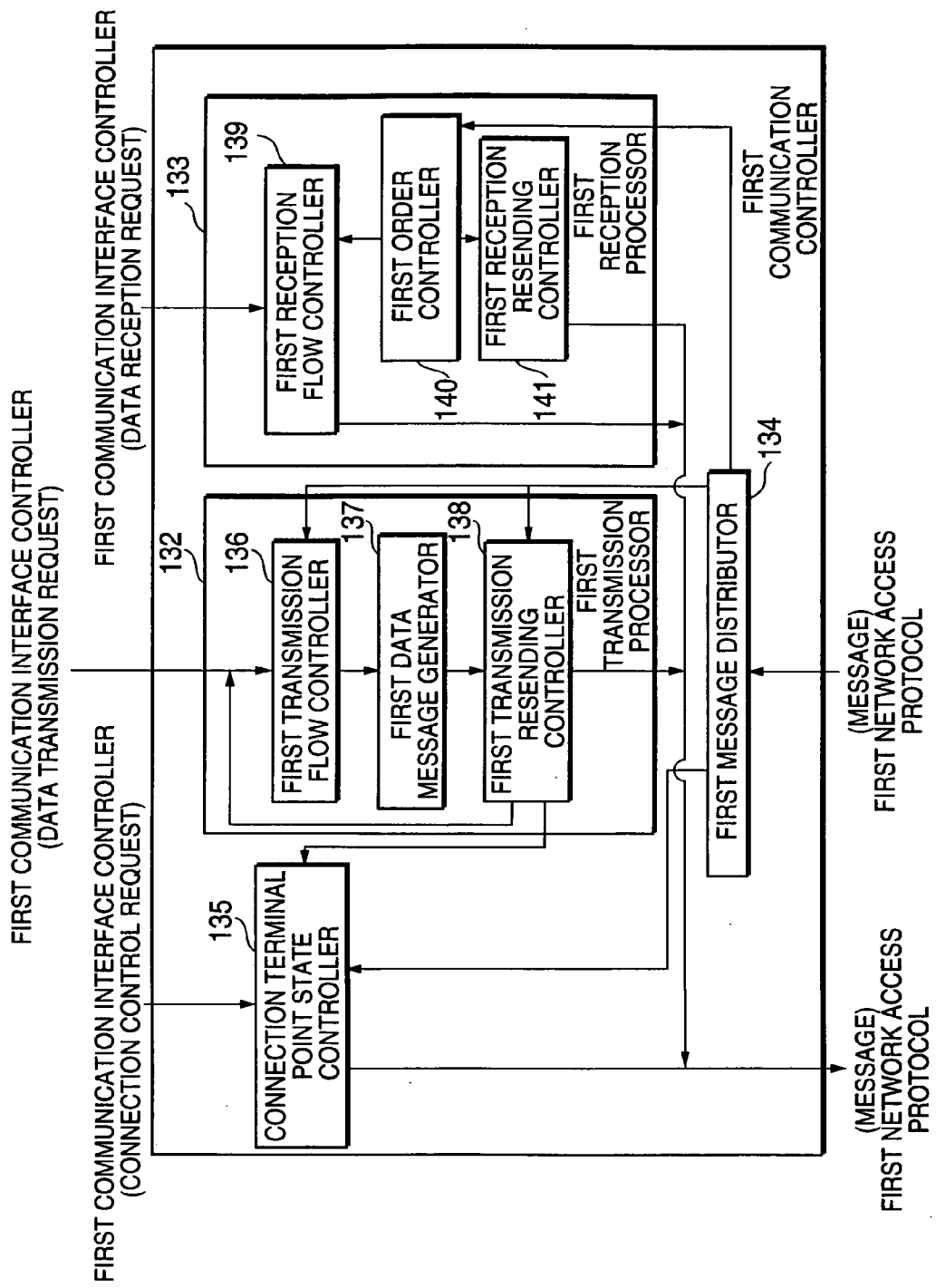
FIG. 13 is a diagram showing the constitution of a third embodiment of the data communication system of the present invention, and is a block diagram showing the constitution of the first communication controller shown in FIG. 1.

FIG. 13 is a diagram showing the constitution of the third embodiment of the data communication system of the present invention, and is a block diagram showing the constitution of the first communication controller shown in FIG. 1.

Figure 14:
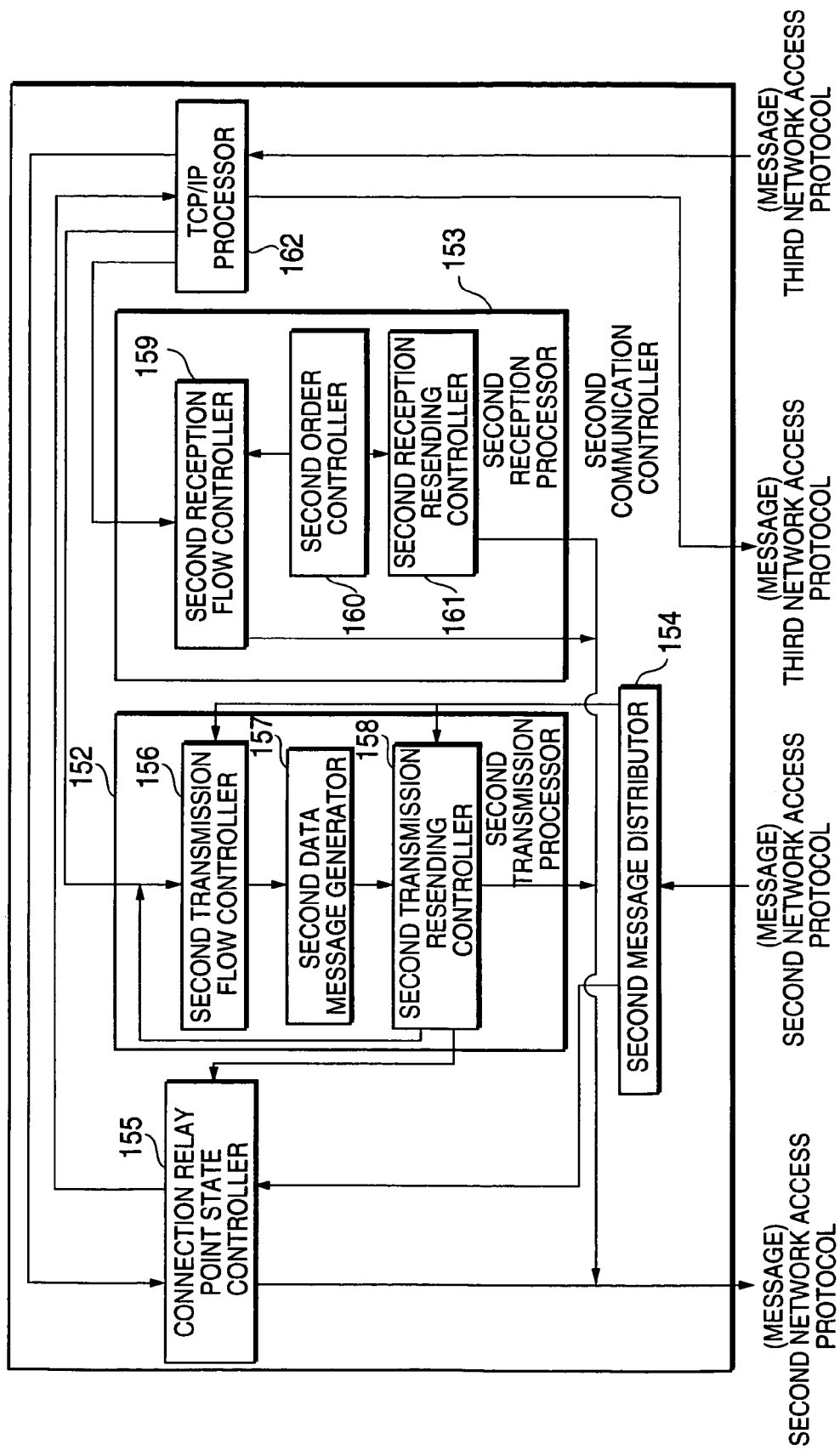
FIG. 14 is a diagram showing the constitution of the third embodiment of the data communication system of the present invention, and is a block diagram showing the constitution of the second communication controller shown in FIG. 1.

FIG. 14 is a diagram showing the constitution of the third embodiment of the data communication system of the present invention, and is a block diagram showing the constitution of the second communication controller shown in FIG. 1.

In FIG. 13, the first communication controller of the present invention is provided with a connection terminal point state controller 135, a first transmission processor 132, a first reception processor 133, and a first message distributor 134.

The first transmission processor 132 is provided with a first transmission flow controller 136, a first DATA message generator 137, and a first transmission re-sending controller 138, and the first reception processor 133 is provided with a first reception flow controller 139, first order controller 140, and a first reception re-sending controller 141.

In FIG. 14, the second communication controller of the present embodiment comprises a connection relay point state controller 155, a TCP/IP processor 162, a second transmission processor 152, a second reception processor 153, and a second message distributor 154.

The second transmission processor 152 comprises a second transmission flow controller 156, a second DATA message generator 157, and a second transmission re-sending controller 158, and the second reception processor 153 comprises a second reception flow controller 159, a second order controller 160, and a second reception re-sending controller 161.

The messages exchanged between the transmission processor and the reception processor of the first or second communication controller and the information notified by the messages will next be described with reference to FIG. 15.

FIG. 15 is a diagram showing the data communication messages for use in the third embodiment of the data communication system of the present invention.

In FIG. 15, the messages used in the third embodiment are divided into two groups: a data communication message group used for transferring the application data; and a data communication control message group used for the error control or flow control of the data communication message group.

The data communication message group is constituted only of data messages for conveying the application data (hereinafter referred to as DATA message). Additionally, the DATA message includes DM order number information indicating the sequence number (hereinafter referred to as DM order number) of the DATA message to be transmitted, urgent data information indicating whether or not the application data is urgent data, and push information indicating the presence/absence of a push function request.

The data communication control message group includes an acknowledgment message (hereinafter referred to ACK message) used for transmission acknowledgment of the DATA message, a reception non-receivable message (hereinafter referred to as RNR message) used for the flow control of the DATA message and requesting the transmission discontinuation of the DATA message, and a reception receivable message (hereinafter referred to as RR message) used for the flow control of the DATA message and requesting the transmission resuming of the discontinued DATA message. Each of these messages includes connection identifier information indicating the connection identifier and re-sending information indicating whether or not the message itself is resent. Moreover, the ACK message includes accumulation acknowledgment information constituted of DM order number used for performing accumulation acknowledgment.

Even when any of the above-described messages is transmitted, the first and second communication controllers store the identifier of the connection corresponding to the message to be transmitted as the connection identifier information, and store the re-sending information indicating whether or not the message to be transmitted is the resent message. The reception side identifies the connection corresponding to the received message from the connection identifier information of the received message, and judges from the re-sending information of the received message whether or not the received message is resent.

The first storage unit of the present embodiment comprises a transmission data buffer for temporarily storing the application data to be transmitted, a received data buffer for temporarily storing the received application data, a connection terminal point control table for storing various information to control the connection terminal point, a transmission message buffer for temporarily storing the transmitted DATA message, and a received message buffer for temporarily storing the received DATA message.

FIG. 16 is a table diagram showing one constitution example of the connection terminal point control table owned by the first storage unit of the third embodiment of the data communication system of the present invention.

As shown in FIG. 16, the connection terminal point control table is constituted of a plurality of entries comprising: a socket identifier member for storing a socket identifier; a connection identifier member for storing a connection identifier (connection terminal point identifier); a source port number member for storing a socket port number; a source IP address member for storing a socket IP address; a destination port number member for storing the port number of a communication object-side socket; a destination IP address member for storing the IP address of the communication object-side socket; a connection terminal point state member for storing a connection terminal point state; a transmission enable state member set to either "enabled" or "disabled" and storing the transmission enable state of the connection terminal point; a reception enable state member set to either "enabled" or "disabled" and storing the reception enable state of the connection terminal point; an accumulation acknowledgment number member for storing DM order number of accumulation acknowledged DATA message among the DATA messages received at the connection terminal point; a transmission completion member set to either "completed" or "uncompleted" and storing the transmission acknowledgment result with respect to the transmitted DATA message; and a close request member set to either "present" or "absent" and storing the presence/absence of the connection close request concerning the connection terminal point.

Each entry of the connection terminal point control table is generated or deleted by the first communication controller. When a new entry is generated, the values of the transmission enable state member and reception enable state member are set to "enabled", the value of the transmission completion member is set to "uncompleted", and the value of the close request member is set to "absent".

On the other hand, the second storage unit of the router of the present embodiment comprises the transmission data buffer for temporarily storing the application data to be transmitted, the received data buffer for temporarily storing the received application data, a connection relay point control table for storing various information to control the connection relay point, the transmission message buffer for temporarily storing the transmitted DATA message, and a received message buffer for temporarily storing the received DATA message.

FIG. 17 is a table diagram showing one constitution example of the connection relay point control table owned by the second storage unit of the third embodiment of the data communication system of the present invention.

As shown in FIG. 17, the connection relay point control table of the second storage unit is constituted of a plurality of entries comprising: the connection identifier member for storing the connection identifier (connection relay point identifier); a first port number member for storing the port number of the socket on a terminal equipment side: a first IP address member for storing the IP address of the socket on the terminal equipment side; a second port number member for storing the port number of the socket on a server terminal equipment side; a second IP address member for storing the IP address of the socket on the server terminal equipment side; a connection relay point state member for storing a connection relay point state; the transmission enable state member set to either "enabled" or "disabled" and storing the transmission enable state of the connection relay point; the reception enable state member set to either "enabled" or "disabled" and storing the reception enable state of the connection relay point; the accumulation acknowledgment number member for storing DM order number of accumulation acknowledged DATA message among the DATA messages received at the connection relay point; the transmission completion member set to either "completed" or "uncompleted" and storing the transmission acknowledgment result with respect to the DATA message transmitted to the first communication controller; and a close request member set to either "present" or "absent" and storing the presence/absence of the connection close request concerning the connection terminal point.

Each entry of the connection relay point control table is generated or deleted by the second communication controller. When the new entry is generated, the values of the transmission enable state member and reception enable state member are set to "enabled", and the value of the transmission completion member is set to "uncompleted". Moreover, the value of the close request member is set to "absent", and the value of the close acknowledgment member is set to "uncompleted".

On receiving the message from the first network access protocol, the first message distributor 134 transfers the received message concerning the connection control to the connection terminal point state controller 135, or transfers the ACK message to the first transmission re-sending controller 138, or transfers the RNR message or the RR message to the first transmission flow controller 136, or transfers the DATA message to the first reception re-sending controller 141.

Similarly, on receiving the message from the second network access protocol or the third network access protocol, the second message distributor 154 transfers the received message concerning the connection control to the connection relay point state controller, or transfers the ACK message to the second transmission re-sending controller 158, or transfers the RNR message or the RR message to the second transmission flow controller 156, or transfers the DATA message to the second reception re-sending controller 161.

The connection terminal point state controller 135 is, for example, constituted similarly to the connection control site of the conventional TCP, and performs the connection control for each control object (referred to as the connection terminal point) of the first communication controller. Moreover, when there is a connection opening or close request from the first communication interface controller, the processing is performed on the following operation condition.

With respect to the unopened connection, the connection terminal point state controller 135 sets the value of the corresponding connection terminal point state member of the connection terminal point control table to a closed state (hereinafter referred to as CLOSED).

Moreover, when the connection is opened by the connection opening request, the port number and IP address of the socket of the terminal equipment constituting the connection before the data communication is performed, and the port number and IP address of the socket of the server terminal equipment are exchanged with those of the connection relay point state controller 155, and stored into the source port number member, source IP address member, destination port number member, and destination IP address member of the connection terminal point control table, and the value of the connection terminal point state member is set to ESTAB.

Furthermore, when there is a connection close request from the first communication interface controller, the value of the corresponding transmission completion member is referred to. When the value is "completed", the connection close processing of performing the data communication in a router direction from the terminal equipment is performed, and the value of the connection terminal point state member is set to FIN–WAIT. Moreover, when the value of the transmission completion member is "uncompleted", the value of the close request member is set to "present", thereby finishing the processing. Thereafter, when there is the connection close request from the first transmission re-sending controller 138, the connection close processing of performing the data communication in the router direction from the terminal equipment is performed, and the value of the connection terminal point state member is set to FIN–WAIT.

Moreover, when the connection terminal point state is ESTAB, and there is the connection close request from the object side, the connection close processing of performing the data communication in the direction of the terminal equipment from the router is performed, and the value of the connection terminal point state member is set to CLOSE–WAIT.

When there are the connection close request from the first communication interface controller, and the connection close request from the object side, and each connection close processing is completed, the corresponding connection terminal point entry of the connection terminal point control table is deleted, and the value of the connection terminal point state member is set to CLOSED.

The first transmission processor 132 and the first reception processor 133 are used in common by the first communication controller of the terminal equipment and the second communication controller of the router. An example of the use in the first communication controller will be described hereinafter. For the use in the second communication controller, the description may be read by replacing the connection terminal point with the connection relay point, the connection terminal point control table with the connection relay point control table, and the first network access protocol with the second network access protocol.

When the first transmission flow controller 136 of the first transmission processor 132 receives the data transmission request from the first communication interface controller or the first transmission re-sending controller 138 (the second transmission flow controller 156 receives the request from the TCP/IP processor 162 or the second transmission re-sending controller 158), the controller checks the value of the corresponding connection terminal point state member of the connection terminal point control table. When the connection terminal point state is ESTAB or CLOSE–WAIT (the connection relay point state is ESTAB or FIN–WAIT for the second communication controller), the controller stores "uncompleted" to the transmission completion member, starts the following data transmission processing, and finishes the processing in other cases.

In the data transmission processing, first, the first transmission flow controller 136 checks the value of the transmission enable state member, the number of messages concerning the corresponding connection terminal point stored in the transmission message buffer and the presence/absence of the application data stored in the transmission data buffer.

When the value of the transmission enable state member is "enabled", the number of messages stored in the transmission message buffer is smaller than the window size, and the application data is present in the transmission data buffer; the corresponding connection terminal point identifier and DATA message generation request are transferred to the DATA message generator 138.

On the other hand, when the value of the transmission enable state member is "disabled", the number of messages is equal to or more than the window size, or no corresponding application data is present in the transmission data buffer, the first transmission flow controller 136 finishes the processing.

Moreover, on receiving the RNR message from the first message distributor 134, the first transmission flow controller 136 identifies the corresponding terminal point from the connection identifier information, and sets the value of the transmission enable state member of the connection terminal point control table to "disabled". Furthermore, on receiving the RR message from the first message distributor 134, the controller identifies the corresponding terminal point from the connection identifier information, sets the value of the transmission enable state member of the connection terminal point control table to "enabled", and starts the data transmission operation.

On receiving the connection terminal point identifier and DATA message generation request from the first transmission flow controller 136, the first DATA message generator 137 cuts out the sub-application data of the size whose upper limit is MSS from the top of the application data concerning the corresponding connection terminal point stored in the transmission data buffer, and generates the DATA message. The DATA message is constituted of the connection identifier information with the corresponding connection terminal point identifier stored therein, DM order number information with DM order number stored therein, and the sub-application data. The prepared DATA message is transferred to the first transmission re-sending controller 138.

On receiving the DATA message from the first DATA message generator 137, the first transmission re-sending controller 138 stores the copy into the transmission message buffer, and transfers the message to the first network access protocol.

Here, when the re-sending timer concerning the corresponding connection terminal point is not started, the controller starts the re-sending timer, and transfers the connection terminal point identifier and data transmission request to the first transmission flow controller 136.

Moreover, on receiving the ACK message from the first message distributor 134, the first transmission re-sending controller 138 identifies the corresponding connection terminal point from the connection identifier information of the received ACK message, and deletes the transmission acknowledged DATA message (DATA message in which the value of DM order number information is smaller than the value stored in the accumulation acknowledgment information) by the accumulation acknowledgment information of the ACK message among the DATA messages stored in the transmission message buffer.

Furthermore, when there is DATA message to be deleted from the transmission message buffer, the operating re-sending timer is finished. However, when there is further DATA message in the transmission message buffer, the re-sending timer is again started.

Moreover, when the transmission acknowledged DATA message or the application data is not present in the transmission message buffer and the transmission data buffer, the value of the corresponding transmission completion member of the connection terminal point control table is set to "completed". Furthermore, when the close request member value is checked, and the close request member value is "present", the connection close request is sent to the connection terminal point state controller 135, and the data transmission processing is finished. On the other hand, when the value of the close request member is "absent", the data transmission processing is finished as it is.

Furthermore, when there is DATA message concerning the corresponding connection terminal point in the transmission message buffer, or there is the application data in the transmission data buffer, the data transmission request is sent to the first transmission flow controller 136.

When the re-sending timer of the arbitrary connection terminal point times out, the first transmission re-sending controller 138 re-sends the corresponding DATA messages stored in the transmission message buffer in order from a smaller DM order number information value. During re-sending the re-sending information of DATA message is set to "re-send".

For the timeout value of the re-sending timer, similarly to TCP, an appropriate value is considered to be calculated based on RTT value which is time from when the DATA message is transmitted until the ACK message notifying the transmission acknowledgment is received.

When the first order controller 140 receives DATA message from the first message distributor 134, and the state of the connection terminal point corresponding to the received DATA message is ESTAB, or other than FIN–WAIT (for the second communication controller, when the connection relay point state is ESTAB or other than CLOSE–WAIT), the first order controller discards the received DATA message, and finishes the processing.

On the other hand, when the connection terminal point state is ESTAB, or FIN–WAIT (for the second communication controller, when the connection relay point state is ESTAB or CLOSE–WAIT), the first order controller checks the content of the re-sending information of the received DATA message. When the re-sending information is not "re-send", the received DATA message is stored in the received message buffer. Moreover, when the re-sending information is "re-send", it is checked whether there is DATA message having the same DM order number among the DATA messages stored in the received message buffer. When there is the message, the received DATA message is discarded and the processing is finished. When there is no such message, the received message is stored in the received message buffer.

Here, when the DATA message is stored in the received message buffer, the first order controller 140 refers to the value of the corresponding accumulation acknowledgment number member (referred to as the accumulation acknowledgment number) of the connection terminal point control table. When there is DATA message having the same accumulation acknowledgment number in the DM order number information among the DATA messages stored in the received message buffer, the sub-application data included in the DATA message is added to the rear of the received data buffer. Furthermore, the DATA message is deleted from the received message buffer, and the value of the accumulation acknowledgment number member is increased for one DATA message.

The above processing is continued until the DATA message having the same accumulation acknowledgment number in the DM order number information disappears in the received message buffer. Thereafter, the connection terminal point identifier and the reception flow control request are sent to the first reception flow controller 139.

When ACK transmission condition is established concerning each connection terminal point, the first reception re-sending controller 141 generates ACK message, and transfers the message to the first network access protocol. Additionally, when the ACK message is generated, the value of the accumulation acknowledgment number member of the corresponding connection terminal point of the connection terminal point control table is stored in the ACK DATA message accumulation acknowledgment information.

Additionally, in order to efficiently return the above-described ACK message, the following transmission conditions are considered.

A first condition is that the DATA message within a window size (e.g., an arbitrary fixed value of 1 to the window size) subsequent to the accumulation acknowledged DATA message is received, a second condition is that the loss of DATA message is detected, and a third condition is that a predetermined time elapses after the ACK message is transmitted. Moreover, the logical sum condition of the first, second, third conditions is considered.

For example, when the DATA message is transmitted in a burst manner, and each DATA message is transmitted without error, the ACK message can efficiently be transmitted utilizing the first condition. Moreover, the utilization of the second condition can accelerate the re-sending of the lost DATA message. Furthermore, considering that the DATA message may be lost during the transmission, the utilization of the third condition independent of the reception event of the DATA message is essential as a condition for sending the ACK message.

Additionally, when the third condition is utilized in combination with the first or second condition, the time elapsed after the transmission may be set to a time longer than the time necessary for transmitting the DATA message for the window size.

Moreover, when the first condition is employed, the first order controller 140 needs to be operated so that the reception of the corresponding connection terminal point identifier and DATA message is notified to the first reception re-sending controller 141 every time the DATA message concerning the arbitrary connection terminal point is stored in the received message buffer. Moreover, the first reception re-sending controller 141 may be operated to constantly monitor the received message buffer, and to count the number of DATA messages newly added to the received message buffer for each connection terminal point.

Similarly, when the second condition is employed, the first order controller 140 needs to be operated so that the connection terminal point identifier and DATA message loss are notified to the first reception re-sending controller 141 every time the loss of the DATA message concerning the arbitrary connection terminal point is detected. Moreover, the first reception re-sending controller 141 may be operated to constantly monitor the received message buffer, and to check whether or not there is loss in the received DATA message for each connection terminal point.

When the DATA message is stored in the received message buffer, the method of detecting the DATA message loss with the first order controller 140 comprises a method of checking whether the value of DM order number information is equal to the value of the accumulation acknowledgment number member of the connection terminal point control table, and a method of checking whether or not one previous value of DM order number information is already stored in the received message buffer. In this case, when the value of DM order number information is not the value of the accumulation acknowledgment number member, and one previous value of the DM order number information is not present in the received message buffer, it can be seen that the DATA message is lost.

In the present embodiment, the logical sum condition of first, second, and third conditions is used as the ACK message transmission condition, and the first order controller 140 notifies the first reception re-sending controller 141 of the reception of the connection terminal point identifier and DATA message every time the DATA message is stored in the received message buffer, and notifies the first reception re-sending controller 141 of the connection terminal point identifier and DATA message loss every time the DATA message loss is detected.

On receiving the notification of the connection terminal point identifier and reception flow control request from the first order controller 140 and the first communication interface controller (further from the TCP/IP processor 162 in the second reception flow controller 159), the first reception flow controller 139 confirms the value of the reception enable state member concerning the corresponding connection terminal point of the connection terminal point control table, and the size of the application data stored in the received data buffer. When the value of the reception enable state member is "enabled", and the size of the application data is larger than the upper limit value of the received data buffer, the controller changes the value of the reception enable state member to "disabled", generates RNR message and transfers the message to the first network access protocol.

When the value of the reception enable state member is "disabled", and the size of the application data is smaller than the lower limit value of the received data buffer, the controller changes the value of the reception enable state member to "enabled", generates RR message and transfers the message to the first network access protocol 15.

The second communication controller forms a pair with the first communication controller to realize the connection control and reliable data communication between the terminal equipment and the router. Moreover, the controller forms a pair with the TCP module to realize the TCP protocol control, that is, the connection control and the reliable data communication between the server terminal equipment and the router.

The second communication controller operates with the TCP module and IP module of the server terminal equipment similarly to the conventional TCP module and IP module. Specifically, the second communication controller relays the connection C1 between the socket S1 of the terminal equipment (port number P1, IP address A1) and the socket S3 of the server terminal equipment (port number P3, IP address A3). During the generation of the TCP/IP packet addressed to the socket S3, the controller stores P1, P3 in the source port number field and destination port number field of the TCP header, and stores A1, A3 in the source IP address field and destination IP address field in the IP header. Moreover, the controller checks the contents of the TCP header and IP header of the received TCP/IP packet. When P3, P1 are stored in the source port number field and destination port number field of the TCP header, and A3, A1 are stored in the source IP address field and destination IP address field of the IP header, the controller judges that the received TCP/IP packet is addressed to the socket S1 of the connection C1. Furthermore, the controller judges that the TCP/IP packet is addressed to itself, and performs the reception processing of the packet similarly to the conventional IP and TCP.

The connection relay point state controller 155 performs the connection control for each control object (referred to as the connection relay point) in the second communication controller.

The connection relay point state controller 155 performs the following processing to the connection opening request and connection close request transmitted from the server terminal equipment via the connection terminal point state controller 135 and TCP/IP processor 162.

First, with respect to the unopened connection, the connection relay point state controller 155 sets the value of the connection relay point state member of the connection relay point control table to CLOSED. Moreover, when the connection is opened in response to the connection opening request, the port number and IP address of the socket of the terminal equipment constituting the connection opened before the data communication is performed, and the port number and IP address of the socket of the server terminal equipment 3 are exchanged with those of the connection terminal point state controller 135, and stored into the corresponding first port number member, first IP address member, second port number member, and second IP address member of the connection relay point control table, and the value of the relay point state member is set to ESTAB.

When the connection relay point state is ESTAB, and there is a connection close request from the TCP module of the server terminal equipment, the value of the corresponding transmission completion member is referred to. When the value of the transmission completion member is "completed", the connection close processing of performing the data communication in the router direction from the terminal equipment is performed, and the value of the connection relay point state member is set to FIN–WAIT (object finish waiting). Moreover, when the value of the transmission completion member is "uncompleted", the value of the close request member is set to "present", thereby finishing the processing.

On the other hand, when there is a connection close request from the second transmission re-sending controller 158, the connection close processing in the router direction from the terminal equipment is performed, and the value of the connection relay point state member is set to FIN–WAIT. Moreover, when the connection relay point state is ESTAB, and there is a connection close request from the connection terminal point state controller 135, the connection close processing in the direction of the terminal equipment from the router is performed, and the value of the connection relay point state member is set to CLOSE–WAIT.

When there are a connection close request from the connection terminal point state controller 135, and a connection close request from the TCP module, and each connection close processing is completed, the corresponding entry of the connection relay point control table is deleted.

The TCP/IP processor 162 is a module having the function similar to that of the conventional TCP module and IP module, and assembles or disassembles the TCP segment and IP data gram.

Moreover, performed are the reception processing of the connection control request, the transmission of the application data stored in the received data buffer, the storage of the application data included in the received TCP/IP packet to the transmission data buffer, and the connection control with the object-side TCP module during these processings, the re-sending control, the flow control, the order control of the received application data, and the like. However, the processor is different from the conventional TCP module and IP module in the following respects.

When the TCP/IP processor 162 receives the TCP segment in which a synchronization flag, a close flag and a reset flag are set, the processor notifies the connection relay point state controller 155 that the flags are set.

The processor refers to the source port number field, destination port number field, source IP address field, and destination IP address field of the TCP header and IP header included in the received TCP/IP packet, and judges whether the values of the fields agree with the second port number member, first port number member, second IP address member, and first IP address member of the connection relay point control table. When all the values agree, the processor judges that the received TCP/IP packet is addressed to the connection relay point.

Moreover, when the TCP/IP packet related with the arbitrary connection relay point C1 is assembled, the processor stores the values of the first port number member, second port number member, first IP address member, and second IP address member concerning the connection relay point C1 of the connection relay point control table in the source port number field and destination port number field of the TCP header included in the TCP/IP packet, and the source IP address field and destination IP address field of the IP header.

Moreover, the processor monitors the presence/absence of the application data concerning each connection relay point stored in the received data buffer, cuts out the data of the MSS size at maximum from the top of the application data when the application data is present, and notifies the second reception flow controller 159 of the connection relay point identifier and reception flow control request. Furthermore, the processor generates the IP data gram including the cut application data, and transfers the generated IP data gram to the third network access protocol.

Moreover, when the application data is included in the IP data gram received from the third network access protocol, the TCP/IP processor 121 extracts the application data, performs the order control while storing the data into the transmission data buffer, and notifies the second transmission flow controller 156 of the connection relay point identifier and the data transmission request.

The operation of the third embodiment of the data communication system of the present invention will next be described with reference to FIGS. 18 to 22.

Figure 18:
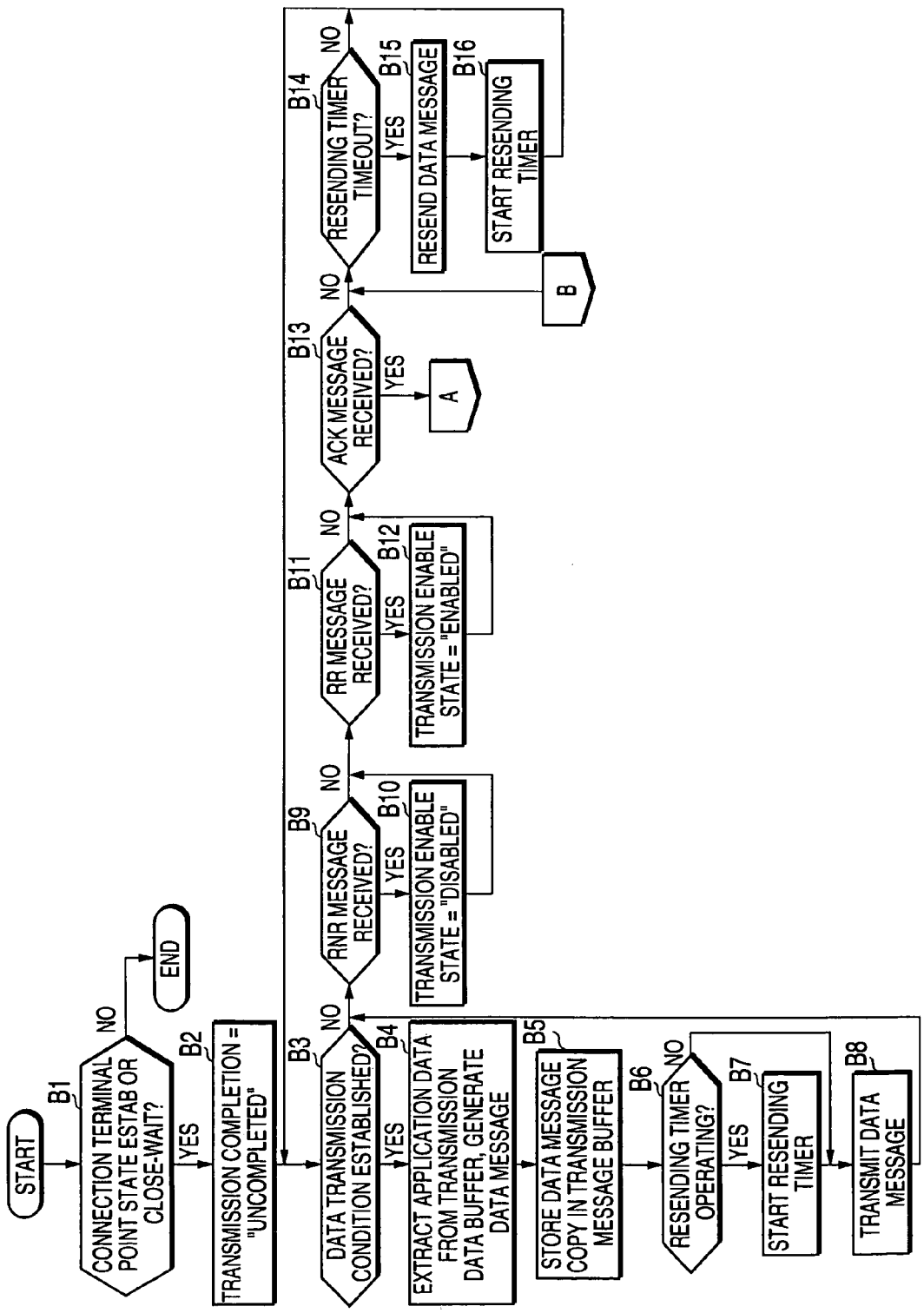
FIG. 18 is a diagram showing the operation of the third embodiment of the data communication system of the present invention, and is a flowchart showing the processing procedures of first and second transmission processors shown in FIG. 13.
Figure 19:
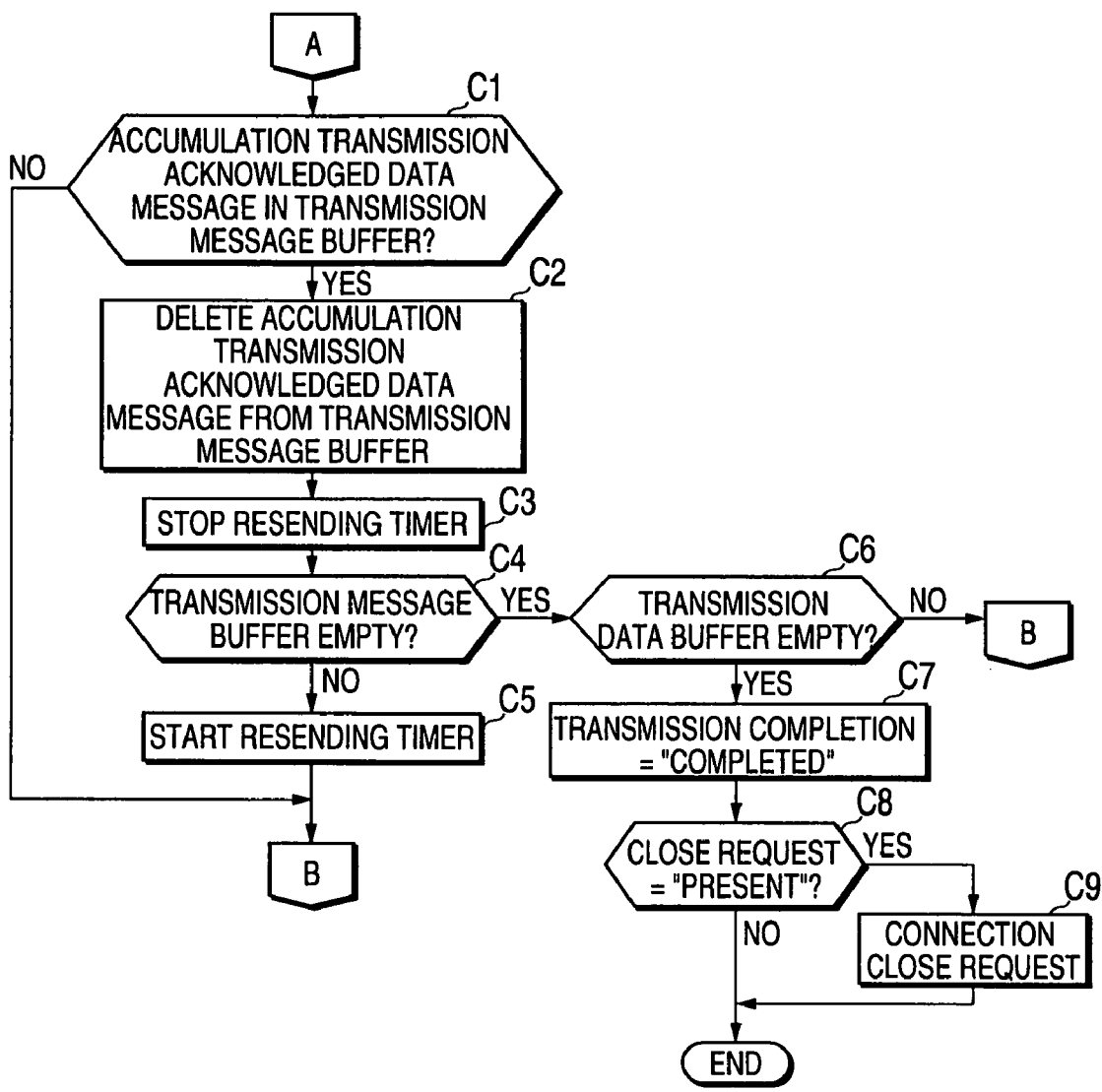
FIG. 19 is a diagram showing the operation of the third embodiment of the data communication system of the present invention, and is a flowchart showing the processing procedures of the first and second transmission processors shown in FIG. 13.
Figure 20:
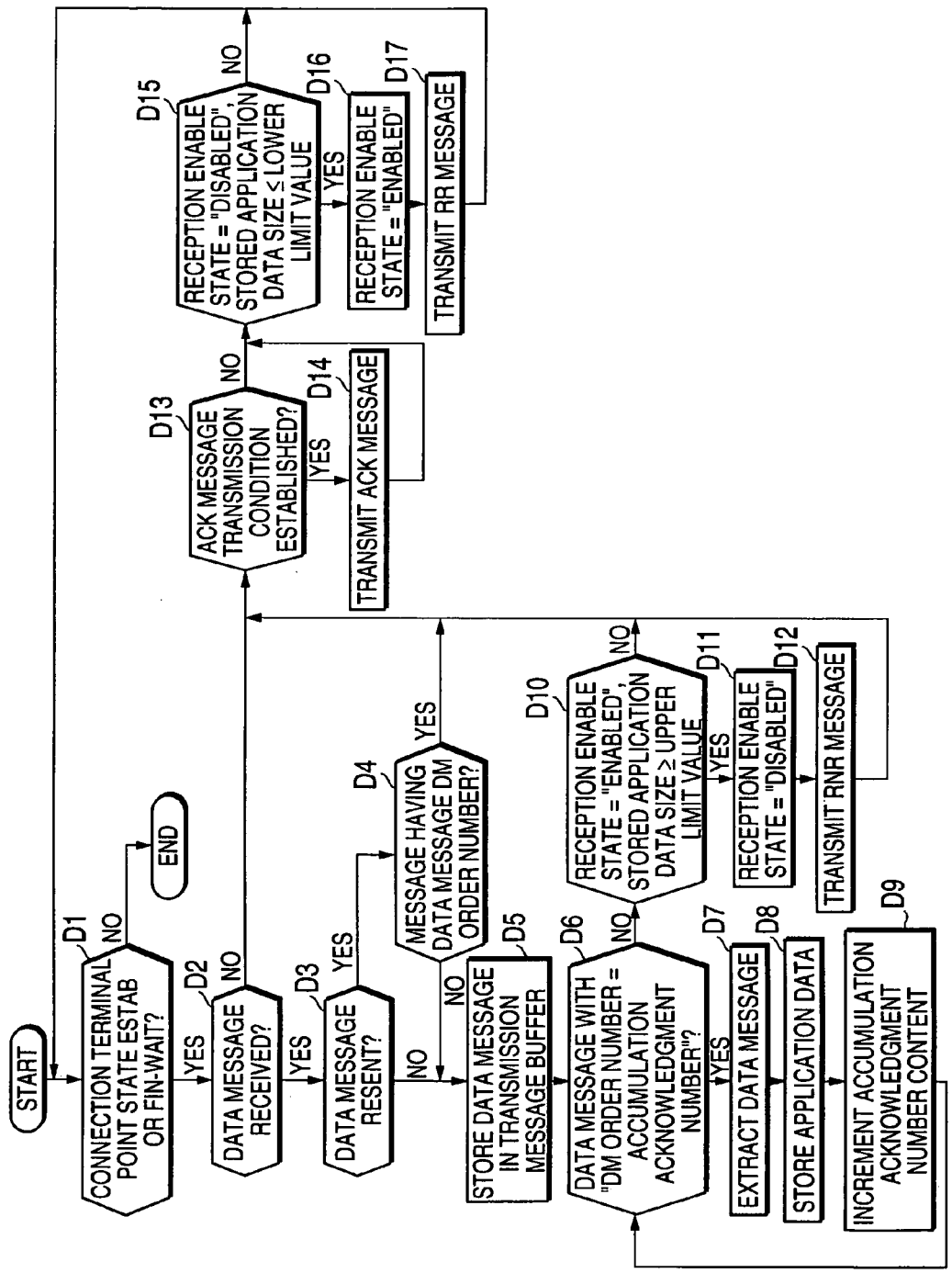
FIG. 20 is a diagram showing the operation of the third embodiment of the data communication system of the present invention, and is a flowchart showing the processing procedures of first and second reception processors shown in FIG. 13.

FIGS. 18 and 19 are diagrams showing the operation of the third embodiment of the data communication system of the present invention, and are flowcharts showing the processing procedure of the first and second transmission processors shown in FIG. 13. FIG. 20 is a diagram showing the operation of the third embodiment of the data communication system of the present invention, and is a flowchart showing the processing procedure of the first and second reception processors shown in FIG. 13.

Additionally, the flowcharts shown in FIGS. 18 and 19 unify and show the operation of the first and second transmission processors. The first and second transmission processors appropriately execute the processing shown in FIGS. 18 and 19 on the transmission side of the data. Similarly, the flowchart shown in FIG. 20 unifies and shows the operation of the first and second reception processors. The first and second reception processors appropriately execute the processing shown in FIG. 20 on the reception side of the data.

Additionally, the data communication operation comprises a data transmission operation (referred to the ascending data transmission operation) to the second processor from the first processor, and a data transmission operation (referred to as the descending data transmission operation) to the first processor from the second processor.

In the following description, the socket utilized by the first processor is set to S1, the port number of the socket S1 is P1, the IP address is A1, the socket utilized by the second processor is S3, the port number of the socket S3 is P3, and the IP address is A3.

Moreover, an example will be described in which the connection C1 is opened between the socket S1 (connection terminal point C1) of the terminal equipment and the socket S3 (connection relay point C1) of the server terminal equipment, and the data is transmitted to the second processor from the first processor via the connection C1. Additionally, it is assumed that the value of the connection terminal point state member concerning the connection terminal point C1 of the connection terminal point control table of the first storage unit is ESTAB or CLOSE-WAIT, the value of the transmission enable state member is "enabled", and the number of messages concerning the connection terminal point C1 stored in the transmission message buffer is equal to or less than the window size. Moreover, it is assumed that the value of the connection relay point state member concerning the connection relay point C1 of the connection relay point control table of the second storage unit is ESTAB or CLOSE-WAIT, and the value of the reception enable state is "enabled".

(a) Basic Transmission Operation:

When the first processor designates the socket S1, and transfers the application data and the data transmission request to the first communication interface controller, the first communication interface controller adds the application data to the rear of the transmission data buffer corresponding to the socket S1, and notifies the first transmission flow controller 136 of the identifier of socket S1 and the data transmission request.

As shown in FIG. 18, on receiving the data transmission request together with the identifier of the socket S1, the first transmission flow controller 136 identifies the connection terminal point C1 corresponding to the socket identifier S1 from the connection terminal point control table, and checks the value of the connection terminal point state member concerning the connection terminal point C1 (step B1). In this case, since the connection terminal point state is ESTAB or CLOSE-WAIT, the controller stores "uncompleted" in the transmission completion member (step B2).

Subsequently, the controller checks the value of the transmission enable state member, the number of messages concerning the connection terminal point C1 stored in the transmission message buffer, and the presence/absence of the application data concerning the connection terminal point C1 stored in the transmission data buffer, and judges whether or not the data transmission condition is established (step B3). In this case, since the value of the transmission enable state member is "enabled", the number of messages is smaller than the window size, and the application data concerning the connection terminal point C1 is present in the transmission data buffer, the first transmission flow controller 136 judges that the transmission condition is established, and notifies the first DATA message generator 137 of the connection terminal point identifier C1 and DATA message generation request.

On receiving the DATA message generation request accompanied by the connection terminal point identifier C1, the first DATA message generator 137 cuts out the sub-application data for MSS from the top of the application data concerning the connection terminal point C1 (socket S1) stored in the transmission data buffer, generates DATA message including the cut sub-application data (step B4), and transfers the message to the first transmission re-sending controller 138.

The first transmission re-sending controller 138 stores the copy of the transferred DATA message to the transmission message buffer (step B5), and judges whether or not the re-sending timer for the DATA message of the connection terminal point C1 is started (step B6). When the re-sending timer is not started, the controller starts it (step B7). When the re-sending timer is started, the controller goes to step B8, and transfers the DATA message to the first network access protocol (step B8). The DATA message transferred to the first network access protocol is transferred to the second order controller 160 via the first network, second network access protocol, and second message distributor 154.

Moreover, the first transmission re-sending controller 138 transfers the connection terminal point identifier C1 and data transmission request to the first transmission flow controller 136. Thereby, the first transmission processor 132 repeats the above-described data transmission operation until the transmission enable state concerning the connection terminal point C1 of the connection terminal point control table becomes "disabled", the number of DATA messages concerning the connection terminal point C1 stored in the transmission message buffer reaches the window size, or the application data concerning the connection terminal point C1 runs out in the transmission data buffer.

On the other hand, on receiving the DATA message from the first transmission processor 132, as shown in FIG. 20, the second order controller 160 first checks the state of the connection relay point C1 (step D1). Here, since the connection relay point state is ESTAB or CLOSE–WAIT (ES-TAB or FIN–WAIT for the connection terminal point), the controller goes to step D2, checks whether or not the DATA message is received, and subsequently judges whether or not the DATA message is resent (step D3). When the received DATA message is a resent message, the controller checks the contents of the DATA message and the DM order number information of the DATA message concerning the connection relay point C1 stored in the received message buffer, and judges whether or not the DATA message having the DM order number information of the same content as that of the DM order number information is present in the received message buffer (step D4). When the corresponding DATA message is present in the received message buffer, the received DATA message is discarded and the processing is finished. Moreover, when the corresponding DATA message is absent from the received message buffer, the received DATA message is stored in the received message buffer (step D5).

Subsequently, the second order controller 160 checks the value of the corresponding accumulation acknowledgment number member of the connection relay point control table, and judges whether or not the DATA message having the DM order number information equal to the value of the accumulation acknowledgment number is present in the received message buffer (step D6). When the DATA message having the DM order number information equal to the value of the accumulation acknowledgment number is present, the DATA message is extracted from the received message buffer (step D7), and the application data included in the extracted DATA message is added to the rear of the received data buffer corresponding to the connection relay point C1 (step D8). Furthermore, the value of the accumulation acknowledgment number member is increased by one DATA message (step D9). Subsequently, the processing of steps D6 to D9 is repeated until the DATA message runs out. After the processing is finished, the second order controller 160 notifies the second reception flow controller 159 of the connection relay point identifier C1 and reception flow control request.

On receiving the reception flow control request accompanied by the connection relay point identifier C1 from the second order controller 160, the second reception flow controller 159 checks the value of the reception enable state member concerning the connection relay point C1 of the connection relay point control table, and the size of the application data concerning the connection relay point C1 stored in the received data buffer, and judges whether or not the reception enable state is "enabled" and the size of the application data is larger than a received data buffer upper limit value (step D10). Here, since the judgment condition of the step D10 is satisfied, the controller goes to step D11, sets the value of the reception enable state member to "disabled", generates RNR message and transfers the message to the second network access protocol (step D12).

On the other hand, when the application data concerning the connection relay point C1 is stored in the received data buffer, the TCP/IP processor 162 cuts out the sub-application data of MSS at maximum from the top of the application data, and notifies the second reception flow controller 159 of the connection relay point identifier C1 and reception flow control request. Moreover, the processor generates the TCP segment and IP data gram including the cut sub-application data, and transfers the generated IP data gram to the third network access protocol. The IP data gram transferred to the third network access protocol is transferred to the IP module of the server terminal equipment via the second network 5 and fourth network access protocol. Then, the IP module extracts the TCP segment from the IP data gram and transfers the segment to the TCP module.

The TCP module extracts the application data from the received TCP segment, and stores the data to the received data buffer of the second communication interface controller. The TCP/IP processor 162 and TCP module repeat the above-described operation until the application data concerning the connection relay point C1 stored in the received data buffer runs out. Additionally, at this time, the TCP/IP processor 162 and TCP module execute the flow control and re-sending control. Moreover, the TCP module also executes the order control of the received TCP segment. Since these operations are similar to those of the conventional TCP module, the description thereof is omitted.

On receiving the data reception request from the second processor via the socket S3, the second communication interface controller extracts the application data concerning the socket S3 stored in the received data buffer, and transfers the extracted application data to the second processor.

(b) Error Control Operation:

As shown in FIG. 20, on receiving the DATA message, the second reception re-sending controller 161 checks whether or not the transmission condition of ACK message is established in the corresponding connection relay point C1 (step D13), generates the ACK message by storing the value of the accumulation acknowledgment number of the connection relay point control table into the accumulation acknowledgment information every time the ACK message transmission condition is established, and transfers the message to the second network access protocol (step D14).

The ACK message transferred to the second network access protocol is transmitted to the first transmission re-sending controller 138 via the first network access protocol and first message distributor 134.

As shown in FIG. 18, on receiving the ACK message from the second reception processor 153 (step B13), as shown in FIG. 19, the first transmission re-sending controller 138 of the first transmission processor 132 identifies the corresponding connection terminal point C1 from the value of the connection identifier information of the received ACK message, checks the value of the accumulation acknowledgment information of the received ACK message, and judges whether or not the transmission acknowledged DATA message is present in the transmission message buffer (step C1). In the step C1, the controller checks the value of the accumulation acknowledgment information of the DATA message corresponding to each connection terminal point C1 in the transmission message buffer, and judges whether or not the value is equal to or less than the value of the accumulation acknowledgment information of the received ACK message. When the corresponding DATA message is present in the transmission message buffer, the DATA message is deleted (step C2).

Subsequently, the operating re-sending timer concerning the connection terminal point C1 is finished (step C3), and judges whether or not the DATA message concerning the connection terminal point C1 is present in the transmission message buffer (step C4). Here, when the DATA message is present, the re-sending timer concerning the connection terminal point C1 is started again (step C5). Moreover, when no DATA message is present, the controller goes to step C6 to judge whether or not the application data concerning the connection terminal point C1 is present in the transmission data buffer. When no application data is present, the value of the corresponding transmission completion member of the connection terminal point control table is set to "completed" (step C7).

Furthermore, the controller checks the value of the close request member of the connection terminal point control table (step C8), sends a connection close request to the connection terminal point state controller 135 when the close request member value is "present" (step C9), and subsequently finishes the data transmission processing. Moreover, when the close request member value is "absent", the data transmission processing is finished as it is.

On the other hand, in the step C6, when the application data concerning the connection terminal point C1 is present in the transmission data buffer, the connection terminal point identifier and data transmission request are notified to the first transmission flow controller 136.

In FIG. 18, when the re-sending timer concerning the connection terminal point C1 is expired in the first transmission re-sending controller 138 (step B14), the first transmission re-sending controller 138 re-sends the DATA messages concerning the connection terminal point C1 stored in the transmission message buffer in order from a smaller value of DM order number information (step B15), and starts the re-sending timer concerning the connection terminal point C1 (step B16). Additionally, when DATA message is resent, the value of the re-sending information of DATA message to be resent is changed to "re-send".

(c) Flow Control Operation:

As described above, when the number of messages concerning the connection terminal point C1 stored in the transmission message buffer reaches the same value as that of the window size, the first communication controller on the transmission side of the application data realizes the flow control. Even when the application data concerning the connection terminal point C1 exists in the transmission data buffer, and the value of the transmission enable state member of the connection terminal point control table is "enabled", the control is realized by stopping the generation and transmission of a new DATA message by the first transmission flow controller 136.

On the other hand, the second communication controller on the reception side of the application data uses the utilization ratio of the received data buffer to perform the flow control.

On receiving the reception flow control request accompanied by the connection relay point identifier C1 from the second order controller 160 or the TCP/IP processor 162, the second reception flow controller 159 executes the processing of steps D10 to D12 shown in FIG. 20, and transmits RNR message to the first communication controller.

As shown in FIG. 18, the first transmission flow controller 136 of the first communication controller having received the RNR message identifies the corresponding connection terminal point C1 from the value of the connection identifier information, and sets the value of the transmission enable state member concerning the connection terminal point C1 of the connection terminal point control table to "disabled" (step B10). Thereby, even when the application data concerning the connection terminal point C1 exists in the transmission data buffer, and the number of messages concerning the connection terminal point C1 of the transmission message buffer is smaller than the window size, the judgment condition of the step B3 is not established. Therefore, the first transmission flow controller 136 stops the generation and transmission of the new DATA message.

On the other hand, when the value of the reception enable state member is "disabled", and the application data size is smaller than the received data buffer lower limit value (step D15), as shown in FIG. 20, the second reception flow controller 159 sets the value of the reception enable state member to "enabled" (step D16), generates RR message concerning the corresponding connection relay point and transfers the message to the second network access protocol (step D17).

The RR message transferred to the second network access protocol is transferred to the first transmission flow controller 136 via the first network, first network access protocol, and first message distributor 134.

As shown in FIG. 18, the first transmission flow controller 136 identifies the corresponding connection terminal point C1 from the value of the connection identifier information of the received RR message, and sets the value of the transmission enable state member concerning the connection terminal point C1 of the connection terminal point control table to "enable" (step B12). Thereby, since the judgment condition of the step B3 is established, the first transmission flow controller 136 releases the regulation of generation and transmission of the new DATA message.

The data transmission operation to the first processor from the second processor will next be described.

In the following, an example will be described in which the connection C1 is opened between the socket S1 (connection terminal point C1) of the terminal equipment and the socket S3 (connection relay point C1) of the server terminal equipment, and the second processor transmits the data to the first processor via the connection C1. Additionally, it is assumed that the value of the connection terminal point state member concerning the connection terminal point C1 of the connection terminal point control table of the first storage unit is ESTAB or FIN–WAIT, the value of the connection relay point state member concerning the connection relay point C1 of the connection relay point control table of the second storage unit is ESTAB or FIN–WAIT, the value of the transmission enable state is "enabled", and the number of messages concerning the connection relay point C1 stored in the transmission message buffer is equal to or less than the window size.

(d) Basic Transmission Operation:

When the second processor designates the socket S3, and notifies the second communication interface controller of the application data and the data transmission request, the second communication interface controller adds the received application data to the rear of the transmission data buffer corresponding to the socket S3, and notifies the TCP module of the identifier of socket S3 and the data transmission request.

On receiving the data transmission request, the TCP module cuts out the application data corresponding to the socket S3 stored in the transmission data buffer from the top with MSS size at maximum, generates the TCP segment from the cut sub-application data and transfers the segment to the IP module.

The IP module uses the transferred TCP segment to prepare the IP data gram, and transfers the IP data gram to the TCP/IP processor 162 of the second communication controller via the fourth network access protocol, second network, and third network access protocol.

The TCP/IP processor 162 refers to the source port number field, destination port number field, source IP address field, and destination IP address field of the TCP header and IP header included in the transferred IP data gram. Here, since the field values agree with the second port number member, first port number member, second IP address member, and first IP address member concerning the connection relay point C1 of the connection relay point control table, the processor judges that the transferred IP data gram is IP data gram concerning the connection relay point C1, extracts the application data included in the TCP segment and stores the data to the transmission data buffer. Moreover, the processor notifies the second transmission flow controller 156 of the connection relay point identifier and data transmission request of the connection relay point C1.

The TCP module repeats the above-described operation until the application data concerning the socket S3 stored in the received data buffer of the server terminal equipment runs out.

In this case, the flow control and re-sending control are performed between the TCP/IP processor 162 and the TCP module, and the order control of the received TCP segment is performed in the TCP module. Since the operation is similar to the operation of the conventional TCP module, the description thereof is omitted.

As shown in FIG. 18, on receiving the data transmission request together with the connection relay point identifier (connection relay point C1), the second transmission flow controller 156 checks the connection relay point state member concerning the connection terminal point C1 of the connection relay point control table (step B1). In this case, since the connection relay point state is ESTAB or FIN–WAIT (ESTAB or CLOSE–WAIT for the connection terminal point), the controller stores "uncompleted" in the transmission completion member (step B2).

Subsequently, the controller checks the value of the transmission enable state member, the number of messages concerning the connection terminal point C1 stored in the transmission message buffer, and the presence/absence of the application data concerning the connection terminal point C1 stored in the transmission data buffer, and judges whether or not the data transmission condition is established (step B3). In this case, since the value of the transmission enable state member is "enabled", the number of messages is smaller than the window size, and the application data concerning the connection relay point C1 is present in the transmission data buffer, the second transmission flow controller 156 judges that the transmission condition is established, and notifies the second DATA message generator 157 of the connection relay point identifier C1 and DATA message generation request.

On receiving the DATA message generation request accompanied by the connection relay point identifier C1, the second DATA message generator 157 cuts out the sub-application data for MSS from the top of the application data concerning the connection relay point C1 stored in the transmission data buffer, generates DATA message including the sub-application data (step B4), and transfers the message to the second transmission re-sending controller 158.

The second transmission re-sending controller 158 stores the copy of the transferred DATA message to the transmission message buffer (step B5), and judges whether or not the re-sending timer for the DATA message of the connection relay point C1 is started (step B6). When the re-sending timer is not started, the controller starts it (step B7). When the re-sending timer is started, the controller goes to step B8, and transfers the DATA message to the second network access protocol (step B8). The DATA message transferred to the second network access protocol is transferred to the first order controller 140 via the first network, first network access protocol, and first message distributor 134.

Moreover, the second transmission re-sending controller 158 transfers the connection relay point identifier C1 and data transmission request to the second transmission flow controller 156. Thereby, the second transmission processor 152 repeats the above-described data transmission operation until the transmission enable state concerning the connection relay point C1 of the connection relay point control table becomes "disabled", the number of DATA messages concerning the connection relay point C1 stored in the transmission message buffer reaches the window size, or the application data concerning the connection relay point C1 runs out in the transmission data buffer.

On the other hand, on receiving the DATA message from the second transmission processor 152, as shown in FIG. 20, the first order controller 140 first checks the state of the connection relay point C1 (step D1). Here, since the connection relay point state is ESTAB or FIN–WAIT, the controller goes to step D2, checks whether or not the DATA message is received, and subsequently judges whether or not the DATA message is resent (step D3).

When the received DATA message is a resent message, the controller checks the contents of the DATA message and the DM order number information of the DATA message concerning the connection terminal point C1 stored in the received message buffer, and judges whether or not the DATA message having the DM order number information of the same content as that of the DM order number information is present in the received message buffer (step D4). When the corresponding DATA message is present in the received message buffer, the received DATA message is discarded and the processing is finished. Moreover, when the corresponding DATA message is absent from the received message buffer, the received DATA message is stored in the received message buffer (step D5).

Subsequently, the first order controller 140 checks the value of the corresponding accumulation acknowledgment number member of the connection relay point control table, and judges whether or not the DATA message having the DM order number information equal to the value of the accumulation acknowledgment number is present in the received message buffer (step D6). When the DATA message having the DM order number information equal to the value of the accumulation acknowledgment number is present, the DATA message is extracted from the received message buffer (step D7), and the application data included in the extracted DATA message is added to the rear of the received data buffer corresponding to the connection terminal point C1 (step D8). Furthermore, the value of the accumulation acknowledgment number member is increased by one DATA message (step D9). Subsequently, the processing of steps D6 to D9 is repeated until the DATA message runs out. After the processing is finished, the first order controller 140 notifies the first reception flow controller 139 of the connection terminal point identifier C1 and reception flow control request.

On receiving the reception flow control request accompanied by the connection terminal point identifier C1 from the first order controller 140, the first reception flow controller 139 checks the value of the reception enable state member concerning the connection terminal point C1 of the connection terminal point control table, and the size of the application data concerning the connection terminal point C1 stored in the received data buffer, and judges whether or not the reception enable state is "enabled" and the size of the application data is larger than the received data buffer upper limit value (step D10). Here, since the judgment condition of the step D10 is satisfied, the controller goes to step D1, sets the value of the reception enable state member to "disabled", generates RNR message and transfers the message to the first network access protocol (step D12).

On receiving the data reception request from the first processor via the socket S1, the first communication interface controller extracts the application data concerning the socket S1 stored in the received data buffer, and transfers the extracted application data to the first processor.

(e) Error Control Operation:

For the error control operation in the data transmission operation to the first processor from the second processor, since the above-described error control operation and the operations of the first and second communication controllers are only replaced in the data transmission operation to the second processor from the first processor, the description thereof is omitted.

(f) Flow Control Operation:

The flow control operation in the data transmission operation to the first processor from the second processor is similar, except that the above-described flow control operation and the operations of the first and second communication controllers are replaced in the data transmission operation to the second processor from the first processor, and the value of the connection relay point state member as the condition for transmitting the application data is changed to ESTAB or FIN–WAIT. Therefore, the description thereof is omitted.

As described above, according to the present embodiment, by providing the message having the header dedicated for each control of the data communication function, and including only the information necessary for the control in the message header, the packet transmitted with the access link includes no unnecessary information. Additionally, since the overhead of each message header is smaller than the total size of the conventional TCP and IP headers, the overhead of the header of the packet transmitted in the access link decreases to reduce the data amount, and the throughput during the data transmission between the terminal equipment and the server terminal equipment is enhanced.

Moreover, since the apparatus connected to the access link is identified using only the connection identifier during the data communication, the data size of the information for identifying the connection is reduced. Furthermore, by identifying the application data by the message unit, the data size of the information for identifying the application data transmitted with the access link is reduced.

4. Fourth Embodiment

A fourth embodiment of the present invention will next be described in detail with reference to the drawings.

Figure 21:
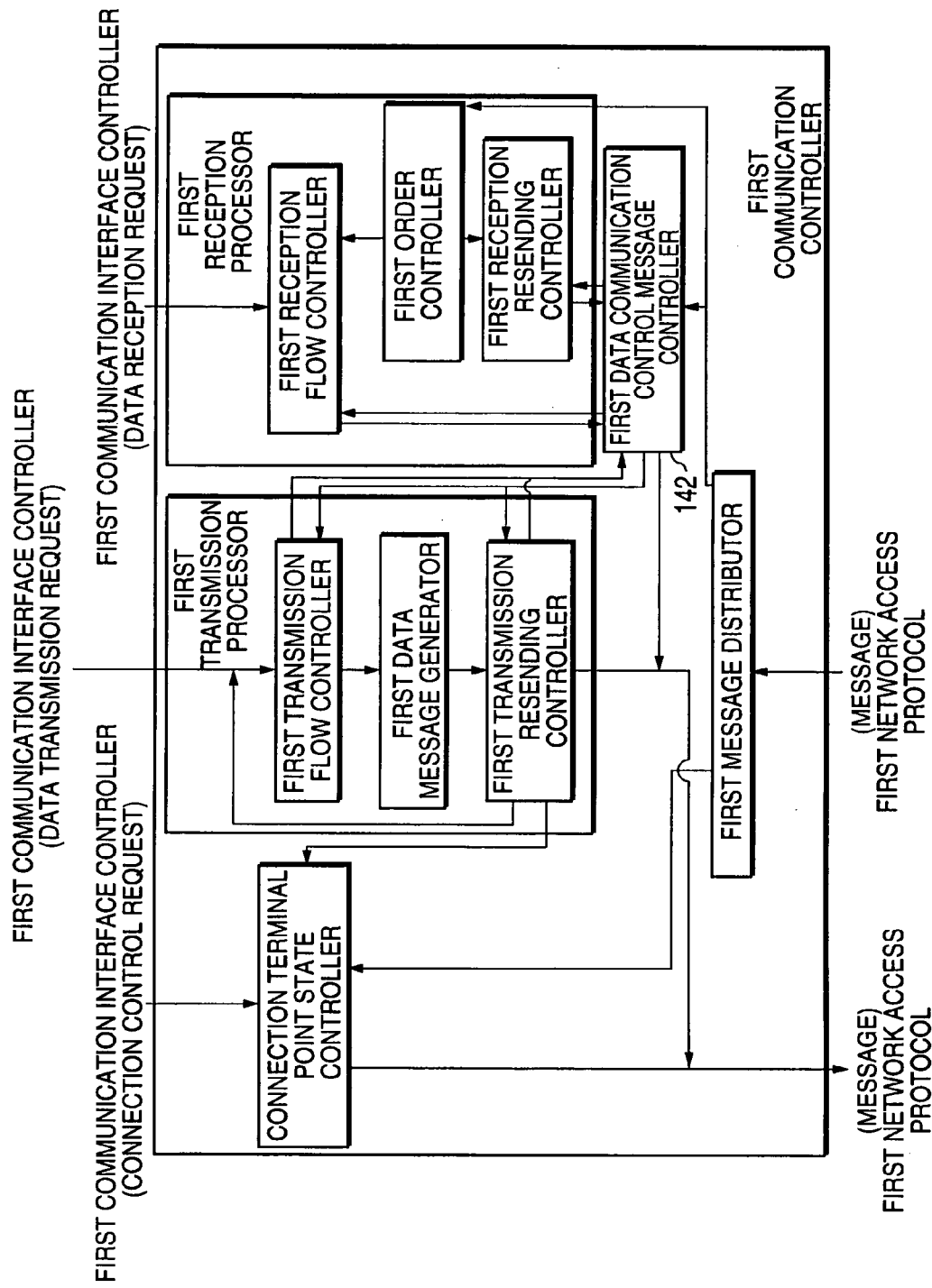
FIG. 21 is a diagram showing the constitution of a fourth embodiment of the data communication system of the present invention, and is a block diagram showing the constitution of the first communication controller shown in FIG. 1.
Figure 22:
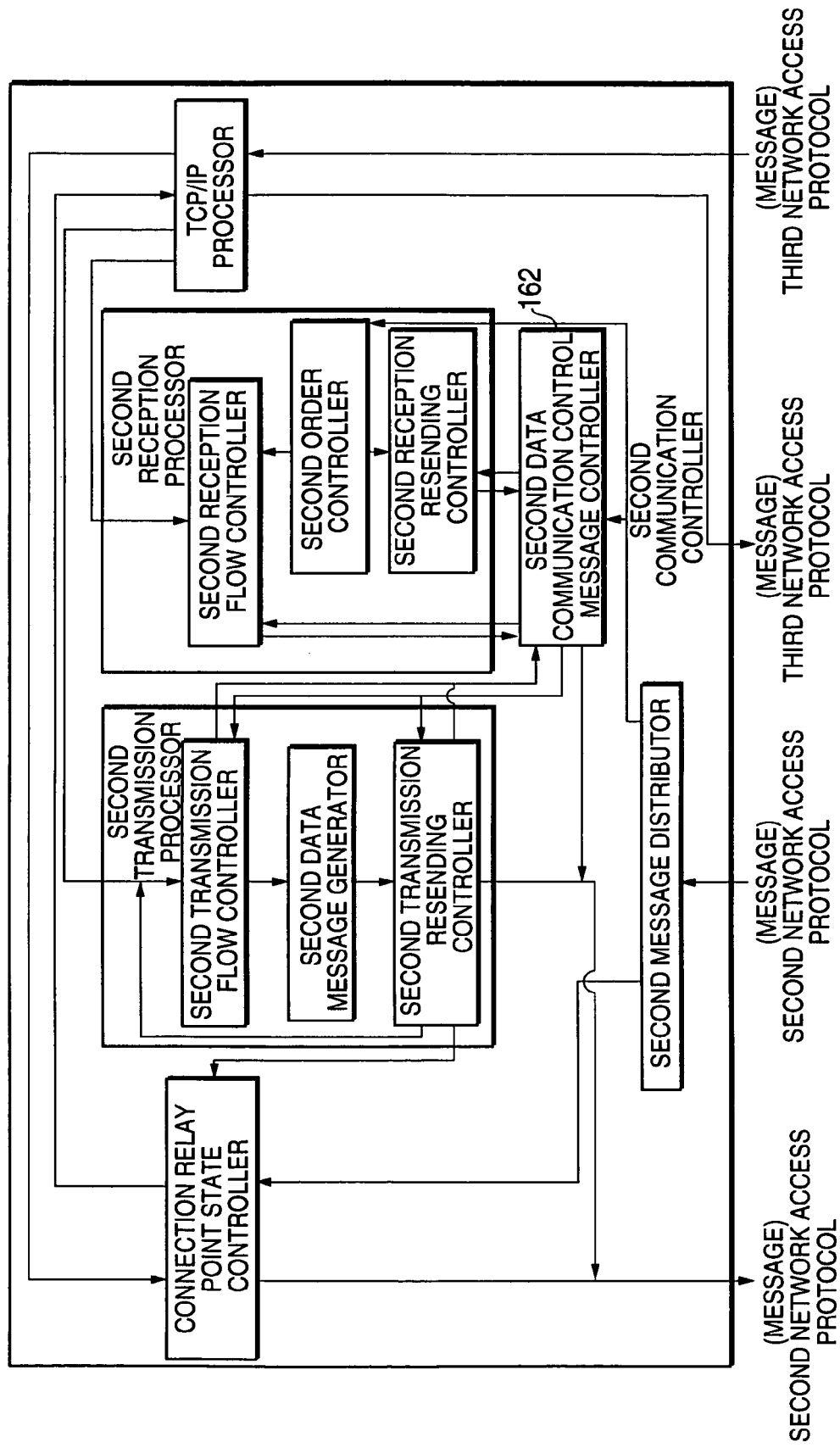
FIG. 22 is a diagram showing the constitution of the fourth embodiment of the data communication system of the present invention, and is a block diagram showing the constitution of the second communication controller shown in FIG. 1.

FIG. 21 is a diagram showing the constitution of the fourth embodiment of the data communication system of the present invention, and is a block diagram showing the constitution of the first communication controller shown in FIG. 1. FIG. 22 is a diagram showing the constitution of the fourth embodiment of the data communication system of the present invention, and is a block diagram showing the constitution of the second communication controller shown in FIG. 1.

The present embodiment is different from the third embodiment in the operations of the first transmission flow controller, first transmission re-sending controller, first reception flow controller, first reception re-sending controller, and first message distributor of the first communication controller. The present embodiment is different from the third embodiment in the operations of the second transmission flow controller, second transmission re-sending controller, second reception flow controller, second reception re-sending controller, and second message distributor of the second communication controller. Furthermore, in the present embodiment, as shown in FIG. 21, a first data communication control message controller 142 is added to the first communication controller of the third embodiment, and as shown in FIG. 22, a second data communication control message controller 162 is added to the second communication controller of the third embodiment. Since the other constitution is similar to that of the third embodiment, the description thereof is omitted.

The messages exchanged between the first communication controller and the second communication controller will next be described with reference to FIG. 23.

FIG. 23 is a diagram showing the data communication messages for use in the fourth embodiment of the data communication system of the present invention.

The messages exchanged between the first communication controller and the second communication controller of the present embodiment are different from those of the third embodiment in that the data communication control message includes request type information of "command type" or "response type", and ACK message, RNR message, and RR message of the data communication control message group include DC order number information as the sequence number (hereinafter referred to as DC order number).

Among the data communication control message group, the command type acknowledgment message will be hereinafter referred to as the acknowledgment command message, and represented, for example, by ACK(C) message. Moreover, the response type acknowledgment message will be referred to as the acknowledgment response message, and represented, for example, by ACK(R) message. Additionally, since the ACK(C) message, RNR(C) message, and RR(C) message are substantially the same as the ACK message, RNR message, and RR message of the third embodiment, they are hereinafter treated similarly to the third embodiment.

For the first and second transmission flow controllers of the present embodiment, in addition to the operations of the first and second transmission flow controllers of the third embodiment, RNR(R) message is returned to the object side during reception of the RNR(C) message, and RR(R) message is returned to the object side during reception of the RR(C) message.

Moreover, for the first and second transmission re-sending controllers of the present embodiment, in addition to the operation of the first and second transmission re-sending controllers of the third embodiment, ACK(R) message is returned to the communication object during reception of the ACK(C) message.

Furthermore, the first reception flow controller and the second reception flow controller of the present embodiment return RNR(C) message and RR(C) message to the network protocols.

Additionally, the first and second reception re-sending controllers of the present embodiment return the ACK(C) message to the network protocol.

Moreover, the first message distributor of the present embodiment transfers the received message concerning the connection control to the connection terminal point state controller, transfers the data communication control message to the first data communication control message controller 142, and transfers the DATA message to the first reception re-sending controller.

Similarly, the second message distributor transfers the received message concerning the connection control to the connection relay point state controller, transfers the ACK(C) message to the second transmission re-sending controller, transfers the RNR(C) message or the RR(C) message to the second transmission flow controller, transfers the ACK(R) message, RNR(R) message, or RR(R) message to the second data communication control message controller 162, and transfers the DATA message to the second reception re-sending controller.

Each of the first data communication control message controller 142 and the second data communication control message controller 162 has a DC message control table constituted of the connection identifier member, message type member, and DC order number member, and a DC message buffer for storing the copies of the ACK message, RNR message, and RR message for each connection.

Moreover, on receiving the command type data communication control message group from the reception flow controller or the reception re-sending controller, the first data communication control message controller 142 and the second data communication control message controller 162 refer to the DC message control table, and search for the entry which has the value of the received message connection identifier information and the same value as that of the message type as the connection identifier member and the message type member (or generates the entry which has the value of the received message connection identifier information and the message type as the connection identifier member and the message type member if there is no such entry).

Moreover, the value of the DC order number information of the received message is stored in the DC order number member of the entry, and the message copy is stored in the DC message buffer. Furthermore, the DC message re-sending timer corresponding to the received message is started, and the message is transferred to the first network access protocol or the second network access protocol.

Furthermore, on receiving the message of the response type data communication control message group from the transmission flow controller or the transmission re-sending controller, the first data communication control message controller 142 and the second data communication control message controller 162 store the message copy into the DC message buffer, and transfer the message to the first network access protocol or the second network access protocol.

On receiving the command type data communication control message group from the first network access protocol 15 or the second network access protocol, the first data communication control message controller 142 and the second data communication control message controller 162 search for the message connection identifier information, message type information, and the response type data communication control message group having the same value as that of the DC order number information. In this case, if there is no corresponding response type data communication control message group, the received message is transferred to the high-order apparatus (the ACK(C) message is transferred to the transmission re-sending controller, the RNR(C) or RR(C) message is transferred to the transmission flow controller). Moreover, if the corresponding response type data communication control message group is present, the received message is transferred to the low-order apparatus (first network access protocol, or second network access protocol).

Moreover, on receiving the response type data communication control message group from the first network access protocol or the second network access protocol, the first data communication control message controller 142 and the second data communication control message controller 162 search for the entry which has the same values as those of the message connection identifier information and message type information as the connection identifier member and the message type member from the DC message control table. Subsequently, the value of the DC order number information of the received message is compared with the value of the DC order number member of the searched entry. When the values are equal, the copy of the corresponding connection data communication control message group is deleted from the DC message buffer, and the entry is removed from the DC message control table.

Furthermore, the operating DC message re-sending timer corresponding to the message is stopped, and the message is transferred to the high-order apparatus (the ACK(R) message is transferred to the reception re-sending controller, and RNR(R) message or the RR(R) message is transferred to the reception flow controller).

Moreover, when there is no corresponding entry in the DC message control table, or when the value of DC order number member of the entry is unequal to the value of DC order number information of the received message, the message is discarded.

When the arbitrary DC message re-sending timer is expired, the copy of the corresponding command type data communication control message group is extracted from the DC message buffer, the DC message re-sending timer corresponding to the extracted message is started, and the message-copy is transferred to the low-order apparatus.

The operation of the fourth embodiment will next be described with reference to FIG. 24.

Figure 24:
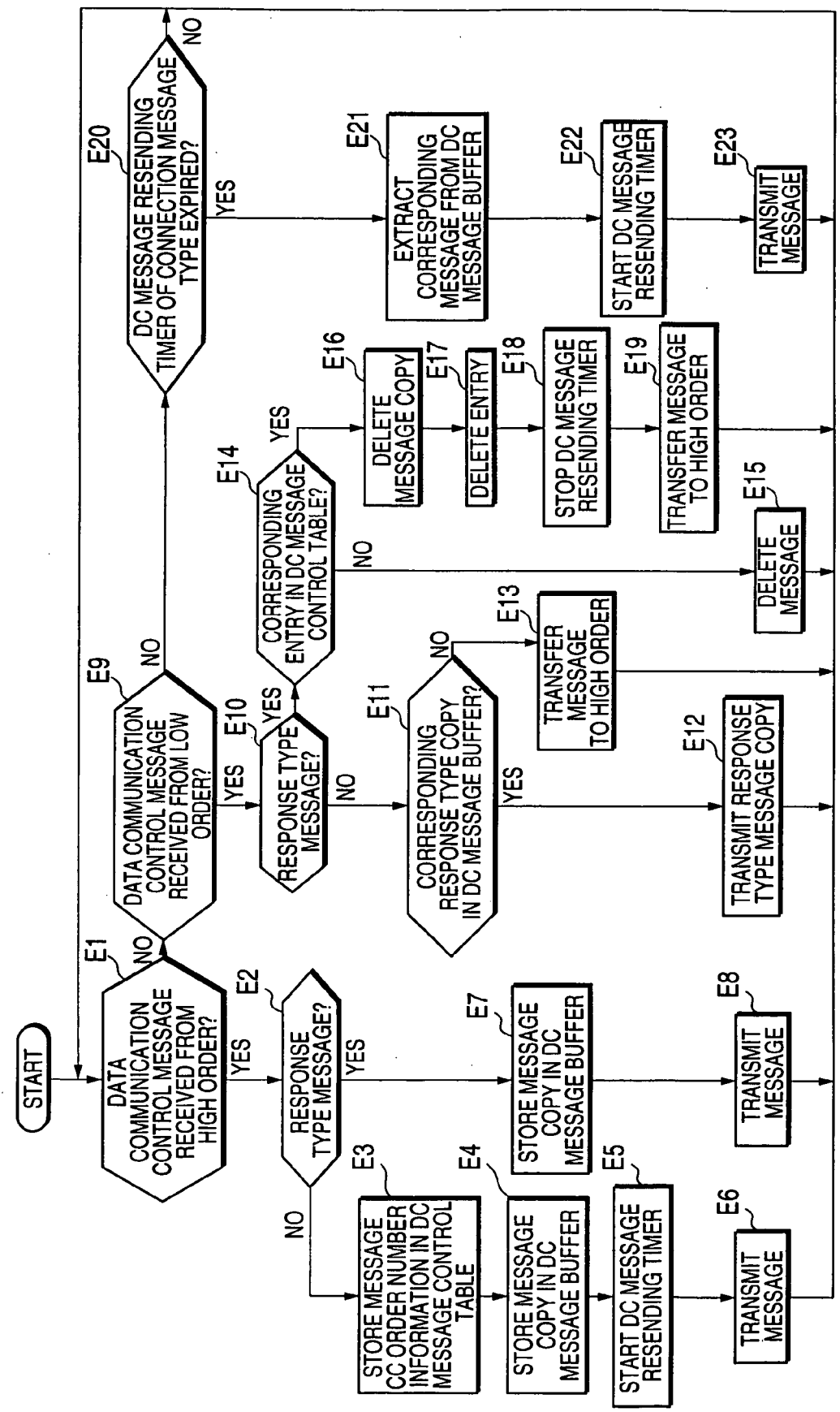
FIG. 24 is a flowchart showing the processing procedure of the fourth embodiment of the data communication system of the present invention.

FIG. 24 is a flowchart showing the processing procedure of the fourth embodiment of the data communication system of the present invention.

In the fourth embodiment, the transmission flow controller or the transmission re-sending controller having received the command type data communication control message group during the data communication control returns the response type message. In the following, an operation will be described as an example from when the command type data communication control message group is transmitted from the first reception flow controller or the first reception re-sending controller of the first communication controller until the response type message is received. Additionally, in the following, when the second transmission flow controller or the second transmission re-sending controller of the second communication controller is indicated, the controller is simply referred to as the transmission-side data communication control module. When the first reception flow controller or the first reception re-sending controller of the first communication controller is indicated, the controller is simply referred to as the reception-side data communication control module.

Since the operation from when the command type data communication control message group is transmitted from the second reception flow controller or the second reception re-sending controller of the second communication controller until the response type message is received is symmetrical with the operation described below, the description thereof is omitted.

A flowchart of FIG. 24 unifies and shows the operations of the first data communication control message controller 142 and second data communication control message controller 162. The first data communication control message controller 142 and second data communication control message controller 162 appropriately execute the processing shown in FIG. 24 on the transmission side or the reception side of the message.

In the third embodiment, the loss of the data communication control message group in the course of the transmission between the first communication controller and the second communication controller is not particularly handled. In the fourth embodiment, to solve this problem, by re-sending the command type data communication control message group from the data communication control message controller, message error control is executed.

In FIG. 24, for example, when the command type data communication control message group prepared by the reception-side data communication control module is transferred to the first data communication control message controller 142, the first data communication control message controller 142 first judges whether or not the received message is transferred from the high-order apparatus (step E1). Here, since the message is transferred from the first reception processor, the controller advances to step E2 to judge whether or not the message is a response type message. Here, since it is not the response type message, the controller goes to step E3 to search for the entry having the same values as those of the message connection identifier information and message type as the connection identifier member and communication type member from the CC message control table (if there is no entry, an entry having the values of the connection identifier information and message type of the received message as the values of the connection identifier member and message type member is newly prepared), and to store the value of DC order number information of the message into the DC order number member. Subsequently, the controller stores the copy of the message into the DC message buffer (step E4), starts DC message re-sending timer of the corresponding connection (step E5), and transmits the message to the second communication controller via the first network (step E6). Additionally, when the message is the response type message, the controller stores the message copy into the DC message buffer (step E7), and transmits the message to the second communication controller via the first network (step E8).

Subsequently, when the second communication controller receives the message from the first data communication control message controller 142, the received message is transferred to the second data communication control message controller 162.

The second data communication control message controller 162 first performs the judgment of the above-described step E1, and subsequently judges whether or not the message is transferred from the low-order apparatus (step E9). Here, since the message is transferred via the second network protocol, the controller goes to step E10 to judge whether the message is the response type message. Here, since the message is not the response type message, the controller goes to step E11 to judge whether or not the copy of the response type message corresponding to the message is present in the DC message buffer. When the corresponding response type message copy is present, the controller transmits the copy to the first communication controller (step E12).

Moreover, when there is no corresponding response type message copy, the message is transferred to the high-order apparatus (step E13).

On the other hand, when the transmission-side data communication control module returns the response type data communication control message group, the response type message is transferred to the first data communication control message controller 142. From the judgment results of the above-described steps E1, E9, and E10, the first data communication control message controller 142 goes to step E14 to judge whether or not the entry corresponding to the message is present in the DC message control table.

When the message is returned without being lost, and the corresponding entry is present, the controller goes to step E16 to delete the message copy from the DC message buffer, and to delete the corresponding entry from the DC message control table (step E17). Subsequently, the controller stops the corresponding DC message re-sending timer in the energized state (step E18), and transfers the response type message to the reception-side data communication control module as the high-order apparatus (ACK(R) message is transferred to the reception re-sending controller, and RNR (R) or RR(R) message is transferred to the reception flow controller) (step E19).

On the other hand, when the message transmitted from first data communication control message controller 142 is lost, the DC message re-sending timer started during the message transmission is expired (step E20). Therefore, the first data communication control message controller 142 extracts the message copy from the DC message buffer (step E21), starts the corresponding DC message re-sending timer again (step E22), and transmits the message copy to the second communication controller to perform the re-sending (step E23). Additionally, also when the response type message returned from the second communication controller is lost, the message is resent from the first data communication control message controller 142 as described above.

Here, when the corresponding response type message is transferred from the high-order apparatus (connection relay point state controller), the second data communication control message controller 162 stores the copy into the DC message buffer (step E7). Therefore, when the resent command type data communication control message is received, the copy of the corresponding response type message stored in the DC message buffer is transmitted to the second communication controller (step E12).

5. Fifth Embodiment

A fifth embodiment of the present invention will next be described with reference to the drawings.

FIG. 25 is a diagram showing the data communication messages for use in the fifth embodiment of the data communication system of the present invention. FIG. 26 is a table diagram showing one constitution example of the connection terminal point control table owned by the first storage unit of the fifth embodiment of the data communication system of the present invention. FIG. 27 is a table diagram showing one constitution example of the connection relay point control table owned by the second storage unit of the fifth embodiment of the data communication system of the present invention.

In the data communication system of the present embodiment, the operations of the first transmission re-sending controller, second transmission re-sending controller, first reception re-sending controller, and second reception re-sending controller are different from those of the fourth embodiment. Since the other constitutions are similar to those of the fourth embodiment, the description thereof is omitted.

First, the messages exchanged between the first communication controller and the second communication controller and used in the present embodiment will next be described with reference to FIG. 25.

In the present embodiment, the ACK(C) message includes transmission acknowledgment information. The transmission acknowledgment information is information indicating the transmission acknowledgment result of each DATA message transmitted on and after the DATA message indicated by the accumulation acknowledgment information.

Moreover, ACK transmission enable state member set to either "enabled" or "disabled", and ACK transmission request member set to either "present" or "absent are added to the members of the connection terminal point control table and the connection relay point control table. While "enabled" is set to the initial value of the ACK transmission enable state member during entry generation, "absent" is set to the initial value of the ACK transmission request member.

The operations of the first and second transmission re-sending controllers of the present embodiment are different from those of the fourth embodiment in the following respects.

The first and second transmission re-sending controllers of the fourth embodiment judge the timing to start a re-sending processing by the expire of the re-sending timer, and for the DATA message to be resent, a non-accumulation acknowledged DATA message is used as the object among DATA messages transmitted until then.

On the other hand, the timing to start the re-sending processing is judged by the reception of ACK(C) message without using the re-sending timer, and for the DATA message to be resent the DATA message failed in transmission designated by the transmission acknowledgment information included in the ACK(C) message is used as the object.

The first and second reception re-sending controllers of the present embodiment are different from those of the fourth embodiment in the following respects.

In the first and second reception re-sending controllers of the fourth embodiment, the above-described first, second, and third conditions are used as ACK transmission conditions. In the present embodiment, when the ACK transmission condition is established, and when the value of the ACK transmission enable state member of the connection terminal point control table is "enabled", the ACK(C) message including the accumulation acknowledgment information and transmission acknowledgment information is generated, and the value of the ACK transmission enable state member is set to "disabled".

Moreover, when the ACK transmission condition is established, and when the value of ACK transmission enable state member is "disabled", the value of the ACK transmission request member is set to "present".

Furthermore, during reception of ACK(R) message, the controller refers to the value of ACK transmission request member of the connection terminal point control table, and generates the ACK(C) message including the accumulation acknowledgment information and transmission acknowledgment information of that time when the value of ACK transmission request member is "present". Moreover, when the value of ACK transmission request member is absent", the value of the corresponding ACK transmission enable state member is set to "enabled". Additionally, when the ACK(C) message is generated, the value of the accumulation acknowledgment number member of the connection terminal point control table corresponding to the connection is used as the accumulation acknowledgment information similarly to the fourth embodiment.

The transmission acknowledgment information is obtained as follows.

For example, the value of the accumulation acknowledgment number member is set to x, the maximum value of the DM order number field of the DATA message stored in the reception message buffer is y, and DM order number to y from x is z. In this case, when the DATA message with the value of the DM order number field being z is absent from the received message buffer, a reception failure is judged; otherwise a reception success is judged.

However, when a modulo number which is an arbitrary natural number N is used as the DM order number, the above-described "maximum value" is the largest value in the following relation L (in a case of x L y, y is defined to be larger than x).

Assuming that $S1=\{x, x+1, \ldots, N-1\}, S2\{0, 1, \ldots, x-1\}$ for x with $0 \leq x \leq N-1$,
when $p \in S1$, $q \in S2$, p l q, and
when $p1, p2 \in S1$, and $p1<p2$, p1 L p2,
when $q1, q2 \in S2$, and $q1<q2$, q1 L q2.

The operation of the present embodiment will next be described with respect to FIGS. 28 to 30.

Figure 28:
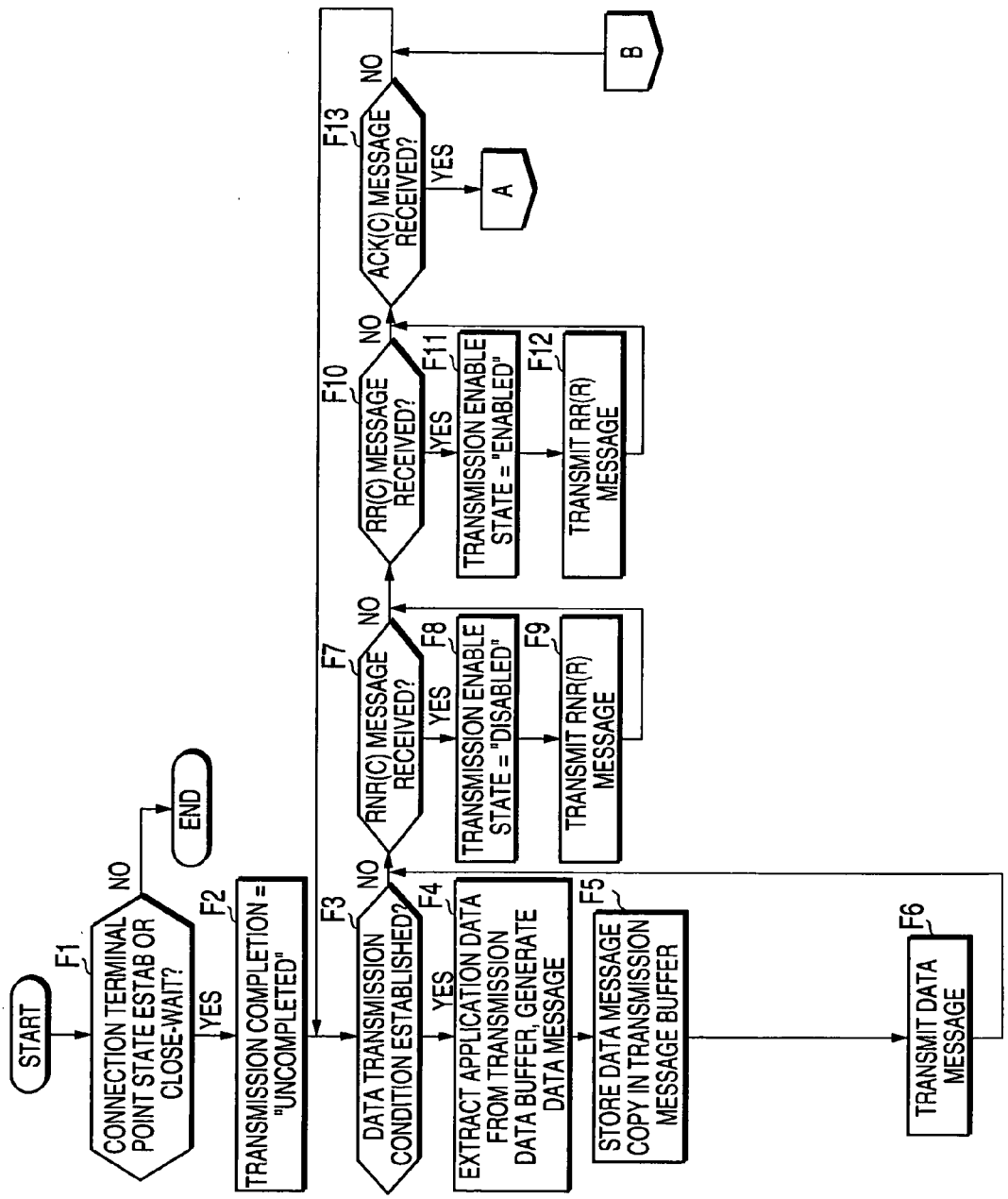
FIG. 28 is a diagram showing the operation of the fifth embodiment of the data communication system of the present invention, and is a flowchart showing the processing procedure of the first and second transmission processors.

FIG. 28 is a diagram showing the operation of the fifth embodiment of the data communication system of the present invention, and is a flowchart showing the processing procedure of the first and second transmission processors. FIG. 29 is a diagram showing the operation of the fifth embodiment of the data communication system of the present invention, and is a flowchart showing the processing procedure of the first and second transmission processors. Moreover, FIG. 30 is a diagram showing the operation of the fifth embodiment of the data communication system of the present invention, and is a flowchart showing the processing procedure of the first and second reception processors.

Additionally, the transmission of the data message to the second communication controller from the first communication controller will be described hereinafter as an example. Since the operation of transmission of data message to the first communication controller from the second communication controller is symmetrical with the operation described below, the description is omitted here.

In the fourth embodiment, during the re-sending of DATA message, when the re-sending timer is expired before the transmission acknowledgment of the transmitted DATA message, the re-sending of the same DATA message is performed irrespective of transmission success or failure. Therefore, the DATA message succeeded in transmission is probably resent.

In the fifth embodiment, such wasteful re-sending is removed by performing the following processing.

As shown in FIG. 28, the first transmission re-sending controller of the fifth embodiment transmits the DATA message in the similar procedure to the steps B1 to B8 of the third embodiment shown in FIG. 18. However, since no re-sending timer is used in the present embodiment, the processing corresponding to the steps B6, B7 of FIG. 18 is removed from the procedure (steps F1 to F6).

Figure 30:
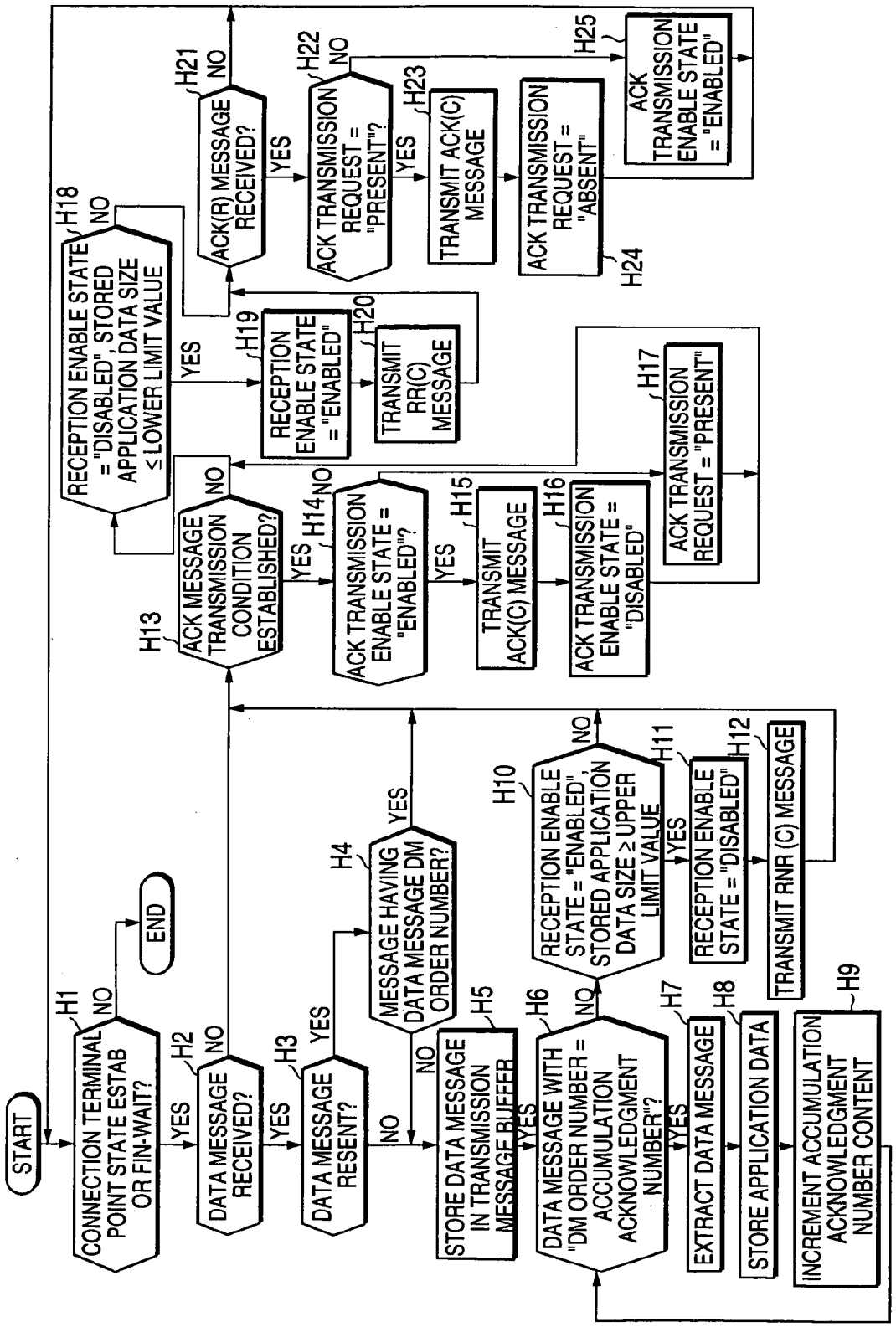
FIG. 30 is a diagram showing the operation of the fifth embodiment of the data communication system of the present invention, and is a flowchart showing the processing procedure of the first and second reception processors.

As shown in FIG. 30, the second reception re-sending controller having received the DATA message performs the reception processing of the DATA message in the procedure similar to that of steps D1 to D12 of the third embodiment shown in FIG. 20 (steps H1 to H12). Moreover, in the second reception re-sending controller, when DATA message is received, it is checked whether the transmission condition of ACK message is established in the corresponding connection relay point (step H13). When the transmission condition of ACK message is established, it is checked and judged whether or not the value of ACK transmission enable state member of the connection relay point control table is "enabled" (step H14). Here, when the value of ACK transmission enable state member is "enabled", the ACK(C) message is generated, the generated ACK(C) message is transferred to the second data communication control message controller (step H15), and the value of ACK transmission enable state member is set to "disabled" (step H16). Moreover, when the value of ACK transmission enable state member is "disabled", the value of the corresponding ACK transmission request member is set to "present" (step H17).

The ACK(C) message transferred to the second data communication control message controller is transferred to the first transmission re-sending controller via the second network access protocol, first network, first network access protocol, first message distributor, and first data communication control message controller.

Figure 29:
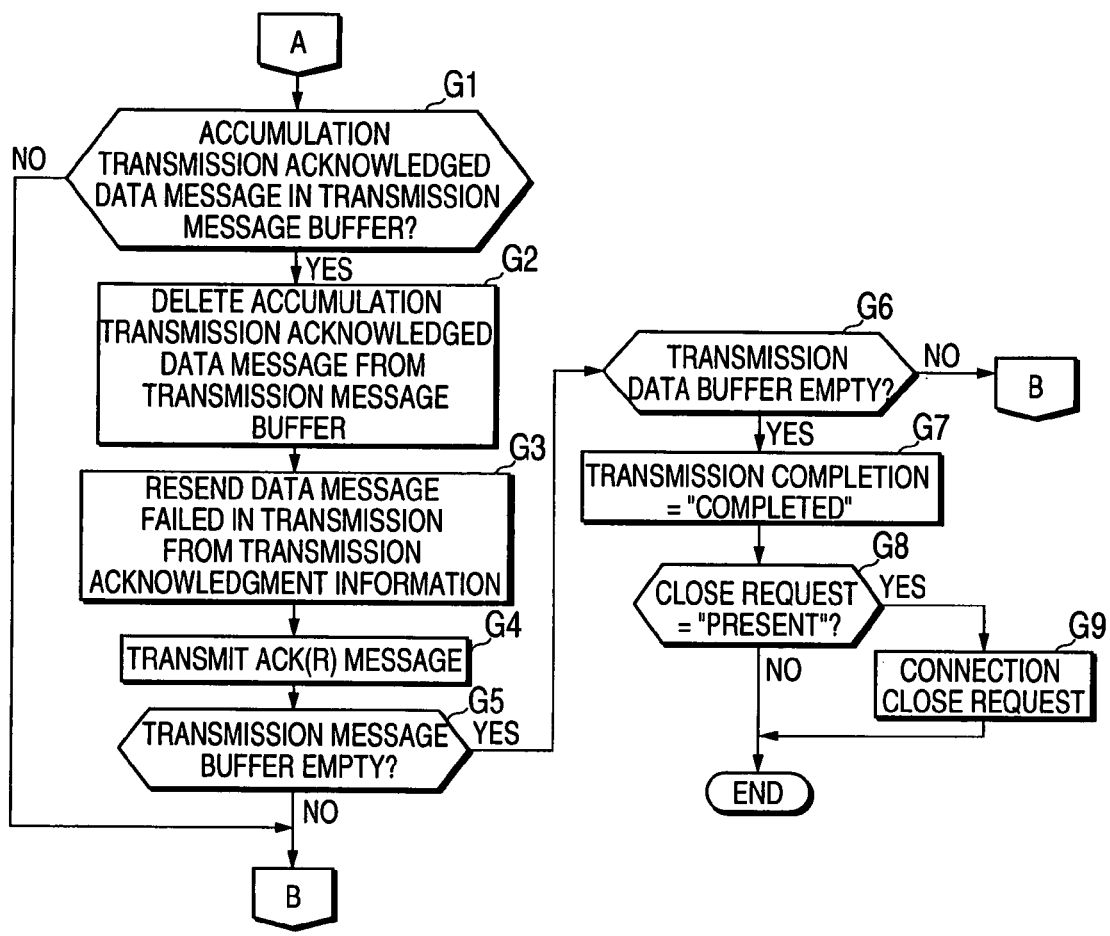
FIG. 29 is a diagram showing the operation of the fifth embodiment of the data communication system of the present invention, and is a flowchart showing the processing procedure of the first and second transmission processors.

As shown in FIG. 29, on receiving the ACK(C) message, similarly to the third embodiment, the first transmission re-sending controller judges from the accumulation acknowledgment information included in the ACK(C) message whether or not the transmission acknowledged DATA message is present (step G1). When the corresponding DATA message is present, the DATA message is deleted from the transmission message buffer (step G2).

Subsequently, according to the transmission acknowledgment information included in the ACK(C) message, DATA message failed in transmission is extracted in order from the transmission message buffer, and transferred to the first network access protocol (step G3). Furthermore, the ACK (R) message is prepared to the received ACK(C) message and transferred to the first data communication control message controller (step G4).

The processing of the above-described steps G1 to G4 is repeated until the transmission message buffer is emptied. When the transmission data buffer is emptied, the procedure of steps G6 to G9 is executed similarly to the procedure of the steps C6 to C9 of the third embodiment shown in FIG. 19.

The ACK(R) message transferred to the first data communication control message controller is transferred to the second reception re-sending controller via the first network access protocol, first network, second network access protocol, second message distributor, and second data communication control message controller.

As shown in FIG. 30, on receiving the ACK(R) message from the first transmission re-sending controller (step H21), the second reception re-sending controller refers to the value of the corresponding ACK transmission request member of the connection relay point control table, and judges whether or not the value of the ACK transmission request member is "present" (step H22). Here, when the value of the ACK transmission request member is "present", the ACK(C) message is generated in a similar manner as step H15 and transferred to the second data communication control message controller (step H23), and the value of the ACK transmission request member is set to "absent" (step H24). Moreover, when the value of the ACK transmission request member is "absent", the value of the ACK transmission enable state member is set to "enabled" (step H25).

The second communication controller of the fifth embodiment utilizes the application ratio of the received data buffer to perform the flow control in a similar manner as the third embodiment.

On receiving the reception flow control request accompanied by the connection relay point identifier from the second order controller or the TCP/IP controller 1, the second reception flow controller executes the processing of steps H10 to H12 as shown in FIG. 30, and transmits the RNR(C) message to the first communication controller.

As shown in FIG. 28, the first transmission flow controller of the first transmission controller having received the RNR(C) message identifies the corresponding connection terminal point from the value of the connection identifier information, sets the transmission enable state member value of the connection terminal point control table to "disabled" (step F8), and transfers the RNR(R) message to the first network protocol (step F9). Thereby, even when the application data exists in the transmission data buffer, and the number of messages of the transmission message buffer is smaller than the window size, the judgment condition of step F3 is not established. Therefore, the first transmission flow controller stops the generation and transmission of the new DATA message.

On the other hand, when the reception enable state member value is "disabled", and the application data size is smaller than the received data buffer lower limit value (Step H18), in a similar manner as the processing of steps D15 to D17 of the third embodiment shown in FIG. 20, the second reception flow controller sets the reception enable state member value to "enabled" (step H19), generates the RR(C) message concerning the corresponding connection relay point and transfers the message to the second network access protocol (step H20).

The RR(C) message transferred to the second network access protocol is transferred to the first transmission flow controller via the first network, first network access protocol, and first message distributor.

As shown in FIG. 28, the first transmission flow controller identifies the corresponding connection terminal point from the value of the connection identifier information of the received RR(C) message, sets the value of the transmission enable state member of the connection terminal point control table (step F11), and transfers the RR(R) message to the first network protocol (step F12). Thereby, since the judgment condition of step F3 is established, the first transmission flow controller releases the regulation of generation and transmission of the new DATA message.

A concrete example of the operation of the data communication system of the fifth embodiment will next be described.

First, it is assumed that the DATA messages with the DM order numbers of 0 to 30 are transmitted to the second communication controller from the first communication controller in the arbitrary connection, and among these DATA messages the transmission of the DATA messages with the DM order numbers of 20, 22, 26, 27, 28, 30 fails.

In this case, when the ACK transmission condition concerning the connection is first established in the second reception re-sending controller of the second communication controller, the second reception re-sending controller checks the value of the corresponding ACK transmission enable state member of the connection relay point control table. When the value is "enabled", the ACK(C) message is transmitted to the first transmission re-sending controller of the first communication controller, and the value of the ACK transmission enable state member is set to "disabled".

Here, since the DM order number having first failed in transmission is 20, the accumulation acknowledgment information of the ACK(C) message is set to "20". The reception results of ten DATA messages in total with the DM order numbers of 20 to 29 are set to the transmission acknowledgment information. Specifically, "NG" indicating the transmission failure is set to the DATA messages with the DM order numbers of 20, 22, 26, 27, 28, and "OK" indicating the transmission success is set to the DATA messages with the DM order numbers of 21, 23, 24, 25, 29.

Subsequently, on receiving the ACK(C) message, since the accumulation acknowledgment information value included in the message is 20, the first transmission re-sending controller deletes the DATA messages with the DM order number information values of 0 to 19 from the DATA messages concerning the connection, and judges from the content of the transmission acknowledgment information that the transmission of the DATA messages with the DM order numbers of 20, 22, 26, 27, 28 has failed.

Subsequently, after the controller extracts the DATA messages with the DM order number information of 20, 22, 26, 27, 28 from the transmission message buffer an transmits the messages to the second communication controller, the ACK (R) message to the ACK(C) message is transmitted to the second communication controller.

In the second communication controller, the transmission condition of the new ACK message is not established until the ACK(R) message is received. Therefore, the value of the corresponding ACK transmission request member of the connection relay point control table is set to "absent".

The second reception re-sending controller of the second communication controller having received ACK(R) message from the first communication controller sets the value of the corresponding ACK transmission enable member of the connection relay point control table to "enabled".

Therefore, according to the fifth embodiment, since the transmission acknowledgment information of each packet is notified to the communication object in addition to the accumulation acknowledgment, only the lost packet is resent during packet re-sending, so that the throughput of the end—end communication is improved.

Moreover, since the packet loss detection is performed based on the notification from the communication object side, and the notification is not issued in a duplicated manner, the transmission efficiency is not deteriorated for the fluctuation or more with respect to the fluctuation of packet transmission in the access link, and the time required for the packet loss detection is shortened, so that the throughput of the end—end communication with respect to the packet loss is improved.

6. Sixth Embodiment

A sixth embodiment of the present invention will next be described in detail with reference to the drawings.

In the first to fifth embodiments, the constitution has been described in which the terminal equipment comprises the first processor, first communication interface controller, first communication controller, first storage unit, and first network access protocol, and the router comprises the second communication controller, second storage unit, second network access protocol, and third network access protocol.

Figure 31:
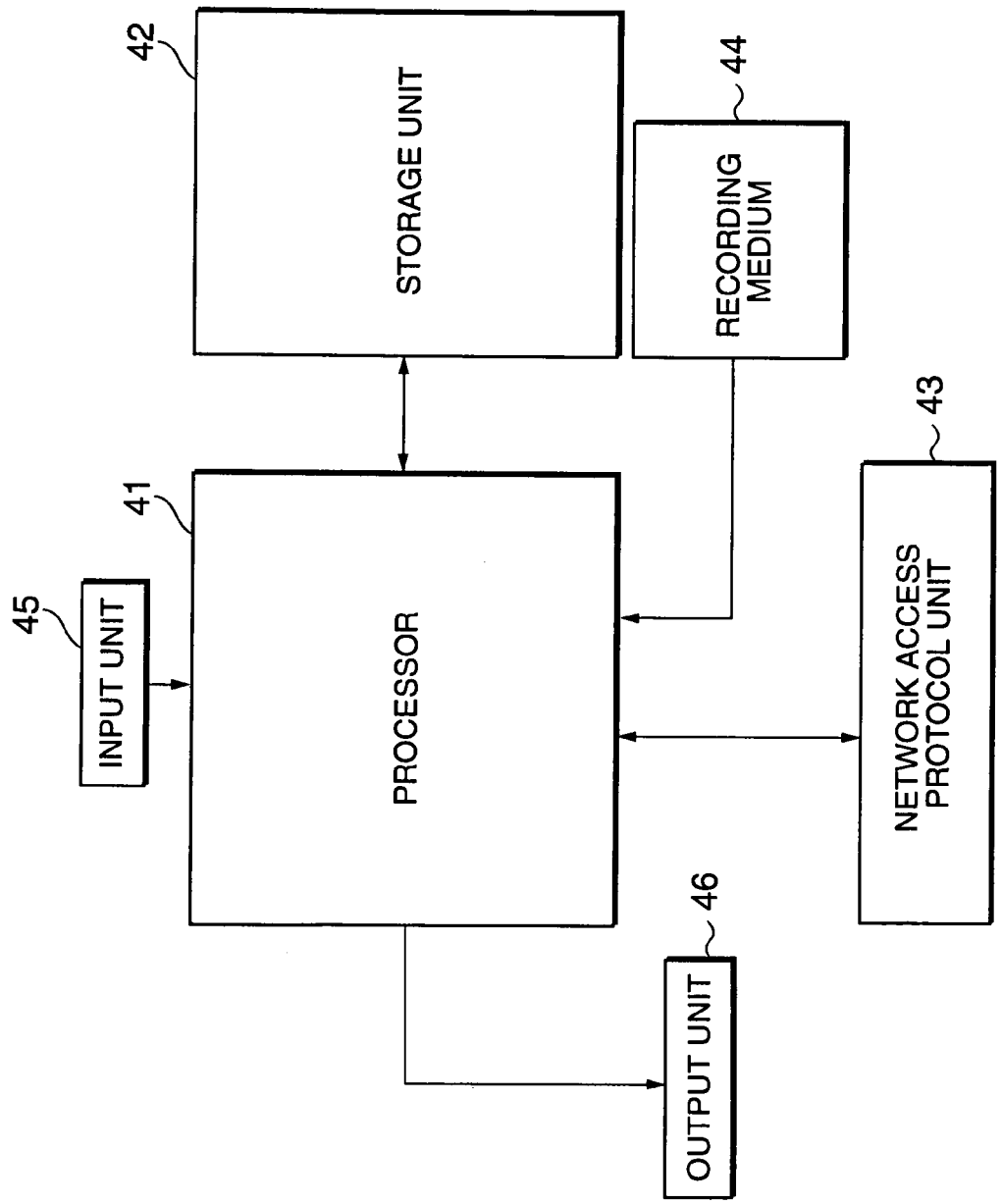
FIG. 31 is a diagram showing the constitution of a sixth embodiment of the data communication system of the present invention, and is a block diagram showing one constitution example of the terminal equipment and router.
Figure 32:
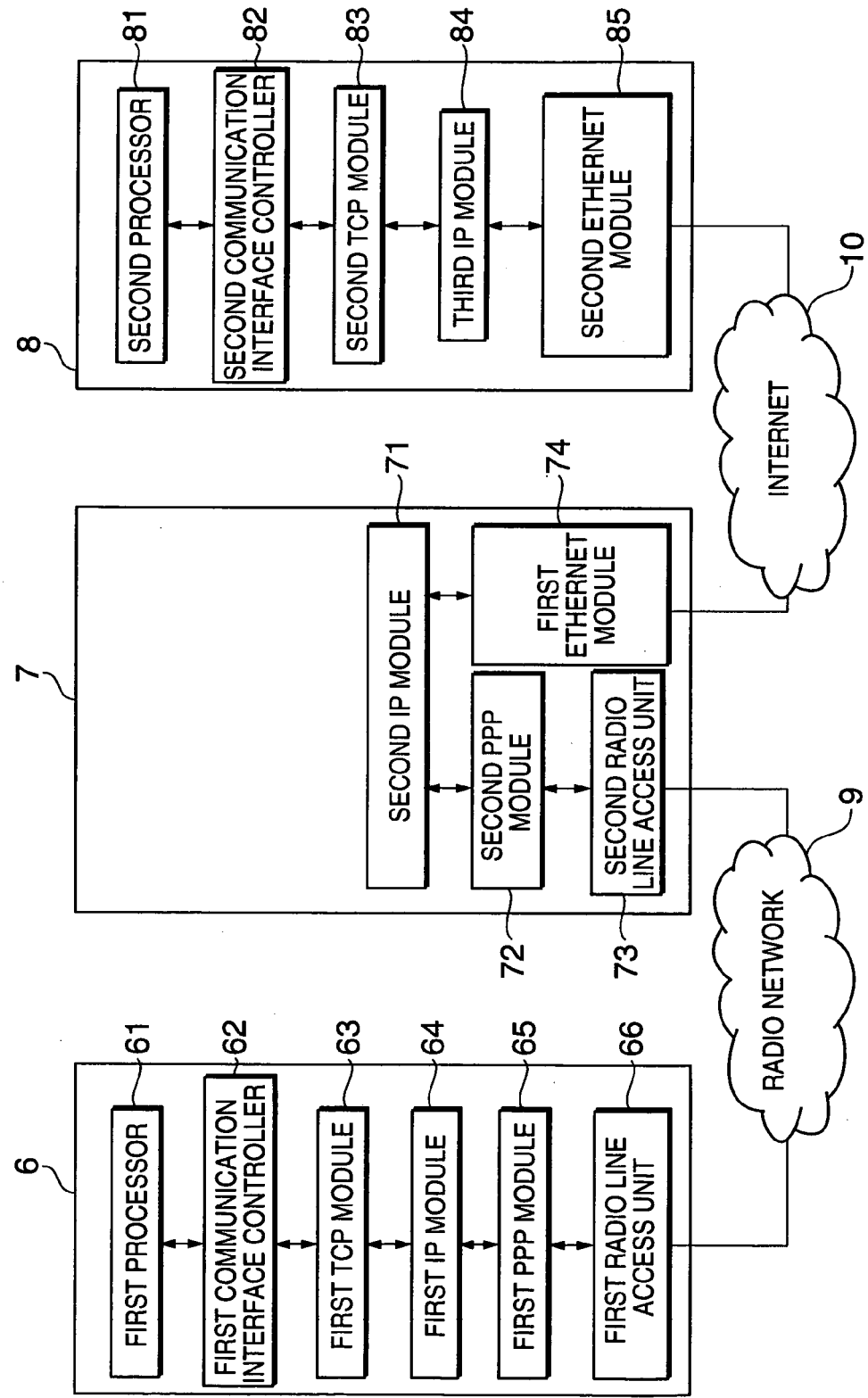
FIG. 32 is a block diagram showing one constitution example of a conventional data communication system using TCP/IP.
Figure 33:
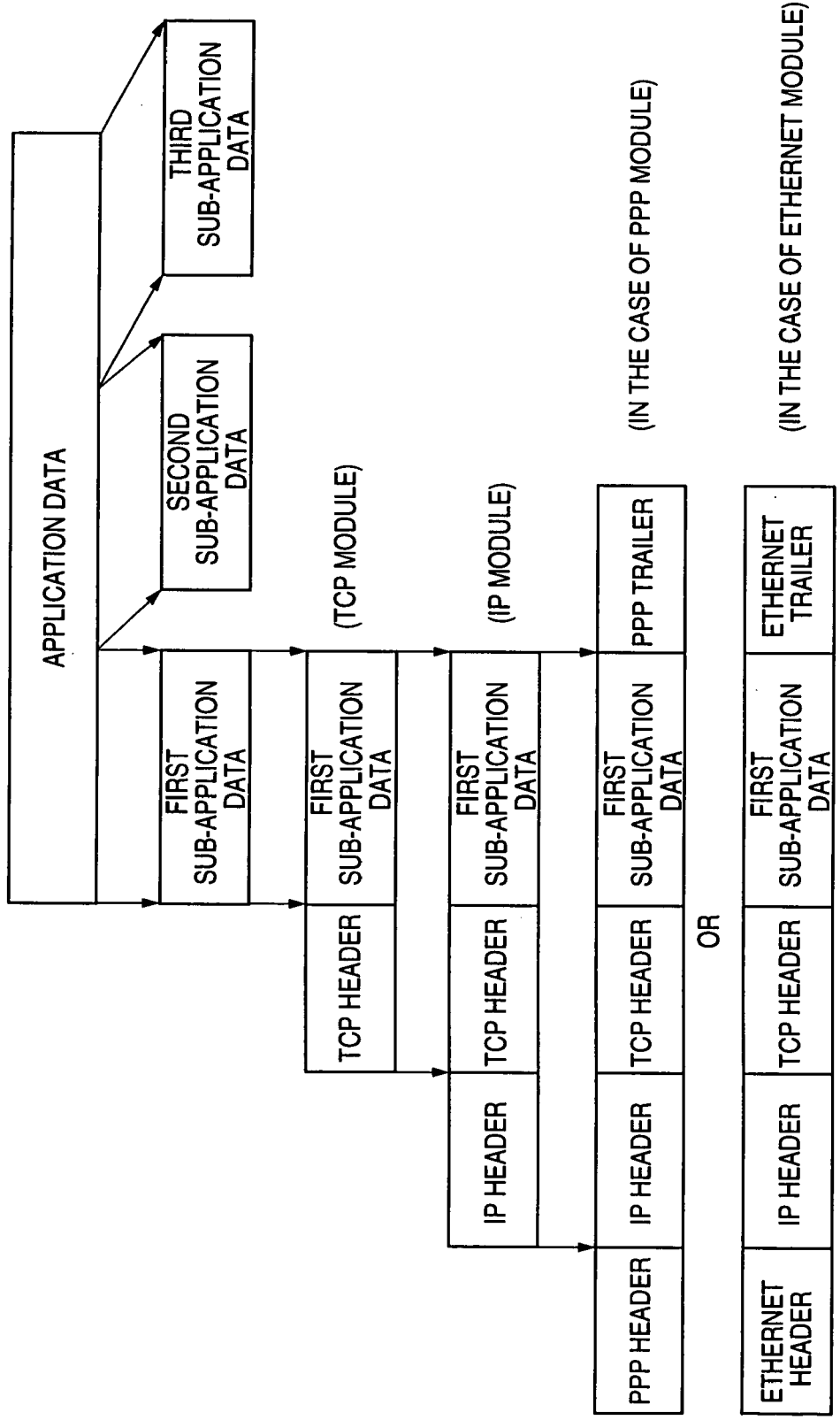
FIG. 33 is a diagram showing the constitution of information transmitted/received in the data communication system shown in FIG. 32, and is a block diagram showing a positional relation of headers.
Figure 34:
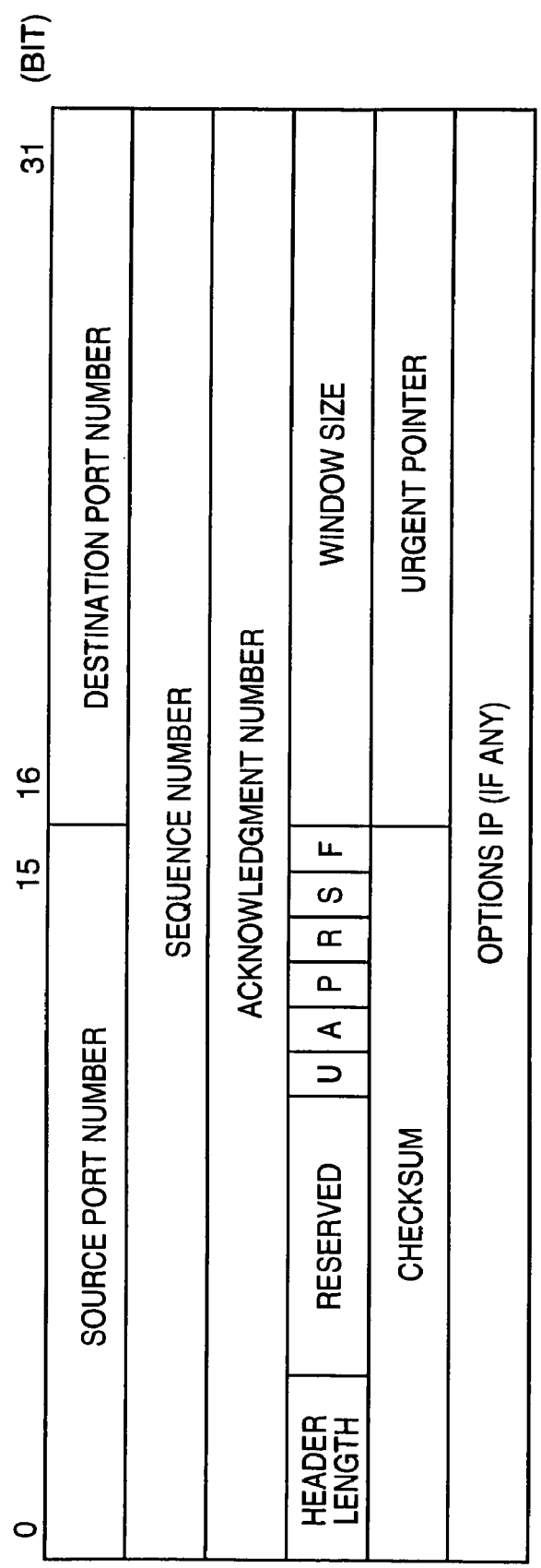
FIG. 34 is a block diagram showing the constitution of TCP header shown in FIG. 33.
Figure 35:
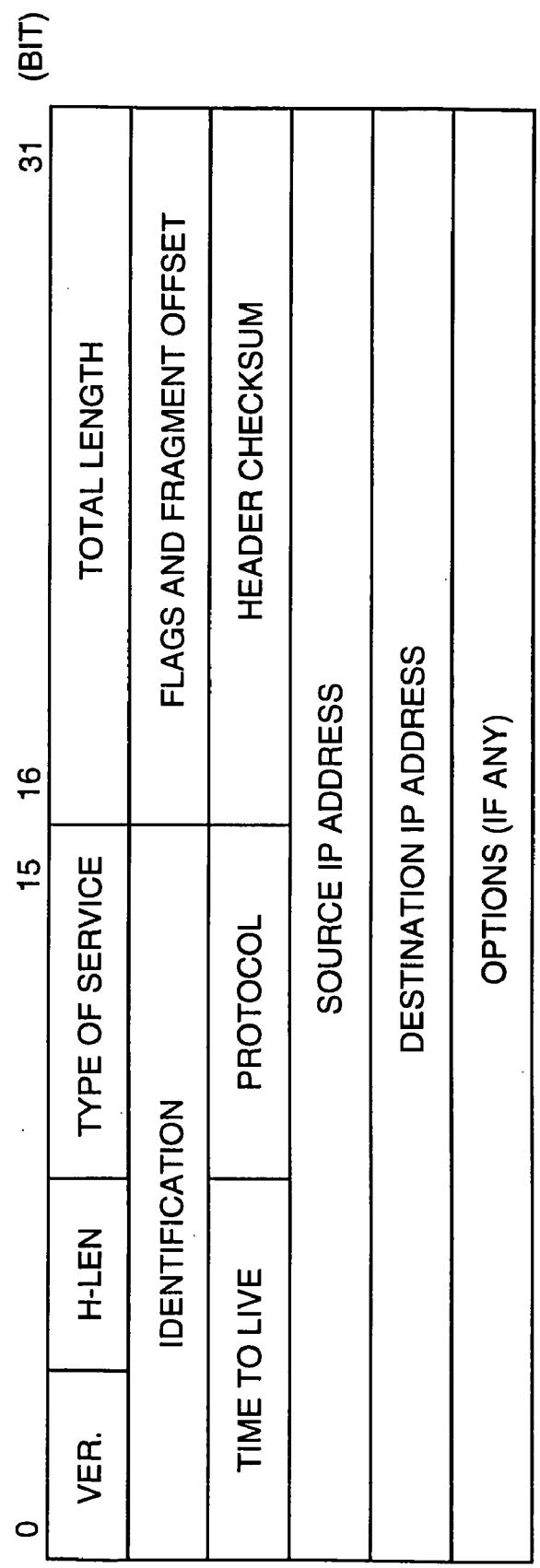
FIG. 35 is a block diagram showing the constitution of IP header shown in FIG. 33.
Figure 36:
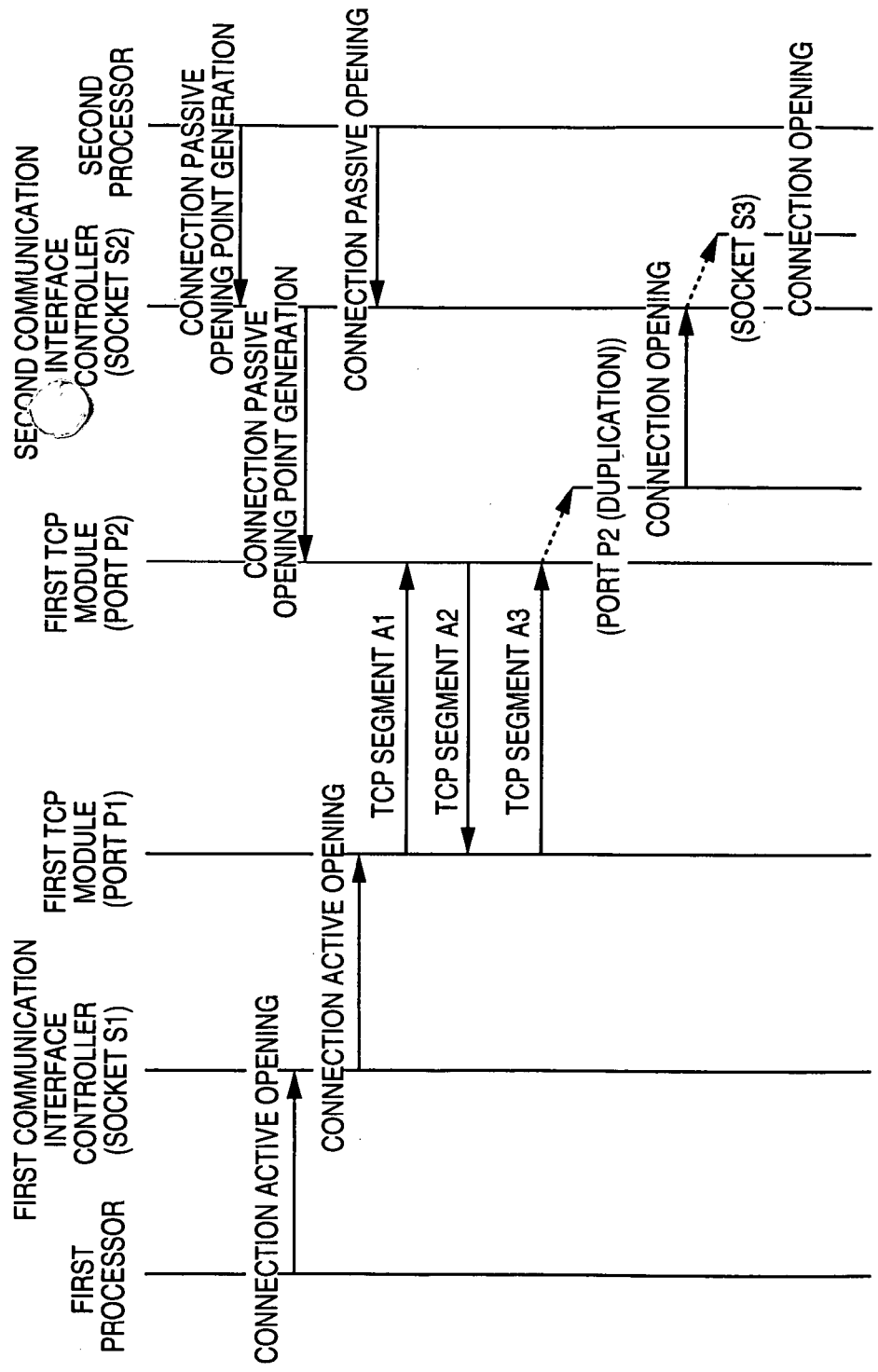
FIG. 36 is a sequence diagram showing a procedure during connection opening in the conventional data communication system shown in FIG. 32.
Figure 37:
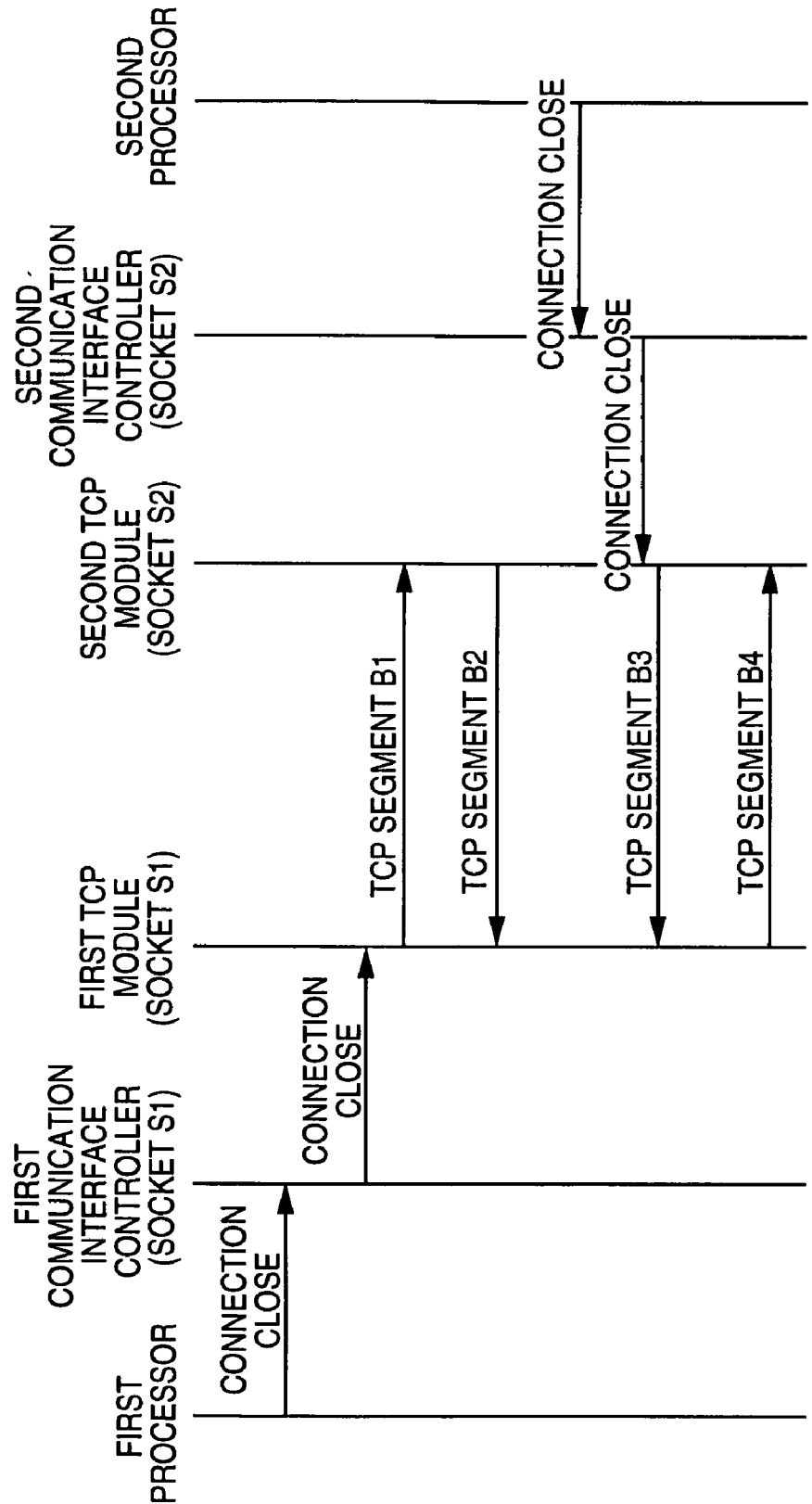
FIG. 37 is a sequence diagram showing a procedure during connection closing in the conventional data communication system shown in FIG. 32.

The terminal equipment and router are information processors provided with the apparatuses connectable to the network as described in the first embodiment, but may be computers as shown in FIG. 31.

FIG. 31 is a diagram showing the constitution of the sixth embodiment of the data communication system of the present invention, and is a block diagram showing one constitution example of the terminal equipment and router.

In FIG. 31, the terminal equipment and router of the sixth embodiment comprise a processor 41 for executing a processing to perform data communication, a storage unit 42 for temporarily storing the information necessary for the processing of the processor 41, a network access protocol unit 43 for accessing the network, a recording medium 44 in which a data communication program for allowing the processor 41 to execute the data communication processing is recorded, an input unit 45 as an interface for inputting necessary commands and information to the processor 41, and an output unit 46 for outputting the processing result of the processor 41. Additionally, the network access protocol unit 43 is similar to the first network access protocol, second network access protocol, and third network access protocol shown in the first to fifth embodiments.

The data communication program recorded in the recording medium 44 allows the processor 41 to execute the data communication control of the above-described first to fifth embodiments, and the processor 41 executes the data communication control described in the first to fifth embodiments according to the data communication program read from the recording medium 44. The recording medium 44 may be a magnetic disc, an optical disc, a semiconductor memory, or another recording unit.

What is claimed is:

1. A data communication method for transmitting/receiving desired data between a terminal equipment and at least one server terminal equipment via an interconnecting installation for performing data communication with the server terminal equipment under TCP/IP protocol, said method comprising the steps of:

preparing a message provided with a header formatted so as to dedicatedly comprise information necessary for a particular control required to perform the data communication; and exchanging said message between said terminal equipment and said interconnecting installation to transmit and receive the desired data, wherein said header is formatted such that said message comprises a message selected from the group consisting of:

a passive opening message for requesting a passive opening of said connection;

an active opening message for requesting an active opening of said connection;

an establishment message for notifying connection establishment for said connection passive opening request or said connection active opening request made in the past;

a close message for requesting close of said connection; and a reply message which is reply notification to said received message, and wherein each of said messages includes connection identifier information for identifying connection which is a virtual channel set between said terminal equipment and said interconnecting installation.

2. A data communication method for transmitting/receiving desired data between a terminal equipment and at least one server terminal equipment via an interconnecting installation for performing data communication with the server terminal equipment under TCP/IP protocol, said method comprising the steps of:

preparing a message provided with a header formatted so as to dedicatedly comprise information necessary for a particular control required to perform the data communication; and exchanging said message between said terminal equipment and said interconnecting installation to transmit and receive the desired data, wherein said header is formatted such that said message comprises a message selected from the group consisting of:

a data message which is the desired data transmitted/received between said terminal equipment and said interconnecting installation;

an acknowledgment message for use in transmission acknowledgment of said data message;

a reception disable message for use in flow control of said data message, and for requesting transmission discontinuation of said data message; and a reception enable message for use in the flow control of said data message, and for requesting transmission resuming of the discontinued data message, and wherein each of said messages includes connection identifier information for identifying connection identifier information for identifying connection which is a virtual channel set between said terminal equipment and said interconnecting installation.

3. A terminal equipment for transmitting/receiving desired data with at least one server terminal equipment via an interconnecting installation for performing data communication with the server terminal equipment under TCP/IP protocol, said terminal equipment comprising:

a communication controller for exchanging a message provided with a header formatted so as to dedicatedly comprise information necessary for a particular control required to perform the data communication so that a desired data is transmitted to and received from said interconnecting installation, wherein said header is formatted such that said message comprises a message selected from the group consisting of:

a passive opening message for requesting a passive opening of said connection;

an active opening message for requesting an active opening of said connection;

an establishment message for notifying connection establishment for said connection passive opening request or said connection active opening request made in the past;

a close message for requesting close of said connection; and a reply message which is reply notification to said received message, and wherein each of said messages includes connection identifier information for identifying connection which is a virtual channel set between said terminal equipment and said interconnecting installation.

4. A terminal equipment for transmitting/receiving desired data with at least one server terminal equipment via an interconnecting installation for performing data communication with the server terminal equipment under TCP/IP protocol, said terminal equipment comprising:

a communication controller for exchanging a message provided with a header formatted so as to dedicatedly comprise information necessary for a particular control required to perform the data communication, so that a desired data is transmitted to and received from said interconnecting installation, wherein said header is formatted such that said message comprises a message selected from the group consisting of:

a data message which is the desired data transmitted/received between said terminal equipment and said interconnecting installation;

an acknowledgment message for use in transmission acknowledgment of said data message;

a reception disable message for use in flow control of said data message, and for requesting transmission discontinuation of said data message; and a reception enable message for use in the flow control of said data message, and for requesting transmission resuming of the discontinued data message, and wherein each of said messages includes connection identifier information for identifying connection which is a virtual channel set between said terminal equipment and said interconnecting installation.

5. An interconnecting installation for relaying data communication between a terminal equipment and at least one server terminal equipment, and performing data communication with said server terminal equipment under TCP/IP protocol said interconnecting installation comprising:

a communication controller for exchanging a message provided with a header formatted so as to dedicatedly comprise information necessary for a particular control required to perform the data communication so that a desired data is transmitted to and received from said terminal equipment, wherein said header is formatted such that said message comprises a message selected from the group consisting of:

a passive opening message for requesting a passive opening of said connection;

an active opening message for requesting an active opening of said connection;

an establishment message for notifying connection establishment for said connection passive opening request or said connection active opening request made in the past;

a close message for requesting close of said connection; and a reply message which is reply notification to said received message, and wherein each of said messages includes connection identifier information for identifying connection which is a virtual channel set between said terminal equipment and said interconnecting installation.

6. An interconnecting installation for relaying data communication between a terminal equipment and at least one server terminal equipment, and performing data communication with said server terminal equipment under TCP/IP protocol, said interconnecting installation comprising:

a communication controller for exchanging a message provided with a header formatted so as to dedicatedly comprise information necessary for a particular control required to perform the data communication, so that a desired data is transmitted to and received from said terminal equipment, wherein said header is formatted such that said message comprises a message selected from the group consisting of:

a data message which is the desired data transmitted/received between said terminal equipment and said interconnecting installation;

an acknowledgment message for use in transmission acknowledgment of said data message;

a reception disable message for use in flow control of said data message, and for requesting transmission discontinuation of said data message; and a reception enable message for use in the flow control of said data message, and for requesting transmission resuming of the discontinued data message, and wherein each of said messages includes connection identifier information for identifying connection which is a virtual channel set between said terminal equipment and said interconnecting installation.

7. A data communication system for transmitting/receiving desired data between a terminal equipment and at least one server terminal equipment via an interconnecting installation for performing data communication with the server terminal equipment under TCP/IP protocol, wherein said terminal equipment comprises:

a first communication controller for exchanging a message provided with a header formatted so as to dedicatedly comprise information necessary for a particular control required to perform the data communication, so that a desired data is transmitted and received from said interconnecting installation, and wherein said interconnecting installation comprises:

a second communication controller for exchanging the message provided with the header, so that a desired data is transmitted to and received from said terminal equipment, wherein said header is formatted such that said message comprises a message selected from the group consisting of:

a passive opening message for requesting a passive opening of said connection;

an active opening message for requesting an active opening of said connection;

an establishment message for notifying connection establishment for said connection passive opening request or said connection active opening request made in the past;

a close message for requesting close of said connection; and a reply message which is reply notification to said received message, and wherein each of said messages includes connection identifier information for identifying connection which is a virtual channel set between said terminal equipment and said interconnecting installation.

8. A data communication system for transmitting/receiving desired data between a terminal equipment and at least one server terminal equipment via an interconnecting installation for performing data communication with the server terminal equipment under TCP/IP protocol, wherein said terminal equipment comprises:

a first communication controller for exchanging a message provided with a header formatted so as to dedicatedly comprise information necessary for a particular control required to perform the data communication, so that a desired data is transmitted and received from said interconnecting installation, and wherein said interconnecting installation comprises:

a second communication controller for exchanging the message provided with the header, so that a desired data is transmitted to and received from said terminal equipment, wherein said header is formatted such that said message comprises a message selected from the group consisting of:

a data message which is the desired data transmitted/received between said terminal equipment and said interconnecting installation;

an acknowledgment message for use in transmission acknowledgment of said data message;

a reception disable message for use in flow control of said data message, and for requesting transmission discontinuation of said data message; and a reception enable message for use in the flow control of said data message, and for requesting transmission resuming of the discontinued data message, and wherein each of said messages includes connection identifier information for identifying connection which is a virtual channel set between said terminal equipment and said interconnecting installation.

9. A recording medium for recording a program for allowing a computer to transmit/receive desired data with at least one server terminal equipment via an interconnecting installation for performing data communication with the server terminal equipment under TCP/IP protocol, wherein said recording medium records such a program as exchanging a message provided with a header formatted to as to dedicatedly comprise information necessary for a particular control required to perform the data communication is recorded, so that a desired data is transmitted to and received from said interconnecting installation, wherein said header is formatted such that said message comprises a message selected from the group consisting of:

a passive opening message for requesting a passive opening of said connection;

an active opening message for requesting an active opening of said connection;

an establishment message for notifying connection establishment for said connection passive opening request or said connection active opening request made in the past;

a close message for requesting close of said connection; and a reply message which is reply notification to said received message, and wherein each of said messages includes connection identifier information for identifying connection which is a virtual channel set between said computer and said interconnecting installation.

10. A recording medium for recording a program for allowing a computer to transmit/receive desired data with at least one server terminal equipment via an interconnecting installation for performing data communication with the server terminal equipment under TCP/IP protocol, wherein said recording medium records such a program as exchanging a message provided with a header formatted to as to dedicatedly comprise information necessary for a particular control required to perform the data communication is recorded, so that a desired data is transmitted to and received from said interconnecting installation, wherein said header is formatted such that said message comprises a message selected from the group consisting of:
- a data message which is the desired data transmitted/received between said computer and said interconnecting installation;
- an acknowledgment message for use in transmission acknowledgment of said data message;
- a reception disable message for use in flow control of said data message, and for requesting transmission discontinuation of said data message; and
- a reception enable message for use in the flow control of said data message, and for requesting transmission resuming of the discontinued data message, and wherein each of said messages includes connection identifier information for identifying connection which is a virtual channel set between said computer and said interconnecting installation.

11. A recording medium for recording a program for relaying data communication between a terminal equipment and at least one server terminal equipment, and allowing a computer to perform the data communication with said server terminal equipment under TCP/IP protocol, wherein said recording medium records such a program as exchanging a message provided with a header formatted so as to dedicatedly comprise information necessary for a particular control required to perform the data communication, so that a desired data is transmitted to and received from said terminal equipment, wherein said header is formatted such that said message comprises a message selected from the group consisting of:
- a passive opening message for requesting a passive opening of said connection;
- an active opening message for requesting an active opening of said connection;
- an establishment message for notifying connection establishment for said connection passive opening request or said connection active opening request made in the past;
- a close message for requesting close of said connection; and
- a reply message which is reply notification to said received message, and
- wherein each of said messages includes connection identifier information for identifying connection which is a virtual channel set between said terminal equipment and said computer.

12. A recording medium for recording a program for relaying data communication between a terminal equipment and at least one server terminal equipment, and allowing a computer to perform the data communication with said server terminal equipment under TCP/IP protocol, wherein said recording medium records such a program as exchanging a message provided with a header formatted so as to dedicatedly comprise information necessary for a particular control required to perform the data communication, so that a desired data is transmitted to and received from said terminal equipment, wherein said header is formatted such that said message comprises a message selected from the group consisting of:
- a data message which is the desired data transmitted/received between said terminal equipment and said computer;
- an acknowledgment message for use in transmission acknowledgment of said data message;
- a reception disable message for use in flow control of said data message, and for requesting transmission discontinuation of said data message; and
- a reception enable message for use in the flow control of said data message, and for requesting transmission resuming of the discontinued data message, and
- wherein each of said messages includes connection identifier information for identifying connection which is a virtual channel set between said terminal equipment and said computer.

* * * * *